US008549429B2

(12) United States Patent
Tsuruta et al.

(10) Patent No.: US 8,549,429 B2
(45) Date of Patent: Oct. 1, 2013

(54) MULTI-WINDOW MANAGEMENT APPARATUS AND PROGRAM, STORAGE MEDIUM AND INFORMATION PROCESSING APPARATUS

(75) Inventors: Akira Tsuruta, Osaka (JP); Shinichiro Ota, Osaka (JP); Kohki Fukuda, Osaka (JP); Kazuhiro Miki, Osaka (JP); Keiko Hirukawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1088 days.

(21) Appl. No.: 12/524,370

(22) PCT Filed: Jan. 23, 2008

(86) PCT No.: PCT/JP2008/050843
§ 371 (c)(1),
(2), (4) Date: Jul. 24, 2009

(87) PCT Pub. No.: WO2008/090902
PCT Pub. Date: Jul. 31, 2008

(65) Prior Publication Data
US 2010/0088634 A1  Apr. 8, 2010

(30) Foreign Application Priority Data

Jan. 25, 2007  (JP) ................................. 2007-015544

(51) Int. Cl.
*G06F 3/048* (2013.01)
(52) U.S. Cl.
USPC ............ 715/810; 715/788; 715/798; 715/767
(58) Field of Classification Search
USPC .................. 715/800, 702, 767, 788, 810, 864
See application file for complete search history.

(56) References Cited

U.S. PATENT DOCUMENTS

| 5,140,678 | A | | 8/1992 | Torres |
| 5,649,133 | A | * | 7/1997 | Arquie .......................... 715/764 |
| 5,712,995 | A | * | 1/1998 | Cohn ............................ 715/792 |
| 5,870,091 | A | | 2/1999 | Lazarony, Jr. et al. |
| 5,897,644 | A | * | 4/1999 | Nielsen ......................... 715/210 |
| 6,166,736 | A | * | 12/2000 | Hugh ............................ 715/798 |
| 6,628,267 | B2 | * | 9/2003 | Karidis et al. ................ 345/168 |
| 6,983,331 | B1 | * | 1/2006 | Mitchell et al. ............... 709/246 |
| 7,694,233 | B1 | * | 4/2010 | Ording ......................... 715/790 |
| 7,823,080 | B2 | * | 10/2010 | Miyajima et al. ............ 715/792 |

(Continued)

FOREIGN PATENT DOCUMENTS

| JP | 4-229320 A | 8/1992 |
| JP | 7-230375 A | 8/1995 |

(Continued)

*Primary Examiner* — Steven B. Theriault
*Assistant Examiner* — Amy M Levy
(74) *Attorney, Agent, or Firm* — Birch, Stewart, Kolasch & Birch, LLP

(57) ABSTRACT

A multi-window management apparatus includes: an activating icon display unit for displaying activating icons 60, 62, 64 and 66 on a display screen 56; a window display unit opening, when activating icon 64 is designated, a window 72 corresponding to activating icon 64 next to activating icon 64; and a window arranging unit for rearranging and displaying, when activating icon 64 is designated, a window 68 that has been open, and activating icons 60, 62 and 66 other than the designated activating icon 64, such that these are arranged along the longer side direction of display screen 56 not to be overlapping on an area where the new window 72 is to be opened.

40 Claims, 45 Drawing Sheets

(56) References Cited

U.S. PATENT DOCUMENTS

| | | | |
|---|---|---|---|
| 2004/0177323 A1* | 9/2004 | Kaasila et al. | 715/513 |
| 2004/0205711 A1 | 10/2004 | Ishimitsu et al. | |
| 2006/0123353 A1* | 6/2006 | Matthews et al. | 715/779 |
| 2006/0197753 A1* | 9/2006 | Hotelling | 345/173 |
| 2007/0013609 A1* | 1/2007 | Crow et al. | 345/1.1 |
| 2007/0061867 A1* | 3/2007 | Shinohara et al. | 726/2 |

FOREIGN PATENT DOCUMENTS

| | | |
|---|---|---|
| JP | 10-240488 A | 9/1998 |
| JP | 2001-51765 A | 2/2001 |
| JP | 2003-526820 A | 9/2003 |
| JP | 2003-283635 A | 10/2003 |
| JP | 2004-318872 A | 11/2004 |
| JP | 2006-59117 A | 3/2006 |

* cited by examiner

Prior Art

Prior Art

FIG.12

| No. | DISPLAY COORDINATES |
|---|---|
| 1 | (x11,y11)(x12,y12) |
| 2 | (x21,y21)(x22,y22) |
| 3 | (x31,y31)(x32,y32) |
| 4 | (x41,y41)(x42,y42) |

| ICON | POSITION | FUNCTION |
|---|---|---|
|  | y=0~49 | PLAYER |
|  | y=50~99 | 1 SEGMENT TV |
|  | y=100~149 | MAIL |
|  | y=150~199 | BROWSER |

ICON DATA

MULTI-WINDOW MANAGEMENT APPARATUS AND PROGRAM, STORAGE MEDIUM AND INFORMATION PROCESSING APPARATUS

TECHNICAL FIELD

The present invention relates to an information processing apparatus and, more specifically, to an input interface of an information processing apparatus executing a plurality of tasks simultaneously.

BACKGROUND ART

Recent portable telephones having remarkably advanced performances and various and many functions may well deserve to be called portable computers, rather than telephones. In addition to the telephone function, a portable telephone has functions of a clock, a calculator, a game machine and Internet accessing. As such, the portable telephone also operates as a platform allowing operation of separate application programs (hereinafter simply referred to as applications) including full browser and electronic mail.

The portable telephone that is no longer a simple telephone but rather a portable information terminal still has problems to be solved. The most serious of the problems is an interface to man.

As the portable telephone comes to have higher functions as described above, there arises a demand for simultaneously activating a number of applications at one time. State of the art realizes simultaneous activation of a number of applications at one time relatively easily, even if the portable telephone is of a small size. It is noted, however, that conditions for outputting pieces of information when a plurality of applications are activated in such a manner are far severer for a portable telephone than a computer.

A portable telephone must be small to be portable for the namesake. Further, keys or buttons must be provided to allow input of information. Therefore, of the body area, not much area can be used as a monitor and, therefore, a general portable telephone has only a small monitor.

In contrast, a desktop computer allows viewing of a large amount of information at one time on a large monitor. Manners of display when a number of applications are activated at one time have also been established. A typical example is shown in FIG. 1.

Referring to FIG. 1, on a monitor screen 10 of a desktop computer, windows 12 and 4 are displayed for different applications, and display for each application is given in the corresponding window. In some cases, it is possible to display a plurality of windows for one application.

When a plurality of windows are displayed on the monitor in this manner, windows may possibly overlap. In such a case, according to the conventional technique, when a user places and clicks a mouse pointer on a point of aimed window, the window is activated and control is passed to the application corresponding to the window. When the number of windows increases, however, a window or windows may be completely hidden by other windows. For such a situation, there are some contraptions by which windows are activated in turn by pressing keys of a specific combination, or the plurality of windows are listed, allowing the user to select arbitrary one.

When a plurality of windows such as shown in FIG. 1 are displayed on a small monitor of a portable telephone, however, windows are overlapped and viewing becomes difficult, or a window is hidden by another window and selection of an arbitrary window is hindered. If a contraption to select an arbitrary window as described above is to be prepared, it becomes necessary to press keys of a specific combination or to press buttons. Considering increased frequency of such operations, such a contraption merely results in complicated operations. Therefore, it is impractical to use similar scheme as in a conventional desktop computer in a device as represented by a portable telephone having only a small monitor.

A solution to such a problem is disclosed by T. Aoyama, in Japanese Patent Laying-Open No. 2003-283635. FIG. 2 shows a manner of displaying images of a plurality of applications on a portable telephone disclosed by Aoyama. Referring to FIG. 2, on a display screen 26 of the portable telephone according to Aoyama, a plurality of tabs 20, 22 and 24 are displayed. By selecting a desired one of these tabs, a corresponding image appears on the display screen 26. By switching the tabs, it is possible to display images of a plurality of applications successively.

Such a display method, however, allows display of only one window at a time, and it is impossible to display a plurality of windows at one time. If it is necessary to simultaneously activate a plurality of applications and to operate the plurality of applications in a linked manner, the method according to Aoyama is inconvenient.

Sato et al. discloses another solution to such a problem, in Japanese Patent Laying-Open No. 2006-59117. FIG. 3 shows an example of display. Referring to FIG. 3, according to Sato et al., the portable telephone has a display screen 30, which is divided to upper and lower two areas 32 and 34. Outputs of separate applications are displayed on areas 32 and 34.

Sato et al. points out a problem that when the display screen 30 is divided to a plurality of areas and allocated to separate applications, it is difficult for the user to easily grasp which key input leads to which image of which application. Sato et al. further discloses, as a solution to such a problem, that when an application is activated, an indication to that effect is displayed on the display screen 30.

Patent Document 1: Japanese Patent Laying-Open No. 2003-283635 (FIG. 2)

Patent Document 2: Japanese Patent Laying-Open No. 2006-59117 (FIG. 3)

DISCLOSURE OF THE INVENTION

Problems to be Solved by the Invention

The first cause of the problem related to display output of portable telephone as described above is that the display screen is small. Making the display screen as large as possible is one solution, though not a perfect one. For this purpose, it may be possible to have one entire surface of a housing implemented by a touch-panel display, so that the display unit and the input unit are provided as a commonly shared area. Even in that case, there still remains the following problem.

In a multi-window system used in a desk top computer, for example, sometimes it becomes necessary to shift position of a window or to change window size to activate a desired window. Even when a touch-panel display is adopted on a portable telephone, its area is still not large enough and, therefore, if the multi-window system mentioned above is adopted as it is, overlapping of a plurality of windows will occur frequently. Further, as the screen is small, window size is also small and, therefore, the task itself of changing the window size or to move the window is difficult.

The technique disclosed by Aoyama has a problem that a plurality of applications cannot simultaneously be displayed as described above. Therefore, a process requiring simultaneous display of images corresponding to a plurality of applications and mutually linked operations is impossible.

The technique disclosed by Sato et al. has a problem that the window size is fixed. When a plurality of applications are to be executed using multiple windows, a problem that which window of which application should have what size and where it should be displayed is encountered unavoidably. Sato et al. does not provide any solution to such a problem.

Therefore, an object of the present invention is to provide an easily operable multi-window management apparatus that allows finding an intended window easily while displaying a plurality of windows, even if display area is small.

Another object of the present invention is to provide an easily operable multi-window management apparatus that allows finding an intended window easily while displaying a plurality of windows with their sizes varied, even if display area is small.

A further object of the present invention is to provide an easily operable multi-window management apparatus that allows finding an intended window easily while displaying all of a plurality of windows, even if display area is small.

A still further object of the present invention is to provide an easily operable multi-window management apparatus that allows finding an intended window easily and determination of an active window easily while displaying a plurality of windows in an easily viewable manner, even if display area is small.

A still further object of the present invention is to provide an easily operable multi-window management apparatus that allows finding an intended window easily while displaying windows of a plurality of tasks in an easily viewable and easily operable manner, even if display area is small.

Means for Solving the Problems

According to a first aspect, the present invention provides, in an information processing apparatus allowing input/output through graphical user interface (GUI) having a display screen including a rectangular area with longer and shorter sides, a multi-window management apparatus displaying a plurality of windows on the display screen and allocating these to tasks executable on the information processing apparatus, respectively, including: an activating icon display module for displaying, on the display screen, two or more activating icons arranged with respective areas not overlapped with each other; a window display module responsive to designation of any of the activating icons by a user through GUI, for opening a new window corresponding to the activating icon between the designated activating icon and an activating icon displayed next to the designated activating icon; and a first window arranging module responsive to designation of any of the activating icons by the user through GUI, for re-arranging any existing window displayed on the display screen and an activating icon other than the designated icon such that they do not overlap on an area on which the new window is opened and the displayed windows are arranged along the longer side, and displaying these on the display screen.

The activating icon display module displays two or more activating icons on the display screen. These are arranged such that their display areas do not overlap. When any of the activating icons is designated by the user, a window corresponding to the designated activating icon opens between the designated activating icon and a neighboring activating icon. At the same time, the first window arranging module re-arranges an existing window or windows displayed on the display screen and activating icons other than the designated activating icon such that none of these overlap the area where the new window is to be opened and that displayed windows are arranged along the longer side direction, and displays these on the display screen.

When any of the activating icons is designated, a new window corresponding to the activating icon opens next to the designated activating icon. Therefore, correspondence between the activating icon and the window is easily grasped, making easier a window operation by the user. At the same time, the first window arranging module re-arranges existing windows and activating icons other than the designated icon such that these do not overlap with each other. Since windows are not overlapped, finding an intended window becomes easier than when overlapping of windows is allowed, and the windows can be identified by the activating icons. As a result, an easily operable multi-window management apparatus can be provided, which allows finding an intended window easily while displaying a plurality of windows, even if display area is small.

Preferably, the multi-window management apparatus further includes a window reducing module for reducing, when the existing window is re-arranged by the first window arranging module and it is impossible to display all windows unless size of the existing window is reduced, the size of the existing window.

If display of all windows is impossible unless the size of existing window or windows is reduced, the window reducing module reduces the size of existing windows so that all windows can be displayed. Since windows are not overlapped, an intended window can easily be found from among all windows. As a result, an easily operable multi-window management apparatus can be provided, which allows finding an intended window easily while displaying a plurality of windows, even if display area is small.

The window reducing module may include a module for reducing, when the existing window is re-arranged by the first window arranging module and it is impossible to display all windows unless size of the existing window is reduced, size of the existing window in accordance with priority allocated to each window such that a window of low priority is reduced with larger reduction ratio and a window of high priority is reduced with smaller reduction ratio, and a priority storage module for storing the priority window by window.

Since the ratio of reduction is small for a window of higher priority and the ratio of reduction is made larger for a window of lower priority, it follows that windows of higher priorities come to have relatively larger window size and, therefore, it becomes easier for the user to confirm contents of the window than when the ratio of reduction is uniform.

Preferably, the multi-window management apparatus may further include a module, responsive to opening of a window, for storing the priority in the priority storage module such that a window that is opened later comes to have higher priority, or it may further include a module, responsive to a window being activated, for storing the priority in the priority storage module such that a window that is activated later comes to have higher priority.

A newly opened window has higher possibility to be operated by the user and hence, it can be regarded to have higher importance. Further, a later activated window has higher possibility to be continuously operated by the user and hence, it can be regarded to have higher importance. Therefore, a newly opened window or a window activated at a later time point is set to have higher priority, whereby display of a window of which operation by the user is highly possible can be made relatively large. Thus, it becomes easier for the user to execute various tasks using multiple windows.

The multi-window management apparatus may further include a window closing module, when the existing windows are re-arranged by the first window arranging module, if any window comes to have its length along the longer side shorter than a prescribed threshold value as a result of window reduction made by the window reducing module, for closing that window and leaving display of a corresponding activating icon.

If the length in the longer side direction of a window becomes too small, it becomes difficult to confirm the contents thereof. Therefore, it does not make much sense to continue display of such a window. Accordingly, such a window is automatically closed to better organize displays on the screen and thereby to ease understanding of the contents of the plurality of windows.

Preferably, the activating icon display module includes a module for arranging and displaying the two or more icons such that display areas of respective activating icons are not overlapping both in a direction parallel to the longer side and a direction parallel to the shorter side.

The activating icons are arranged not overlapping either in the direction parallel to the longer side or in the direction parallel to the shorter side. Therefore, it is possible to distinguish an activating icon based simply on the position of the activating icon in either one of the longer side and shorter side directions. Thus, the process for window management inside the multi-window management apparatus becomes easier.

More preferably, the new window displayed by the window display module has a rectangular shape, and the designated activating icon and an operating icon are arranged and displayed on two sides parallel to the shorter side of the new window.

On two sides parallel to the shorter side of a new window, the activating icon and the operating icon are displayed, respectively. As the window is displayed between these icons, the icons are not hidden by other window or windows and, therefore, it becomes easier to distinguish one window from another and easier to find an icon.

The operating icon may have the same shape as the designated activating icon.

The operating icon is made to have the same shape as the designated activating icon and, as a result, it is clearly understood that the window opened between these icons corresponds to these icons. Thus, it is possible for the user to easily understand the window of which task is open.

In a preferred embodiment, the designated activating icon and the operating icon are arranged at positions where a segment connecting their centers becomes parallel to the longer side.

Such an arrangement clarifies correspondence between the icons, and further clarifies correspondence between the icons and any window opened between these icons. As a result, it becomes possible for the user to easily understand the window of which task is open.

Preferably, the multi-window management apparatus further includes a window moving module, responsive to an activating icon displayed together with a corresponding window being dragged along the longer side direction, for moving the window in accordance with length and direction of dragging; and a second window arranging module for re-arranging, when a window has been moved by the window moving module, any existing window displayed on the display screen and an activating icon other than the designated activating icon such that they are not overlapping on an area after movement of the window moved by the dragging and that displayed windows are arranged along the longer side direction, and for displaying them on the display screen.

By dragging the activating icon as a mark, the corresponding window can easily be moved by the second window arranging module. As a result, a multi-window display easily viewable by the user can be realized even if the display screen is small.

The second window arranging module maintains order of display of windows in the longer side direction, in the re-arrangement of existing windows when a window has been moved by the window moving module.

As the order of window display in the longer side direction is maintained, arrangement of multiple windows is kept constant when viewed from the user even after windows are re-arranged and, therefore, it is easy to find or operate the intended window.

The second window arranging module may include a module for re-arranging, in the re-arrangement of existing windows when a window has been moved by the window moving module, a window by reducing size of the longer side direction of a blank area existing ahead in the window moving direction on the display screen, and a module for reducing, when such a blank area runs out, size of a window existing ahead in the window moving direction by an amount of movement of the moved window.

When a window is to be moved and there is a window or windows displayed at the destination, such windows must be reduced. If there is a blank space where nothing is displayed at the destination, the space is reduced first, and after the reduction of blank space becomes impossible, window size is reduced. Then, it becomes possible to move the window with pieces of information in the windows kept as easily viewable as possible.

The multi-window management apparatus may further include a window closing module for closing a window that comes to have its length along the longer side shorter than a prescribed threshold value as a result of window re-arrangement by the second window arranging module, and leaving display of a corresponding activating icon.

When the size of a window in the longer side direction becomes too small, it becomes difficult to confirm the contents thereof. As the window closing module automatically closes such a window, a display area for another window can be made wider, realizing efficient use of a small display screen. Further, when the window width becomes smaller than the threshold value, the window is automatically closed and, therefore, the operation for closing the window is easy. When a window is closed, display of the corresponding activating icon is maintained and, therefore, simply by designating the activating icon, the window can be opened again. Thus, it becomes possible to efficiently execute a plurality of tasks using multiple windows.

In the re-arrangement of existing windows when a window has been moved by the window moving module, the second window arranging module may maintain the size of each window in the shorter side direction, and may change the size of the windows in the longer side direction.

As the window size in the shorter side direction is maintained, it is easier to grasp the order of windows in the longer side direction and to confirm inside displays even after a window or windows are moved, than when the overall window size is reduced.

In a preferred embodiment, when a window re-arranged by the second window arranging module is displayed, an output image of the corresponding task is displayed with size of the window in the shorter side direction maintained and reduction scale in the longer side direction changed in accordance with the change in window size.

The size of output image in the shorter side direction is maintained and only the longer side direction is reduced. Therefore, even when the width of a window in the longer side direction is considerably reduced, it is relatively easy to confirm the output contents of the task.

When a window re-arranged by the second window arranging module is displayed, if an output from the corresponding task is text data, the text data may be displayed in the window in a font reduced in size at least in the longer side direction than a font used for normal display.

When a text is displayed on the window, a relatively large number of characters can be displayed in the window by using a font whose size in the longer side direction is reduced. Therefore, it is possible to more reliably confirm the task output.

When a window re-arranged by the second window arranging module is displayed, if an output from the corresponding task is text data, the text data may be displayed in the window with linefeed inserted in accordance with window width.

When a text is displayed on the window, linefeeds are inserted to be fit for the window width. At least the starting part of the text is not displayed outside the window, and therefore, it is always kept viewable by the user. Thus, it becomes easier for the user to confirm the starting portion of the task output.

When a window re-arranged by the second window arranging module is displayed, in order to have an output image from the corresponding task fully displayed in the window, overall size of the output image may be enlarged or reduced with its aspect ratio maintained.

Consider, for example, a TV image. If the output image has an aspect ratio different from the aspect ratio of an original image, the viewer may have different feeling. By reducing the entire image with the aspect ratio kept unchanged, it becomes possible to use a plurality of windows, none of which is hidden, and to execute a plurality of tasks while maintaining the impression of the original image.

The multi-window management apparatus further includes a window size changing module, responsive to dragging of an operating icon displayed together with a corresponding window along the longer side direction, for changing size of the window in the longer side direction in accordance with length and direction of the dragging.

By dragging the operating icon, the size of window corresponding to the operating icon can be changed. As the operating icon can be used as a mark, the window size can easily be changed. Further, as the window size is changed in response to dragging in the longer side direction, the order of window arrangement in the longer side direction is kept unchanged. Further, as the window size is kept unchanged in the shorter side direction, the contents of the window can be kept relatively easily viewable, even when the size in the longer side direction is changed. Therefore, it is possible to change the size of the desired window by a desired amount in the longer side direction while displaying all windows not overlapping with each other and to maintain contents displayed in each window relatively easily understandable.

The window size changing module changes, when the operating icon is dragged, the size of the window in the longer side direction, while maintaining position of an activating icon forming a pair with the operating icon.

The position of activating icon is not changed, and the portion where the operating icon is positioned in the window moves, whereby the size of entire window changes. Correspondence between the operation of the operating icon and the size change of the window can easily be grasped and, therefore, it becomes easier to change the intended window to a desired size.

The multi-window management apparatus further includes a window closing module, responsive to the size in the longer side direction of the window of which operating icon has been dragged becoming smaller than a prescribed threshold value as a result of window size change by the window size changing module, for closing the window and leaving a corresponding activating icon.

When the operating icon is dragged and the size in the longer side direction of the window becomes smaller than the threshold value as a result, the window is automatically closed by the window closing module. This has the effect of simplifying the operation of closing the window.

The multi-window management apparatus may further include a module, responsive to the operating icon displayed on the shorter side of a window displayed on the display screen being designated continuously for a prescribed time period or longer by GUI, for displaying operation information related to operation of a task corresponding to the window, on the display screen.

When the user designates an operating icon on the window continuously for a prescribed time period or longer, the task operation information corresponding to the operating icon is displayed. Even when the display screen is small, it is possible to show the user the operation information related to each task, and hence, it becomes possible to easily execute works using multiple windows.

The multi-window management apparatus further includes a module, responsive to the activating icon displayed on the shorter side of a window displayed on the display screen being designated continuously for a prescribed time period or longer by GUI, for displaying operation information related to operation of a task corresponding to the window, on the display screen.

When an activating icon on the window is designated by the user continuously for a prescribed time period or longer, the task operation information corresponding to the activating icon is displayed. Even when the display screen is small, it is possible to show the user the operation information related to each task, and hence, it becomes possible to easily execute works using multiple windows.

The operation information may be a function menu listing functions of a task corresponding to the window. The multi-window management apparatus may further include a module, responsive to designation of any function of the function menu by GUI, for executing the function.

Using multiple windows, it is possible to display a function menu corresponding to each window by designating the activating icon or operating icon on the window continuously for a prescribed time period or longer, and by designating any function, it is possible to execute the function. Even if the display screen is small, windows can be displayed not overlapping with each other, and the function unique to each window can be executed as needed in an efficient manner without wasting any area of the display screen.

The multi-window management apparatus further includes a window activating module, responsive to designation of an inner area of any of the windows existing on the display screen by GUI, for setting the window to an active window, setting any other window to an inactive window, and displaying the activating icon and the operating icon of the window set to the active window in a manner different from the activating icon and the operating icon of other window.

The activating icon and the operating icon of the activated window are displayed in a manner different from other activating icons and operating icons. Therefore, it is easy to identify which window is active among a plurality of open windows. It is possible to easily select the window to be operated and to make desired instruction without error.

The multi-window management apparatus further includes a default window size storage module for storing default size of a window corresponding to the two or more activating icons; and the window display module includes a module, responsive to designation of any of the activating icons by a user through GUI, for opening a new window corresponding to the activating icon in an area next to the designated activating icon in a default size stored in the default window size storage module.

When the activating icon is designated, a window corresponding to the activating icon is displayed in a default size. By setting appropriate value for the default size, a setting to immediately open the window in an appropriate size is realized. The window is opened in an area next to the designated activating icon and, therefore, the correspondence between the activating icon and the window can easily be grasped, making easier the works using multiple windows.

The window display module includes a module, responsive to any of the activating icons designated by the graphical interface and dragged in the longer side direction, for opening a new window corresponding to the activating icon in a size corresponding to a drag distance of the designated activating icon, in an area next to the designated activating icon.

When any of the activating icons is dragged, a new window opens in an area neighboring the activating icon, in a size corresponding to the drag distance. By the intuitive and easy-to-understand operation, a window of a desired size can be opened. Positions and sizes of other windows are automatically adjusted accordingly, so that all windows are displayed not overlapping with each other. Thus, a multi-window management apparatus can be realized which opens a new window in a desired size by the intuitive and easy-to-understand operation and allows easy confirmation of contents of all windows.

Preferably, the multi-window management apparatus further includes a task combination information storage for storing task combination information specifying a combination of tasks to which neighboring windows are to be allocated. The first window arranging module includes a determining module, responsive to designation of any of the activating icons by a user through GUI, for determining whether or not a combination of any of tasks corresponding to existing windows and a task corresponding to the designated activating icon is stored in the task combination information storage, an order changing module, responsive to a determination by the determining module that a combination of any of tasks corresponding to existing windows and a task corresponding to the designated activating icon is stored in the task combination information storage module, for changing order of existing windows displayed on the display screen and activating icons other than the designated activating icon, such that windows of these tasks are arranged next to each other, and a module for re-arranging and displaying on the display screen the existing windows and the activating icons other than the designated activating icon such that any of these is not overlapping on an area on which the new window is to be opened, and that displayed windows are arranged along the longer side direction.

The task combination information is stored in the task combination information storage and, therefore, when the window of one task of the combination has been opened and the window of the other task is to be newly opened, the positions of one and the other windows and the activating icons are changed such that the two windows are arranged side by side. The change takes place automatically. Therefore, if it is desired to have windows of desired tasks arranged side by side, the windows come to be automatically displayed in a desired order by storing the task combination information in the task combination information. Thus, it is possible for the user to efficiently execute works using a plurality of tasks in the multi-window system.

The task combination information storage includes a display order information storage for storing display order information specifying a combination of tasks to which neighboring windows are to be allocated and an order of display of corresponding windows. The multi-window management apparatus further includes a display direction switching module, responsive to a user input designating switching of display direction on the display screen, for switching display in each window displayed on the display screen between a first display direction in which an image is displayed erected in a direction parallel to the longer side and a second display direction in which an image is erected in a direction parallel to the shorter side. The order changing module includes a module, responsive to a determination by the determining module that a combination of any of tasks corresponding to displayed windows and a task corresponding to the designated activating icon is stored in the task combination information storage module, for changing, when display direction after switching by the switching module is the first display direction, order of existing windows displayed on the display screen and activating icons other than the designated activating icon, such that windows of these tasks are arranged next to each other and in accordance with the order of display stored in the display order information storage module, and for changing, when display direction after switching by the switching module is the second display direction, order of existing windows displayed on the display screen and activating icons other than the designated activating icon, such that windows of these tasks are arranged next to each other.

What is necessary is that windows of two tasks are positioned next to each other when the display direction is the second display direction. From the viewpoint of work efficiency for the user, sometimes it is desired to have these windows displayed in a prescribed order when the direction is the first display direction. In such a situation, by storing the display order information in the window display order information storage module, it is possible to display the windows corresponding to specific two tasks in the order specified by the display order information. As the change of display order takes place automatically, work efficiency by the user can be improved when the information processing apparatus is used in the first display direction.

The first window arranging module further includes a module, responsive to designation of any of the activating icons by a user through GUI, for opening, when a combination of any task not corresponding to any of the existing windows and a task corresponding to the designated activating icon is stored in the task combination information storage module, a window of the task other than the task corresponding to the designated activating icon of the combination, next to a window area of the task corresponding to the designated activating icon.

When a certain task and another task are frequently activated as a pair, it is convenient if these tasks can be activated simultaneously. By storing the combination of such tasks in the task combination information storage, when the window of one task is opened and the window of the other task is not yet opened, the window of the other task is simultaneously opened. Therefore, it is possible to efficiently activate the combination of tasks that are often activated as a pair, and the work efficiency related to task activation is improved. Further, the two windows are opened next to each other and, therefore, work efficiency by the user using these windows can be improved.

The multi-window management apparatus further includes an exclusive task combination information storage module for storing exclusive task combination information specifying a combination of tasks whose windows are designated to be displayed exclusive with each other. The first window arranging module includes: a module, responsive to designation of any of the activating icons by a user through GUI, for determining whether or not a combination of any of tasks corresponding to existing windows and a task corresponding to the designated activating icon is stored in the exclusive task combination information storage module; a window closing module, responsive to a determination by the determining module that a combination of any of tasks corresponding to displayed windows and a task corresponding to the designated activating icon is stored in the exclusive task combination information storage module, for closing the displayed window of the combination and changing the display to display of the corresponding activating icon; a module for rearranging and displaying on the display screen, when it is determined by the determining module that a combination of any of tasks corresponding to displayed windows and a task corresponding to the designated activating icon is stored in the exclusive task combination information storage module, existing windows remaining after closing of the window by the window closing module and activating icons other than the designated activating icon such that they are not overlapping on an area where the new window is to be opened and the displayed windows are arranged in the longer side direction; and a module for rearranging and displaying on the display screen, when it is determined by the determining module that a combination of any of tasks corresponding to displayed windows and a task corresponding to the designated activating icon is not stored in the exclusive task combination information storage module, the existing windows and the activating icons other than the designated activating icon such that they are not overlapping on an area where the new window is to be opened and the displayed windows are arranged in the longer side direction.

For some reason, it is sometimes demanded not to simultaneously display windows of specific two tasks. By storing the combination of such tasks in the exclusive task combination information storage module as the combination of tasks that are to be displayed exclusively, it becomes possible, when the window of one of the tasks is opened, to automatically close the window of the other task. Therefore, display satisfying the demand mentioned above can be realized without user intervention.

When closing a window, the window closing module does not terminate execution of a corresponding task if the task is a specific task, and displays the corresponding the activating icon in a manner different from a normal display manner.

Execution of the specific task continues even when the window is closed. It is troublesome if the user forgets that the task is continuously being executed. Therefore, the activating icon corresponding to the closed window is kept displayed in a manner different from the normal manner of display, so as to notify the user that the task is still being executed.

The multi-window management apparatus further includes an operation guidance display module, responsive to designation of any of the two or more activating icons continuously for a prescribed time period or longer by GUI, for displaying an operation guidance of the activating icon on the display screen.

If any of the activating icons is kept continuously designated for a prescribed time period or longer, operation guidance of the activating icon is displayed. Even a user who has never seen the image displaying only the activating icon can obtain information related to the operation by continuously pressing the activating icon. As a result, a multi-window management system can be provided, which is easily usable even by a user not having much previous knowledge.

The multi-window management apparatus further includes an area storage module for storing ranges of a plurality of mutually-not-overlapping areas in the direction parallel to the shorter side in relation to a task allocated to each area; an area determining module, responsive to dragging of any of two or more activating icons in the direction parallel to the shorter side by GUI, for determining to which of the ranges of the plurality of areas in the direction parallel to the shorter side the display area of the activating icon after dragging belongs; and a task allocating module for allocating the activating icon to the task corresponding to the area determined by the area determining module.

When the activating icon is dragged in a direction parallel to the shorter side, the display position of the activating icon in that direction changes. The task allocated to the activating icon is related to the display position of the activating icon in the direction parallel to the shorter side. Therefore, by dragging the activating icon, the task allocated to the activating icon can easily be changed.

The multi-window management apparatus further includes an activating icon changing module for changing a shape of the activating icon dragged in the direction parallel to the shorter side to a shape indicating the task allocated by the task allocating module.

The shape of activating icon changes in accordance with the allocated task and, therefore, the user can easily confirm that the task allocated to the activating icon has been changed. Further, the task allocated to the activating icon can easily be understood from the shape.

The multi-window management apparatus may further include an activating icon display changing module, for displaying the two or more activating icons normally in a first manner of display, and, in response to occurrence of an event related to any of tasks corresponding to activating icons displayed on the display screen whose corresponding windows are not opened, for changing manner of display of the activating icon corresponding to the task related to the event to a second manner of display different from the first manner of display.

When an event related to a task whose corresponding window is not opened occurs, the manner of display of the activating icon corresponding to the task is changed to the second manner of display different from the normal first manner of display. Therefore, the user can easily notice that the event related to the task occurred. Further, by designating the activating icon, the window corresponding to the task can be opened and, therefore, necessary processes for the event occurrence can easily be conducted.

The size of the window opened by the window display module can be designated beforehand.

By designating beforehand the window size to be opened, multiple windows can be used in a manner more convenient for the user.

The multi-window management apparatus may further include an area storage module for storing ranges of a plurality of mutually-not-overlapping areas in the direction parallel to the shorter side in relation to a task allocated to each area; and an activating icon adding module, responsive to designation of an area belonging to neither the icon area nor the existing window area displayed on the display screen continuously for a prescribed time or longer by GUI, for determining to which of the ranges of the plurality of areas in the direction parallel to the shorter side the designated area belongs, displaying a activating icon corresponding to the task allocated to the determined area in the designated area, and allocating the task corresponding to the determined area to the activating icon.

According to a second aspect, the present invention provides a multi-window management program, causing a computer allowing input/output through a GUI, having a rectangular display screen with longer and shorter sides, to operate as each of the modules of multi-window management apparatus described above. Therefore, by executing the multi-window management program by the computer, functions similar to those of the multi-window management apparatus described above can be attained.

According to a third aspect, the present invention provides a computer readable recording medium, recording the multi-window management program described above.

According to a fourth aspect, the present invention provides an information processing apparatus, including: any of the multi-window management apparatuses described above; an input/output device, having a rectangular display screen with longer and shorter sides, for performing input/output by GUI in accordance with multi-window management using the display screen by the multi-window management apparatus; and a task executing device, responsive to a user input by the input/output device, for executing a task corresponding to each window managed by the multi-window management apparatus, and for outputting a result of task execution to a window on the display screen of the input/output device.

The information processing apparatus includes any of the multi-window management apparatuses in accordance with the first aspect and, therefore, an easy-to-operate information processing apparatus utilizing multiple windows can be realized, which allows easy finding of an intended window while displaying a plurality of windows, even if the display screen is small.

The input/output module may include a touch-panel display.

The touch-panel display allows designation of an activating icon in a simple manner using one's finger and the like. With the additional advantage of easily usable multi-windows realized by the multi-window management apparatus, a portable information processing apparatus allowing easy execution of various and many tasks can be provided.

Effects of the Invention

As described above, according to the present invention, if any of the activating icons is designated, a new window corresponding to the activating icon opens between the activating icon and a neighboring activating icon. Correspondence between the activating icon and the window is easy to understand and window operation of the user can be facilitated. At the same time, existing window or windows and activating icons other than the designated activating icon are re-arranged, and existing windows are reduced in size so that all windows are displayed. The intended window can easily be identified as the windows are not overlapping. As a result, even when the display screen is small, it is possible to easily find the intended window while displaying a plurality of windows and thus, an easy-to-operate multi-window management apparatus can be provided.

When the designated activating icon and the operating icon are arranged and displayed on two sides parallel to the shorter side of the window displayed by the window display module, respectively, the icons are not hidden by other windows and, therefore, it is possible to easily distinguish windows from each other. It is also easy to find an icon. Further, correspondence between the window and the icon is clear.

If it is the case that all windows cannot be displayed unless existing windows are reduced in size, the existing windows are reduced in size in accordance with priority allocated to each window, such that a window of lower priority is much reduced while a window of higher priority is less reduced. The window of higher priority comes to have relatively larger size, allowing the user to confirm the contents of the window easier, than when reduction ratio is the same.

If there is a window of which length in the longer side direction becomes smaller than a prescribed threshold value as a result of window reduction performed when existing windows are re-arranged, such a window is closed and the corresponding activating icon is kept displayed. As the window is automatically closed, it is possible to well organize the displayed images to make it easier to grasp the contents of a plurality of windows. Further, the window can be closed in a simple manner By dragging an activating icon or an operating icon, the corresponding window can easily be moved or window size can be changed. As a result, even when the display screen is small, multi-window display easily viewable for the user can be realized in a simple manner.

When an activating icon or an operating icon on the window is designated by the user continuously for a prescribed time period or longer, operation information of the task corresponding to the icon is displayed. Even if the display screen is small, operation information related to each task can be presented to the user and, therefore, even if the user does not have any previous knowledge, he/she can easily proceed with the work using multiple windows. By way of example, by displaying a function menu and allowing execution of a function selected on the menu, it becomes possible to execute at a time point as desired a function unique to each window without wasting area of the display screen By adopting a scheme that when any of the activating icons is dragged, a new window is opened in a size corresponding to the drag distance in an area next to the activating icon, it becomes possible to open a window of a desired size by an intuitive and easy-to-understand operation. Positions and sizes of other windows are also automatically adjusted accordingly such that all windows are displayed not overlapping with each other. Therefore, a multi-window management apparatus that can be used by an intuitive and easy-to-understand operation, allowing easy confirmation of contents of all windows, can be provided.

By a combination of tasks, it is possible, when a window of a certain task is opened, to arrange or newly open a window of another task next to the window. It is also possible, when a window of a certain task is opened and a window of a task designated in advance in relation with the certain task has been opened, to close the window that has been opened. Such a change is done automatically and, therefore, when windows of desired tasks are to be arranged next to each other or displayed in exclusive manner, such setting can be done easily, enabling highly efficient work using a plurality of tasks in the multi-window system.

When an activating icon is dragged in a direction parallel to the shorter side, the task allocated to the activating icon can easily be changed. Further, by changing the shape of an activating icon, it becomes easy to understand the task allocated to the activating icon.

When an event related to a task whose corresponding window is not opened occurs, the manner of display of the activating icon corresponding to the task is changed to a second manner of display different from a normal, first manner of display. As a result, the user can easily notice that the event related to the task has occurred. By designating the activating icon, the window corresponding to the task can be opened, and a process or processes necessary for the event occurrence can be done easily.

BRIEF DESCRIPTION OF THE DRAWINGS

FIG. 12 shows structures of icon data.

Figure 1:
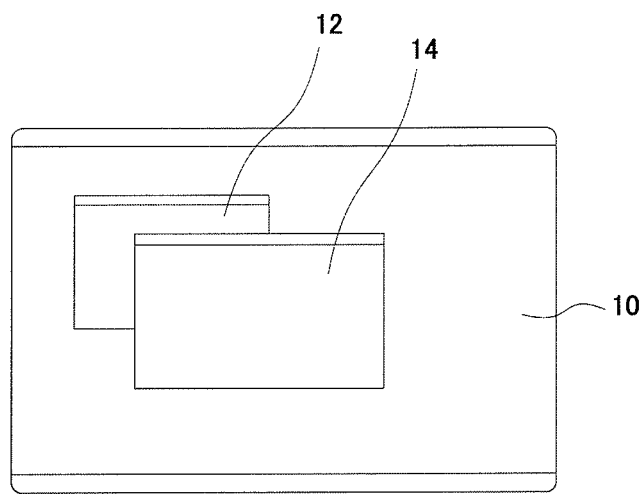
FIG. 1 is an illustration showing a multi-window system on a conventional desk top personal computer.
Figure 2:
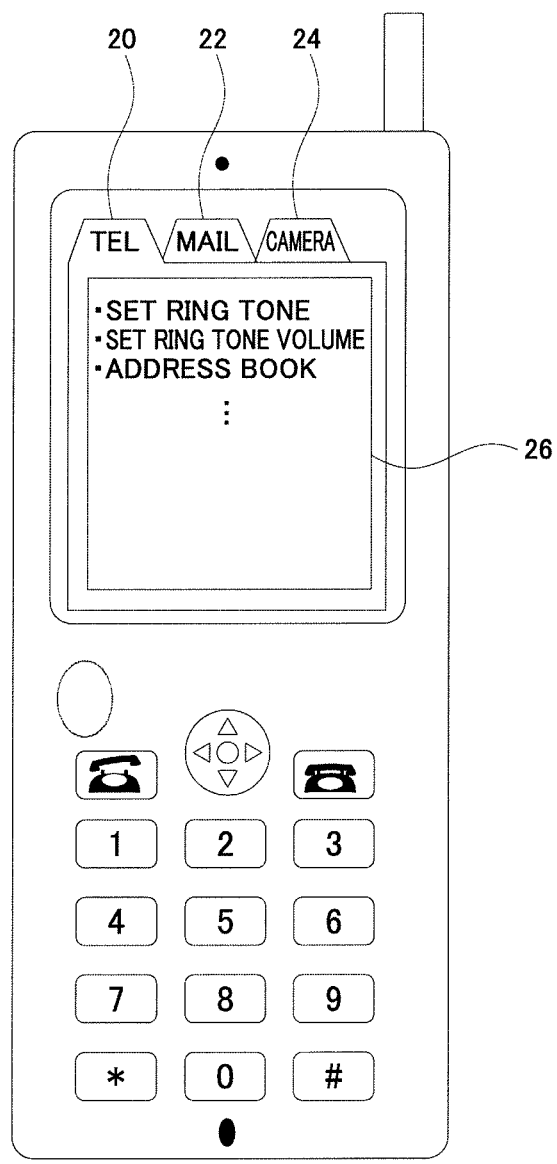
FIG. 2 show a manner of displaying a plurality of images on a portable telephone described in Patent Document 1.
Figure 3:
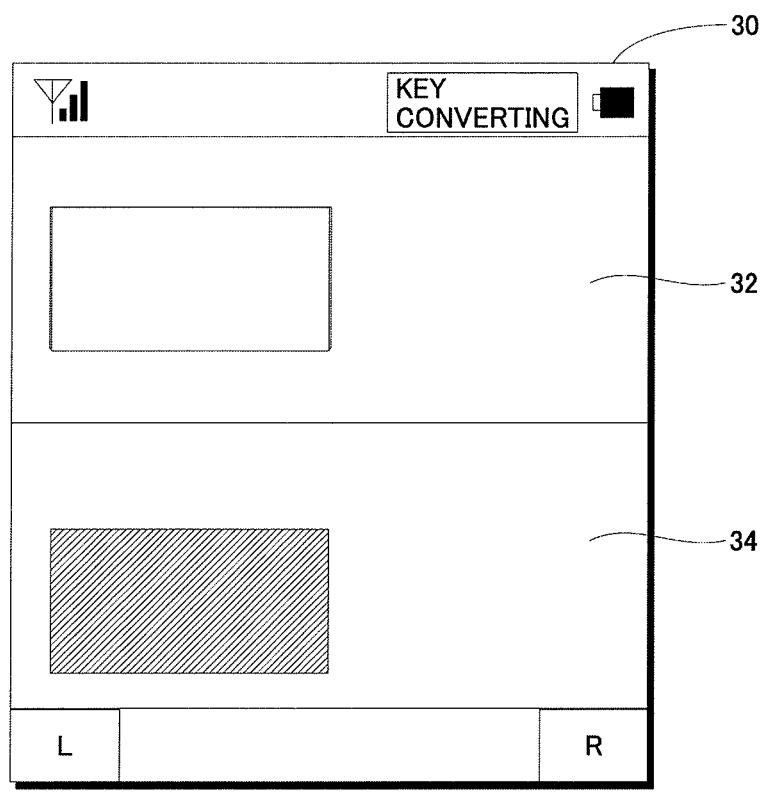
FIG. 3 show a manner of displaying a plurality of images on a portable telephone described in Patent Document 2.

DESCRIPTION OF REFERENCE CHARACTERS 40 portable telephone, 42 housing, 60, 62, 64, 66 activating icon, 68, 72, 377, 470, 472, 490, 492, 500, 510, 512 window, 70, 74, 375 operating icon, 56 display screen, 58 liquid crystal display (LCD), 59 capacitance type touch panel, 92 control circuit, 94 vibrating unit, 96 ringer, 98 memory, 102 full-screen liquid crystal touch panel.

BEST MODES FOR CARRYING OUT THE INVENTION

In the following, structure, operations and effects of a portable telephone having a liquid crystal display integrated with touch-panel, as an information processing apparatus in accordance with an embodiment of the present invention will be described. In the figures and descriptions below, the same components are denoted by the same reference characters. Their names and functions are also the same. Therefore, detailed description thereof will not be repeated.

In the following, a capacitance type full-screen liquid crystal touch panel is described as a display device and a coordinate detecting device. The display device and the coordinate detecting device are not limited to those used in the embodiments. Any combination of display devices and coordinate detecting devices may be used provided that the devices have a function of outputting information indicating whether a certain position on the display is designated or not, and the function of outputting coordinate information related to a designated position. Further, though a full-screen touch panel is suitable in various points, a touch panel having a display device only on a part of a main surface of the housing may also be used.

By way of example, in place of a capacitance type touch panel, a resistive type, or other types of touch panels or a tablet may be used.

In the following description, the term "hand" refers not only to the palm but also fingers.

Further, the multi-window control method in accordance with the embodiments described in the following is applicable not only to the device using the touch-panel integrated display but also to multi-window control of a desk-top computer.

Further, in the following embodiments, each function is mainly realized by cooperation of a computer program and computer hardware. Though such functions are simply represented by process steps in the flowcharts, practically, each may be considered to form a functional module through the cooperation of computer program and computer hardware.

<Concept of Multi-Window Control Method Used in Embodiments>

Before describing the structure of a portable telephone in accordance with an embodiment, the concept of multi-window control method adopted here will be briefly described. The description serves as a partial description of the operation of a portable telephone. For easier understanding of the structure of the apparatus, outline will be given here.

Figure 4:
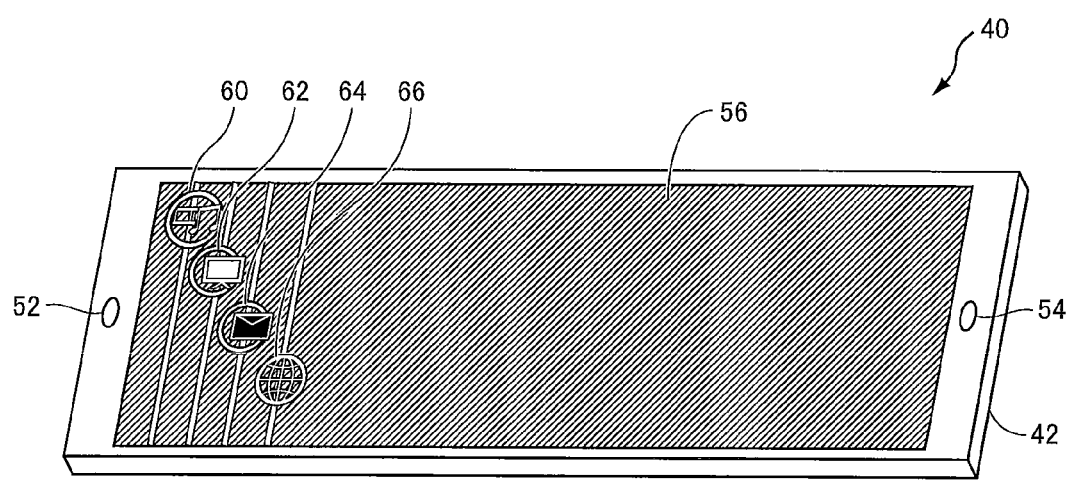
FIG. 4 shows a portable telephone 40 as a whole and a launcher image at the time of activation, in accordance with an embodiment of the present invention.

FIG. 4 shows an appearance of a portable telephone 40 in accordance with the present embodiment. Referring to FIG. 4, portable telephone 40 has a housing 42 having a flat, rectangular parallelepiped shape. A circuit, which will be described later, is arranged in housing 42. On an upper surface of housing 42, a display screen 56 including a rectangular area having longer and shorter sides, of an LCD touch panel is arranged. At opposite ends in the longitudinal direction (direction parallel to the longer side of display screen 56) of housing 42, a speaker 52 and a microphone 54 are arranged. When portable telephone 40 is used as a telephone, the user holds portable telephone 40 vertically, with speaker 52 positioned above and microphone 54 below. If it is used not as the portable telephone, the user may use portable telephone 40 both in portrait or landscape style. On display screen 56, a button for switching between the portrait and landscape displays is always displayed (though not shown in the figures), and by pressing the button with one's finger, the portrait and landscape displays can be switched for use.

On display screen 56, a launcher image, which is one of the characteristics of portable telephone 40 in accordance with the present embodiment, is displayed. Specifically, on display screen 56, icon bars including icons 60, 62, 64 and 66 respectively allocated to prescribed tasks are displayed. As shown in FIG. 4, in the present embodiment, the icon bars including icons 60, 62, 64 and 66 are arranged spaced by small distances from each other in the longitudinal direction of display screen 56, and the icons are arranged with their heights gradually lowered from the left to the right side of the screen. Specifically, the icons are arranged not to overlap with each other both in the directions parallel to the longer side and shorter side of display screen 56. Each task is actually realized by a computer program and, therefore, the term task and the term application are used as having the same meaning in the following.

Basically, the launcher is operated by GUI realized by a computer program and the LCD integrated type touch panel. Two methods may be used for activating an application by the launcher. The first is to one-touch an icon that corresponds to a desired application, among icons 60, 62, 64 and 66. The second method is to drag an icon that corresponds to the desired application in the horizontal direction of display screen 56 by a size desired as the window size.

By the first method, a window of the application corresponding to the one-touched icon opens next to the icon in a default window size, and the application is activated. In the present embodiment, the window opens on the right side of the one-touched icon. By the second method, a new window opens with the width as dragged, on the right side of the icon.

By way of example, assume that icon 62 of FIG. 4 is one-touched. Then, a window 68 of the corresponding application opens in the default size on the right side of icon 62. After window 68 opens, an icon 70 having the same design as icon 62 is arranged and displayed at the same height as icon 62. Specifically, icons 62 and 70 are displayed at positions where a line connecting the centers of their display areas is parallel to the longer side of display screen 56. Two icons 64 and 66 that are on the right side of icon 62 in FIG. 4 are re-arranged at positions moved to the right by the same amount as the lateral size of window 68.

Figure 5:
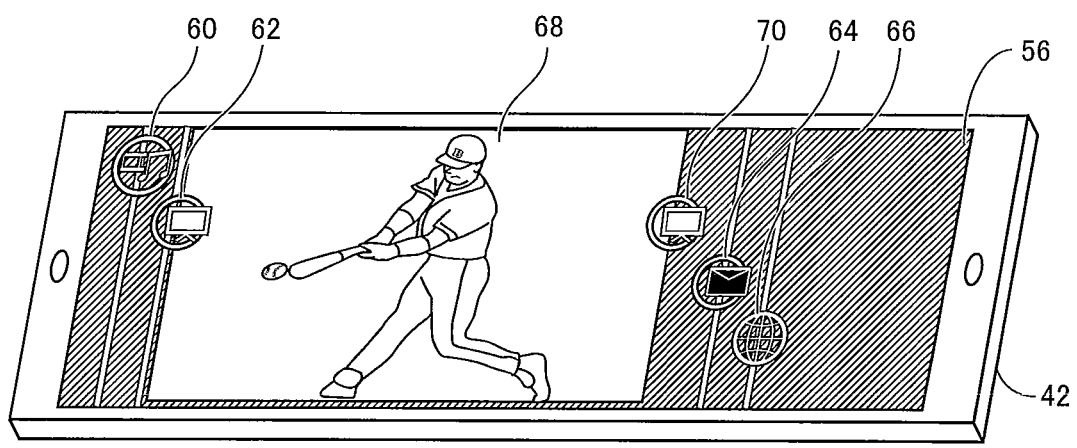
FIG. 5 shows a state when one window is opened, on portable telephone 40.

When activating icon 62 is dragged to the right by a prescribed distance in FIG. 4, again, window 68 opens in the similar manner as FIG. 5. In this case, however, the size of window 68 is determined by the drag distance and not the default value.

In the present specification, "one-touch" refers to tapping an icon with one's finger or a stylus (hereinafter simply referred to as "finger or the like") and taking his/her finger immediately off the icon. A state in which the finger or the like is pressing an ion and in contact with display screen 56 will be referred to as "touch-down" state, and when the finger or the like goes away from display screen 56, it will be referred to as "touch-up" or simply "up." When one touches-down an icon with his/her finger and moves his/her finger kept in contact with the surface of display screen 56, such an operation will be referred to as "drag."

In the example of FIG. 5, icons 62 and 70 are of the same design. In the present embodiment, however, these icons have different roles. In the present embodiment, an icon displayed on the launcher image and displayed on the left side of the opened window such as icon 62 is referred to as an "activating icon," and an icon that is not displayed on the launcher image but displayed on the right side of an opened window such as icon 70 will be referred to as an "operating icon." Icon 70 is referred to as an "operating icon," since by operating icon 70, an operation of changing the lateral size of window 68 is possible.

In the present embodiment, when activating icon 64 is one-touched or dragged in the state shown in FIG. 5, a window 72 corresponding to activating icon 64 opens, and an output of the application corresponding to activating icon 64 is displayed on window 72. On the right side of window 72, operating icon 74 is displayed. Operating icon 74 is an icon for operating window 72, which has the same design and displayed at the same height as activating icon 64.

Figure 6:
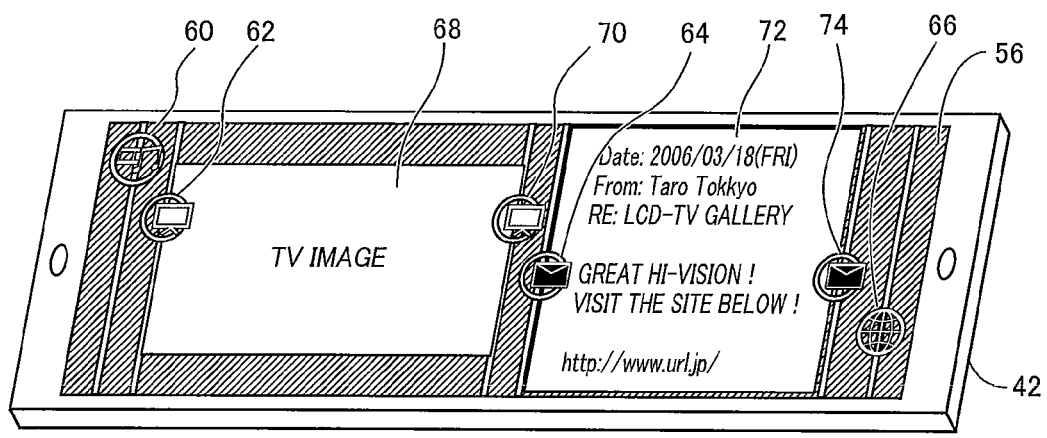
FIG. 6 shows a state when two windows are opened, on portable telephone 40.

In the present embodiment, the plurality of windows are arranged such that the windows do not overlap with each other and all windows are displayed on display screen 56, as shown in FIG. 6.

In the state shown in FIG. 6, two windows 68 and 72 are open. Therefore, as pointed out in Patent Document 2, it is difficult to know which of the windows is active. The present embodiment adopts a method of indicating an active window, by which the manner of display of the activating and operating icons on both sides of the active window is changed from the manner of display of icons corresponding to a window that is not active. More specifically, icons for the active window are displayed with higher luminance than icons for inactive window or windows.

Referring to FIG. 7(A), when width of window 72 is to be changed, what is necessary is to touch operating icon 74 of window 72 and to drag it to the left or right as indicated by an arrow 78. In the example shown in FIG. 7(A), if the icon is dragged to the right, window 72 becomes wider, and if the icon is dragged to the left, window 72 becomes narrower. The width of window 72 is determined by the position of operating icon 74 at the time point of touch-up.

Further, as shown in FIG. 7(B), if width 76 of window 72 becomes narrower to be smaller than a prescribed size, the application corresponding to window 72 is terminated, window 72 is closed, and operating icon 74 is erased. In the example shown in FIG. 7(B), the display image thereafter returns substantially the same state as shown in FIG. 5, except for the width of window 68.

Figure 8:
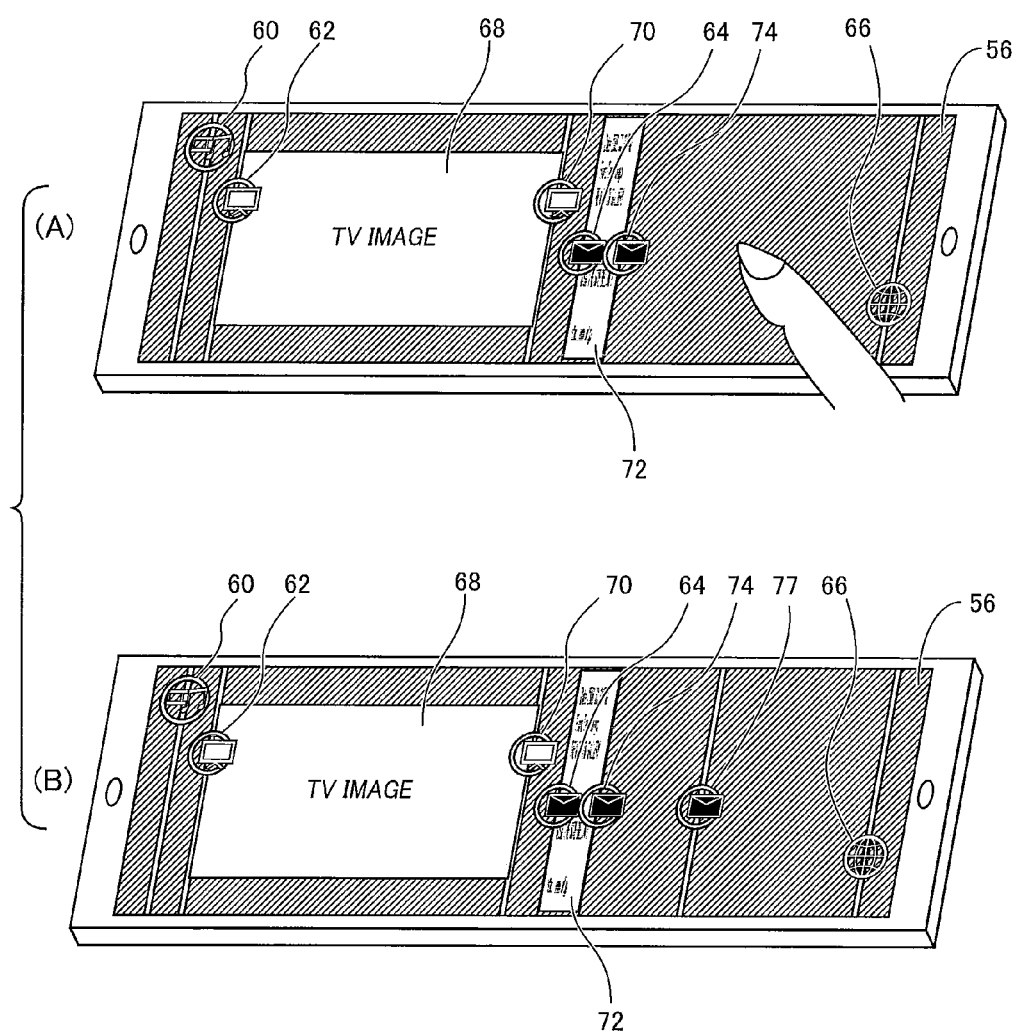
FIG. 8 shows images before and after a new icon is added, on portable telephone 40.

By designating a portion on display screen 56 not corresponding to any icon or any window continuously for a prescribed time period or longer, it is possible to add a new icon. Specifically, as shown in FIG. 8(A), when a portion in an area that is not an icon or window, such as the area between operating icon 74 and activating icon 66, is kept designated continuously for a prescribed time period or longer, a new activating icon 77 is displayed in accordance with the designated portion, as shown in FIG. 8(B).

Figure 9:
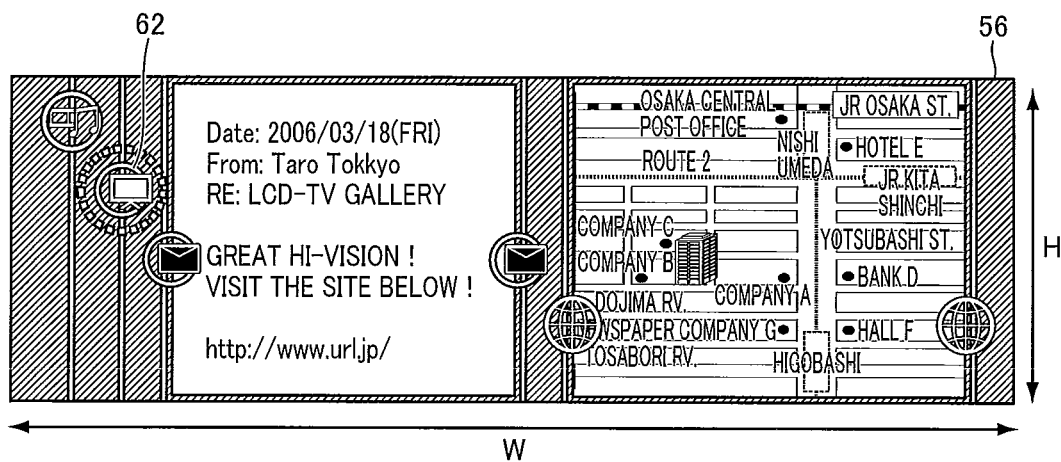
FIG. 9 illustrates display screen 56 having a width W and a height H.

In the foregoing, the window control method in accordance with the present embodiment has been outlined. It is noted that, as shown in FIG. 9, assuming that the display screen 56 has the width W and height H, the upper limit of height of each window is H. In the present embodiment, the window height is fixed at H. Width of each window is variable. It is noted, however, that the sum of widths of windows displayed on display screen 56 and the intervals between icons is at most the width W of display screen 56. Further, there may be a window of which width has an upper limit, among the windows.

<Structure>

In the following, a hardware configuration of portable telephone 40 in accordance with the present embodiment will be described.

Figure 10:
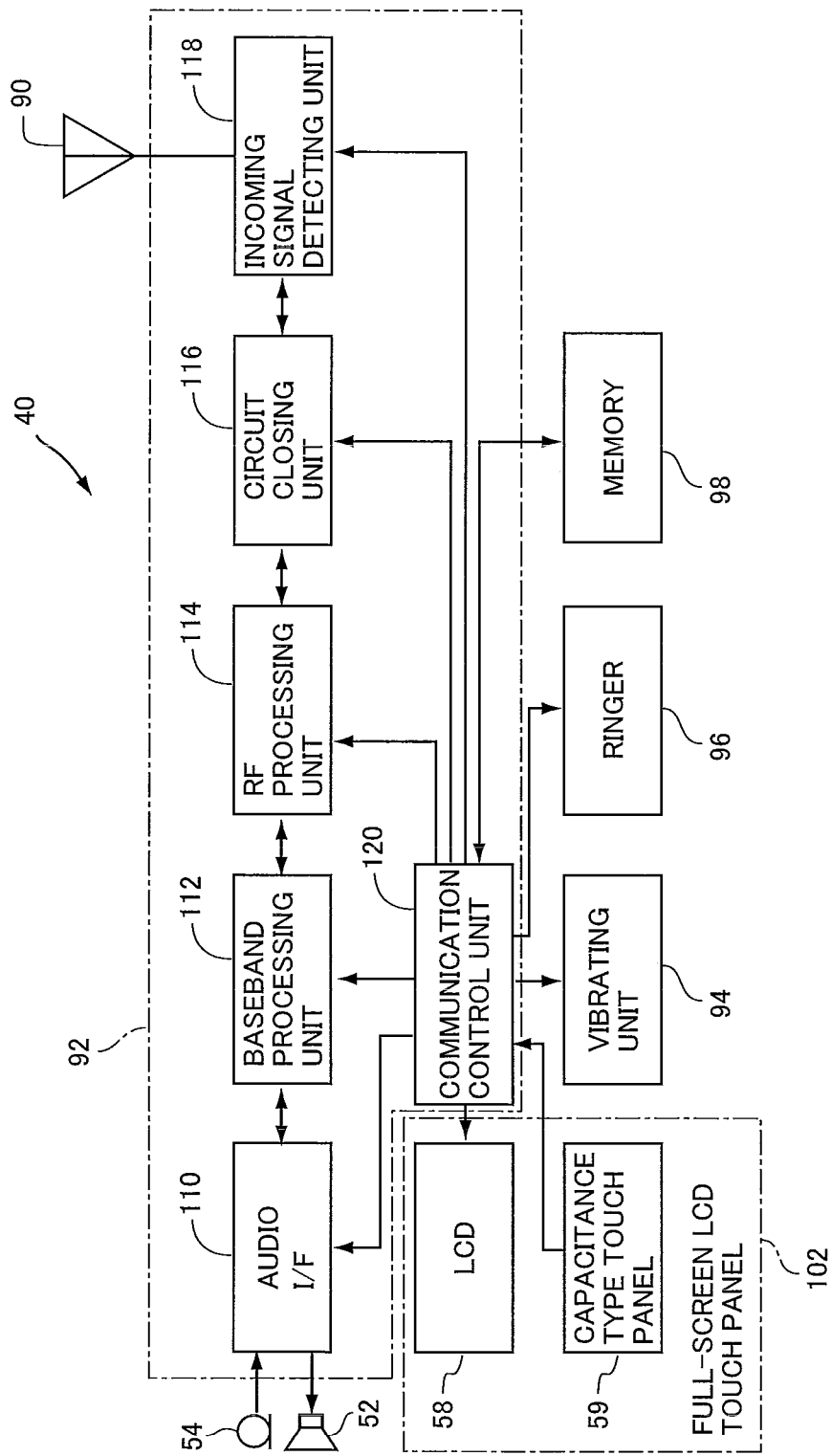
FIG. 10 is a hardware block diagram of portable telephone 40.

FIG. 10 shows, in a block diagram, the hardware configuration of portable telephone 40. Referring to FIG. 10, portable telephone 40 includes: a speaker 52; a microphone 54; a full screen liquid crystal touch panel 102 (LCD 58 and capacitance type touch panel 59) having display screen 56; an antenna 90; a vibrating unit 94; a ringer 96; a non-volatile memory 98 for storing initial setting values of portable telephone 40, a window management/launcher program and various application programs; and a control circuit 92 for realizing, using speaker 52, microphone 54, full screen liquid crystal touch panel 102, antenna 90, vibrating unit 94, ringer 96 and memory 98, the function of portable telephone and functions of activating the plurality of applications, displaying their outputs on the display screen of LCD 58 in the multi-window style unique to the present embodiment, and receiving a user input through capacitance type touch panel 59.

Control circuit 92 includes: an incoming signal detecting unit 118 detecting presence/absence of an incoming call from another portable communication terminal at a different point based on a signal received from a base station through antenna 90 and outputting an incoming call detection signal; a circuit closing unit 116 controlling on/off of a communication circuit though antenna 90 in response to a prescribed control signal; an RF (Radio Frequency) processing unit 114 controlling intensity of signals transmitted to/received from the base station through antenna 90 and circuit closing unit 116; a baseband processing unit 112 for performing a prescribed signal processing on a signal to be applied to RF processing unit 114 and a signal received through RF processing unit, for safe transmission/reception of signals to/from the base station; an audio interface (audio I/F 110) having a DA converter and an AD converter, for audio input/output through microphone 54 and speaker 52; and a communication control unit 120 controlling audio I/F 110, baseband processing unit 112, RF processing unit 114, circuit closing unit 116, full screen liquid crystal touch panel 102, vibrating unit 94 and ringer 96 to enable audio communication between the user and another portable communication terminal by making a telephone call in response to a user request or by processing an incoming call, to enable text communication, and to enable processing of character sequence input by the user.

Communication control unit 120 is substantially formed of a CPU (Central Processing Unit) and software. The software is, in the present embodiment, stored in memory 98, which is read and executed as needed by communication control unit 120. In the present embodiment, though not described in detail, it is possible to rewrite contents of memory 98, and thereby it is possible to up-grade or add various functions of portable telephone 40. Communication control unit 120 further executes the multi-window style window management/launcher program of portable telephone 40 in accordance with the present embodiment.

—Memory Space Configuration—

Figure 11:
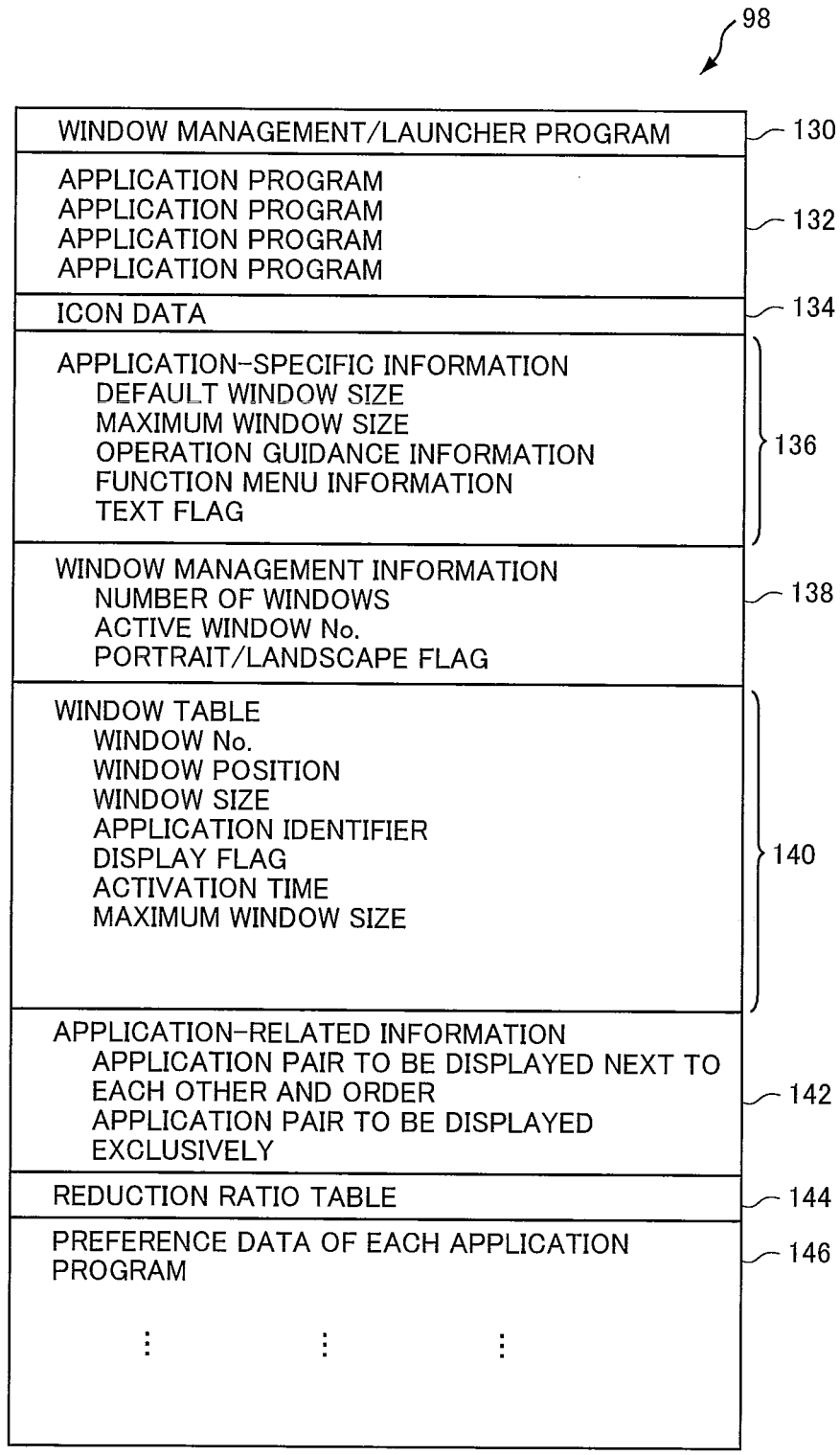
FIG. 11 shows data stored in a memory 98 of portable telephone 40.

FIG. 11 shows configuration of pieces of information stored in memory 98. Referring to FIG. 11, memory 98 includes: a window management/launcher program 130 for performing multi-window type management as will be described later; application programs 132 each managed by window management/launcher program 130; icon data 134 including pieces of icon information each prepared for application programs 132; application-specific information 136 including pieces of information specific to each application program; window management information 138 as an area used for window management by window management/launcher program 130; a window table 140 including pieces of information related to each window, to be used at the time of window management by window management/launcher program 130; application-related information 142 including pieces of information to be specifically defined among applications; a reduction ratio table 144 storing correspondence between priority and window reduction ratio, which is referred to at the time of re-sizing windows; and preference data (initial setting information) 146 for each application. In the following, these will be described. Though areas necessary to perform other operations are secured in memory 98, these areas are not directly related to the present invention and, therefore, description thereof will not be given here.

FIG. 12 shows details of icon data 134. Referring to FIG. 12, icon data 134 includes an icon-window correspondence table 150 and an icon information table 152.

Icon-window correspondence table 150 includes pairs of window Nos. and display positions of icons that are displayed in correspondence to each window No. In the present embodiment, the number of windows is at most 4, and therefore, the number of entries of icon-window correspondence table 150 is also 4. As will be described later with reference to FIG. 8, when an activating icon is added, an entry is added in response, to icon-window correspondence table 150.

Icon-window correspondence table 150 indicates, for example, that the activating icon corresponding to window No. 1 is displayed in a rectangular area defined by upper left coordinates (x11, y11) and lower right coordinates (x12, y12). If coordinates output from capacitance type touch panel 59 when the user touches display screen 56 are within this rectangular area, it can be understood that the activating icon has been touched. It is noted that on display screen 56, the origin of coordinate axes is at the upper left corner, the right side represents the positive direction of x-axis, and the lower side represents the positive direction of y-axis.

Icon information table 152 has a plurality of entries. Each entry corresponds to individual application program. Each entry includes icon data, position data indicating, by the range of y coordinate, at which position in the height direction the icon is positioned (i.e., y-axis) of display screen 56 when the icon should be displayed, and an identifier of the application corresponding to the icon. It can be understood which of the application programs 132 corresponds to the icon, by the application identifier. Icon data includes an icon for normal display, an icon for reversed display (for emphasized display), and an icon mask required when the icon is to be displayed overlapped on another image, as shown in FIG. 12. In the present embodiment, it is possible to drag the icon not only in the widthwise direction but in the height direction. By dragging an icon in the vertical direction, its y-coordinate changes, and therefore, the displayed icon (and hence, corresponding application) changes along with the y-coordinate. In that case, the y-coordinate is assumed to represent the center point of rectangular area represented by the display coordinates in icon-window correspondence table 150. Dragging of an activating icon in the vertical direction will be described later.

Again referring to FIG. 11, application-specific information 136 represents information specific to individual application and includes, for example, a default window size (width), maximum window size, operation guidance information displayed when the corresponding activating icon is pressed long, a function menu displayed when a corresponding operating icon is pressed long, and a text flag indicating whether or not the information displayed by the application can be handled as a text.

The operation guidance information is a piece of information displayed close to the activating icon when the activating icon is pressed continuously for a prescribed time period or longer, as will be described later, and it include an application name corresponding to the icon and an operation method indicating how the application can be started. The function menu is a menu displayed close to an operating icon, when the corresponding icon is pressed continuously for a prescribed time period or longer. The function menu includes menu item names (function names) indicating what functions can be executed in relation to the application, event information for calling an execution code corresponding to a function name, and information for specifying an area on which the menu is displayed.

Further, in the present embodiment, when a window size becomes smaller than a certain size, sometimes the information displayed in the window is displayed as text in an elongate or reduced font, as will be described later. The text flag indicates whether the information can be displayed as text. The display of operation guidance and the text display in elongate or reduced font will be described later.

Window management information 138 includes the number of windows indicating the number of windows that are open, window No. indicating the number (No.) of an active window among the open windows, and a portrait/landscape flag indicating whether the display on portable telephone 40 is in portrait or landscape style. In the present embodiment, it is assumed that when the value of portrait/landscape flag is 0, the display is in landscape style and when it is 1, the display is in portrait style.

Window table 140 represents information related to each window when an application is actually activated. The information related to individual window of the window table includes: window No.; window position indicating x-coordinate at the left end of the window; window size indicating the size of the window when displayed; an identifier of the application executed in the window; a display flag indicating whether or not the window is displayed on display screen 56; time when the application executed in the window was activated; and a maximum window size (width) set for the application that is being executed in the window.

The display flag indicates whether the application window is being displayed or not. Typically, when an application is activated, the corresponding window opens. The display flag is set on when a window opens. Some applications, however, do not end even when the corresponding windows are closed, as will be described later. In such a case, the window information is left as it is, the display flag is turned off, and the window is not displayed. As the information related to the window is maintained, the window can be displayed again in the state before erasure, when the display flag is turned on.

The application-related information is a piece of information for automatically determining, when a plurality of windows are activated, for example, positions of the windows relative to each other. By way of example, assume that one inputs e-mail text using a mail program while viewing a map on a web browser. In such a situation, it is desirable to have these two applications positioned next to each other. For such applications that should desirably be positioned next to each other, the application pair and the order of display, if necessary, are defined here. There is also a situation that simultaneous execution of one application and another is limited by some definition. If one said application should be activated while the other application has been activated, it becomes necessary to end the application that has been activated earlier, or at least to close the corresponding window. Combination or combinations of such applications are also described here.

Figure 14:
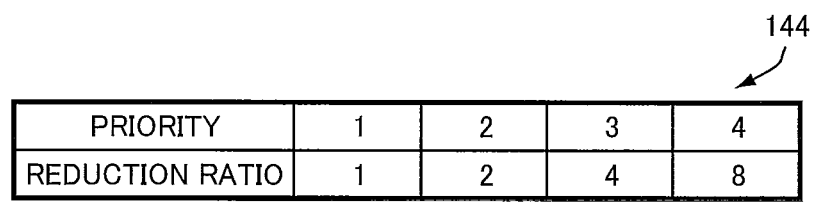
FIG. 14 shows an exemplary relation between priority and reduction ratio of each window, used when windows are re-sized.

FIG. 14 shows an example of reduction ratio table 144. The "priority" shown in FIG. 14 represents the priority to ensure the size when windows are re-sized. In the present embodiment, priority of 1 to 4 are allocated to respective windows such that the window that is opened later comes to have higher priority. The value of reduction ratio corresponding to each priority is used for determining the dimensions after re-sizing. The smaller reduction ratio means less amount of reduction of the window at the time of resizing, and larger ratio means much reduction.

Figure 13:
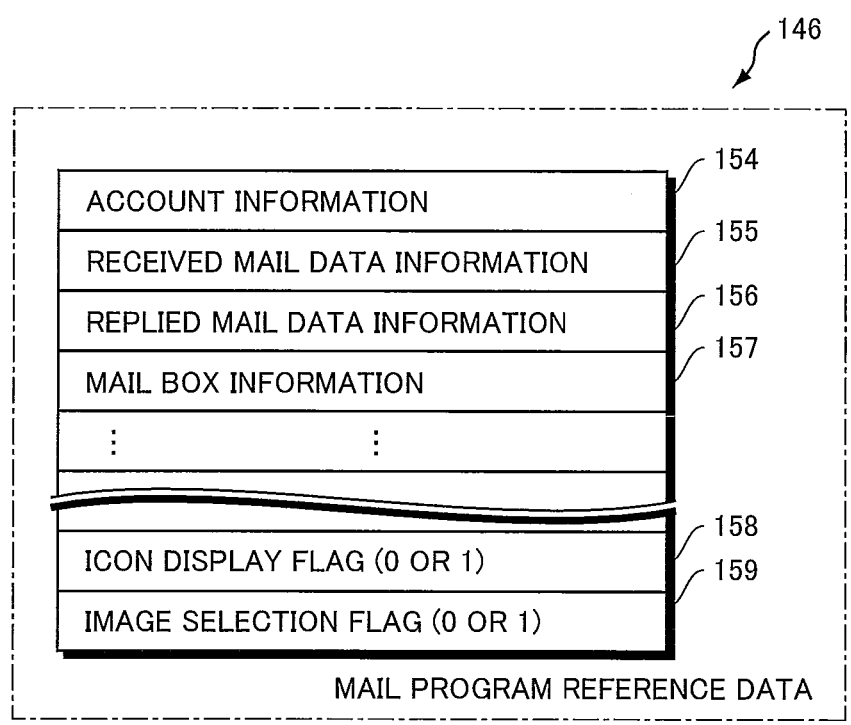
FIG. 13 shows an exemplary structure of preference data 146 of a mail program.

FIG. 13 shows an exemplary configuration of mail program preference data 146. Referring to FIG. 13, preference data 146 includes: mail user account information 154; received mail data information 155 storing the number of received mails, a link to a received mail file and the like; sent mail data information 156 storing the number of sent mails, a link to a sent mail file and the like; and mail box information 157 storing pieces of information related to a mail box formed by the user. Preference data 146 may include various other pieces of information and, in the present embodiment, it further includes: icon display flag 158 designating whether an icon is to be displayed normally or reversed, and an image selection flag 159 for designating an image to be displayed first when a mail program is activated while no mail has been received.

The value of icon display flag 158 is 0 or 1. When it is 0, icon display flag 158 indicates that the activating icon of mail program is to be displayed in a normal manner, and when it is 1, it indicates that the icon should be displayed in a reversed manner. The icon is displayed in the reversed manner when, for example, occurrence of a mail reception event is to be notified to the user while the mail program is not activated or activated but not displayed.

The value of display selection flag 159 is also 0 or 1. As described above, if the mail program is activated by a received mail and the value of image selection flag 159 is 0, an image for forming a new mail is displayed. If the value of image selection flag 159 is 1, an image of function list is displayed. The value of image selection flag 159 may be freely set by the user. The program for setting the value of image selection flag 159 may be realized by known configurations and, therefore, details thereof will not be described here.

Figure 15:
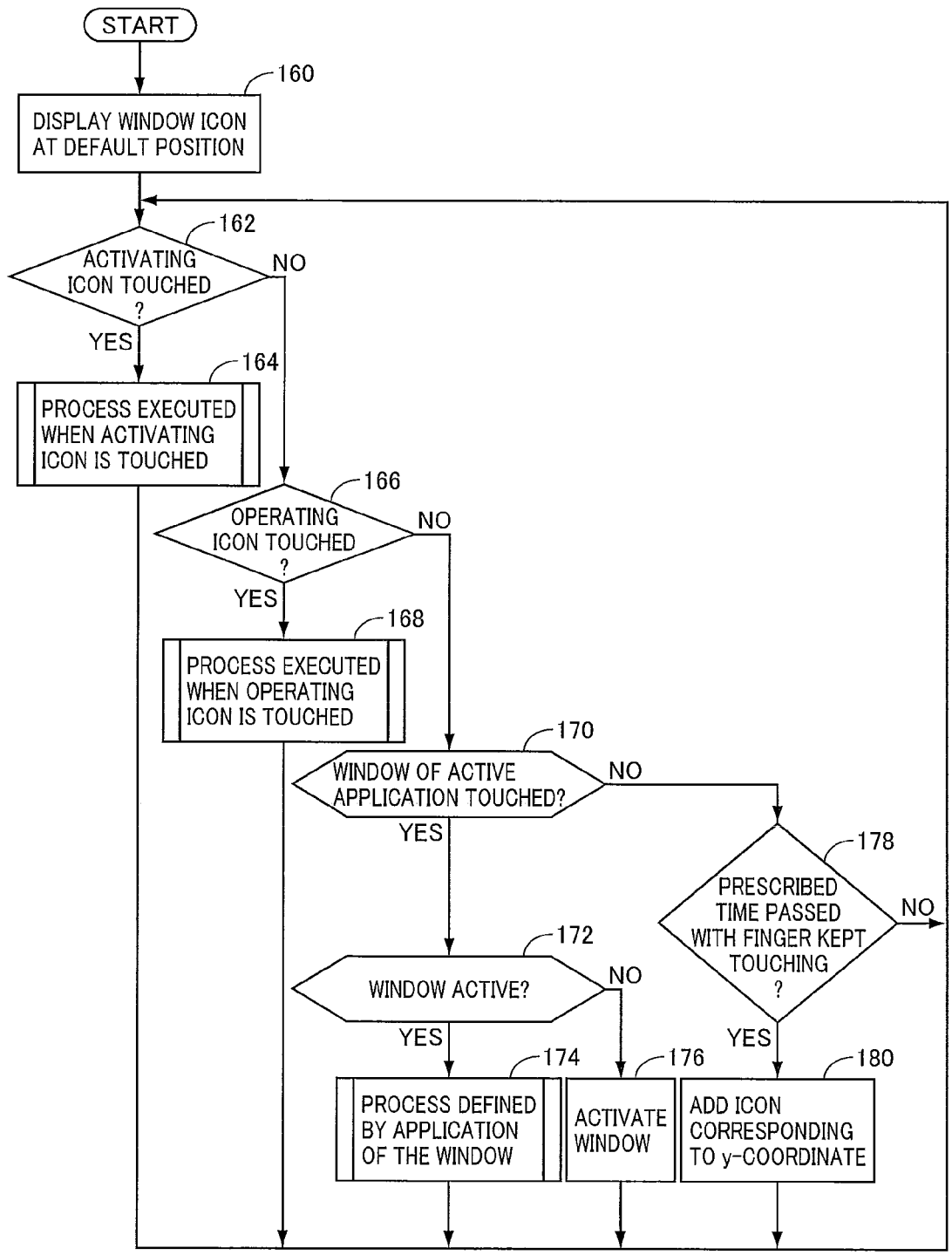
FIG. 15 is a flowchart representing a main routine of a window management/launcher program realizing the multi-window system of portable telephone 40.

FIG. 15 and after represent a flowchart of window management/launcher program 130 shown in FIG. 11. In the following, the control structure of window management/launcher program 130 will be described assuming that the display is in landscape style. Portrait display is also possible through similar control. Actually, window management/launcher programs 130 for landscape and portrait styles may be prepared separately and used in accordance with a landscape/portrait flag, or one program may be used with display switched with reference to the landscape/portrait flag at various portions of the program. In the following, description in connection with determination as to the landscape/portrait flag is not given for easier understanding.

<Software Configuration>

In the following, the control structure of a computer program for the window management and launcher executed by communication control unit 120 shown in FIG. 10 will be described with reference to FIG. 15 and after. In the following description, it is assumed that the user input is through a so-called graphical user interface (hereinafter denoted as "GUI"). Specifically, icons and the like are displayed at prescribed positions on the screen, and the positions are stored. When the user touches capacitance type touch panel 59, determination is made as to which display area of which icon corresponds to the touched position, whereby the operated icon is identified and the process corresponding to the icon is executed.

FIG. 15 shows a control structure of a main flow of window management/launcher program 130 executed by communication control unit 120. Referring to FIG. 15, the program includes: a step 160 of displaying, immediately after activation of the program, on display screen 56 shown in FIG. 4, icons corresponding to application programs 132 shown in FIG. 11 at respective default positions; and a step 162, following step 160, of determining whether the user has touched an activating icon or not (whether there is an output of coordinate values indicating the touched position from capacitance type touch panel 59 shown in FIG. 10 and whether the output corresponds to a display position of any of the activating icons).

If it is determined at step 162 that any of the activating icons has been touched, control proceeds to step 164, and otherwise, control proceeds to step 166.

Figure 16:
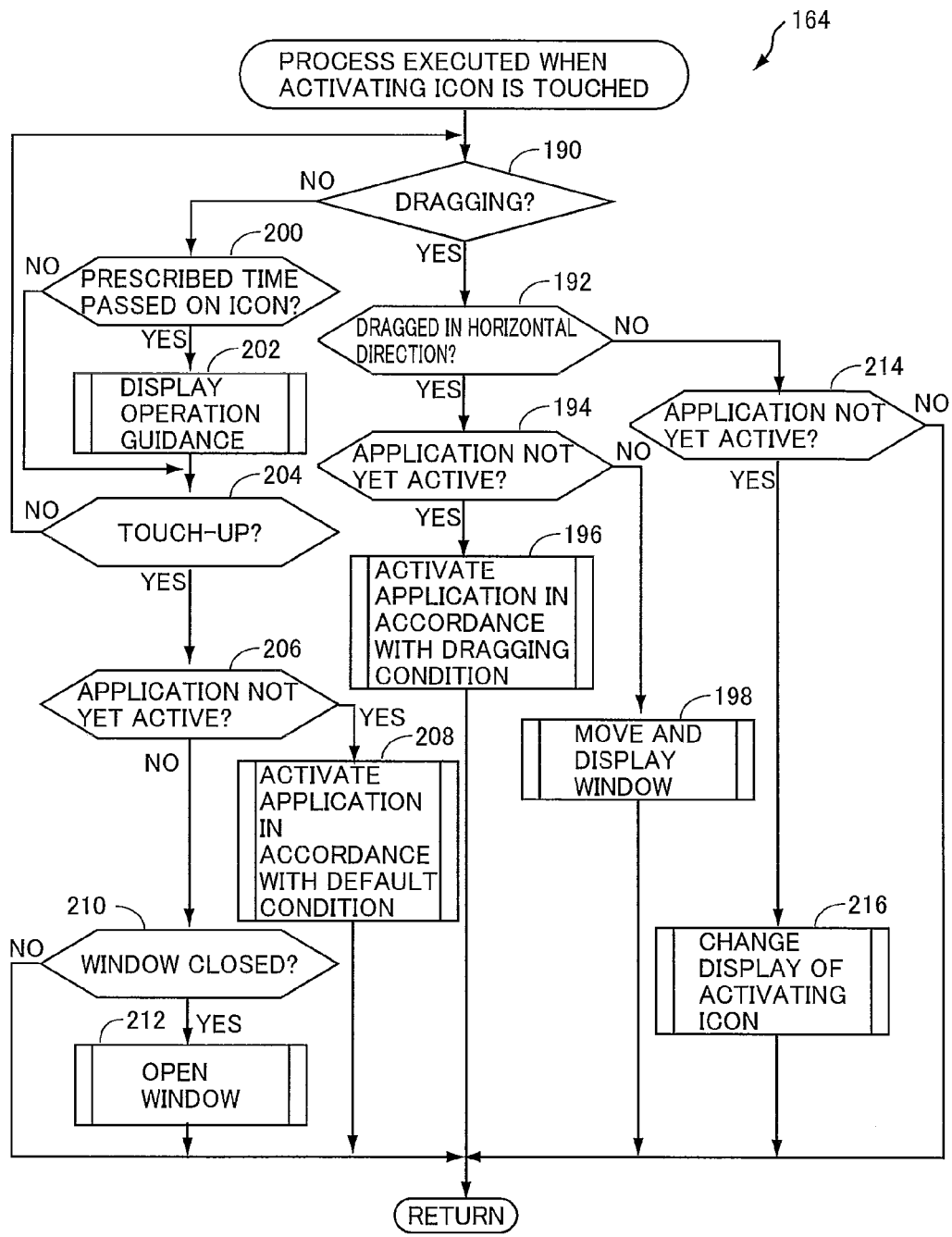
FIG. 16 is a flowchart of a program realizing a function when an activating icon is touched.

At step 164, a process in response to touching (of opening the window and activating the application) is executed, for the touched activating icon. Thereafter, control returns to step 162, to make the next determination. The process of steps 160 to 164 corresponds to the program launcher. Details of step 164 are shown in FIG. 16, and will be described later.

If it is determined at step 162 that activating icons are not touched, determination is made at step 166 as to whether any operating icon displayed on display screen 56 has been touched or not. If there is, the flow proceeds to step 168 and if not, to step 170.

The process performed at step 168 is performed when an operating icon is touched. Specifically, what operation has been done on the operating icon is determined, and a process corresponding to the operation is performed, on the window corresponding to the operating icon. Details thereof will be described with reference to FIG. 19.

At step 170, whether or not any of the windows of active applications has been touched is determined. If there is, control proceeds to step 172. Otherwise, control proceeds to step 178.

At step 172, whether the window that has been touched by the user is active or not is determined, in accordance with the active window No. of window management information 138 shown in FIG. 11. If the window is active, the flow proceeds to step 174, and if it is not active, to step 176.

That the window is active means that some operation has been designated on the application corresponding to the window. At step 174, information related to the touched position is passed to the application, and the process defined by the application is executed. The process defined by the application is not directly related to the window management/launcher program 130 and, therefore, details thereof will not be described here. After the end of processing at step 174, control returns to step 162.

On the other hand, at step 176, it follows that the touched window is not active. Therefore, a process for activating the window, that is, a process for setting the window No. to the active window No. in window management information 138 of FIG. 11, is performed. Thereafter, control returns to step 162.

Further, at step 178, whether or not a prescribed time period has passed while the display screen has been continuously touched by the user is determined. If the determination is YES, control proceeds to step 180. Otherwise, that is, if the user has not touched the display screen, or the user touched an area other than any icon or window but duration is not longer than the prescribed time period, control returns to step 162.

At step 180, in response to the user's touching the area on the display screen that is not an icon or window for a prescribed time period or longer, a new icon is displayed at that position. As the newly displayed icon, one corresponding to a predetermined application determined in advance for the coordinate position (y coordinate position) on the shorter side of the touched position is selected, and the said application is allocated to the icon. After step 180, control returns to step 162.

Repeated execution of processes from step 162 to step 180 realizes the window management/launcher function utilizing multiple windows on portable telephone 40.

<<Process when Activating Icon is Touched>>

FIG. 16 shows details of the control structure of the program when an activating icon is touched, executed at step 164 of FIG. 15. Referring to FIG. 16, when the program is activated, at step 190, whether or not the operation by the user on display screen 56 is a drag is determined. This determination is done dependent on whether there is a continuous output from capacitance type touch panel 59 with the touched position coordinates indicated by the output changing. If it is determined to be a drag operation, control proceeds to step 192, and otherwise, to step 200.

At step 200, whether the position touched by the user is fixed and a prescribed time has passed on the activating icon or not is determined. If the prescribed time period has passed in this state, it means that the user is continuously designating the icon for the prescribed time period or longer. In the present embodiment, in such a case, an operation guidance prepared in advance for the icon is displayed close to the icon (step 202). The operation guidance is prepared beforehand as a part of application-specific information 136 shown in FIG. 11. Thereafter, control proceeds to step 204. If the duration of touching on the icon is shorter than the prescribed time period, the process of step 202 does not take place, and the flow directly proceeds to step 204.

At step 204, whether or not there has been a touch-up is determined, that is, whether a signal indicating a touch and indicating coordinates of the touched position, that has been output from capacitance type touch panel 59, is lost is determined. If there is no touch-up, control returns to step 190. If there is a touch-up, it means that the user one-touched the icon, and then control proceeds to step 206.

At step 206, whether the application corresponding to the icon has been inactive or not is determined. If the application has been inactive, it is necessary to newly open a window and to activate the application. If the application has been activated, a process in accordance with the state of the window must be done. If the application is inactive, control proceeds to step 208, and otherwise, to step 210.

At step 208, the application corresponding to the icon is activated. In that case, however, the window size is set to the default size, and on the right side of the window, at the same position as the activating icon, an operating icon having the same design, that is, the same shape as the activating icon, is displayed. Further, other activating and operating icons that have been displayed on the right side of the activating icon of interest are re-arranged and displayed at positions shifted to the right by the amount corresponding to the default size. Then, the process corresponding to the touching of activating icon ends.

At step 210, whether or not the window of the activated icon is closed is determined. If the window is closed, the window must be opened. If the window of the activated application is closed, the flow proceeds to step 212, and otherwise, the process corresponding to the touching of activating icon ends.

At step 212, the window corresponding to the activated application is opened. It is noted, however, that the window size of the application is the default size, and on the right side of the window, at the same position as the activating icon, an operating icon having the same design, that is, the same shape as the activating icon, is displayed. Thereafter, the process corresponding to the touching of activating icon ends.

On the other hand, if the touching of display screen 56 by the user is determined to be a dragging operation at step 190, the following process is performed from step 192.

At step 192, whether the dragging direction is horizontal or not is determined. More specifically, whether or not the position to which the icon has been dragged has been changed in the horizontal direction than the original display position of the activating icon is determined. By way of example, if difference between the x coordinate of the dragged position of the activating icon and the original x coordinate is larger than a prescribed threshold value, the dragging direction is determined to be the horizontal direction, and otherwise, it is determined to be the vertical direction. If the dragging direction is determined to be horizontal, control proceeds to step 194 and otherwise, control proceeds to step 214.

At step 194, whether the application corresponding to the activating icon is inactive or not is determined. If the application has been inactive, it is necessary to open a new window. If the application has been already activated and the window is open, it is necessary to move the window by dragging, as will be described later. If the application is inactive, the flow proceeds to step 196, and otherwise, to step 198. It is possible that the application has been activated but the window is not open. In that case, the process of step 196 is executed.

At step 196, a new window is displayed in a window size corresponding to the drag distance, and a process of activating (or resuming) the application corresponding to the activating icon is executed (as will be described later). Thereafter, the process in response to touching of the activating icon ends.

Figure 20:
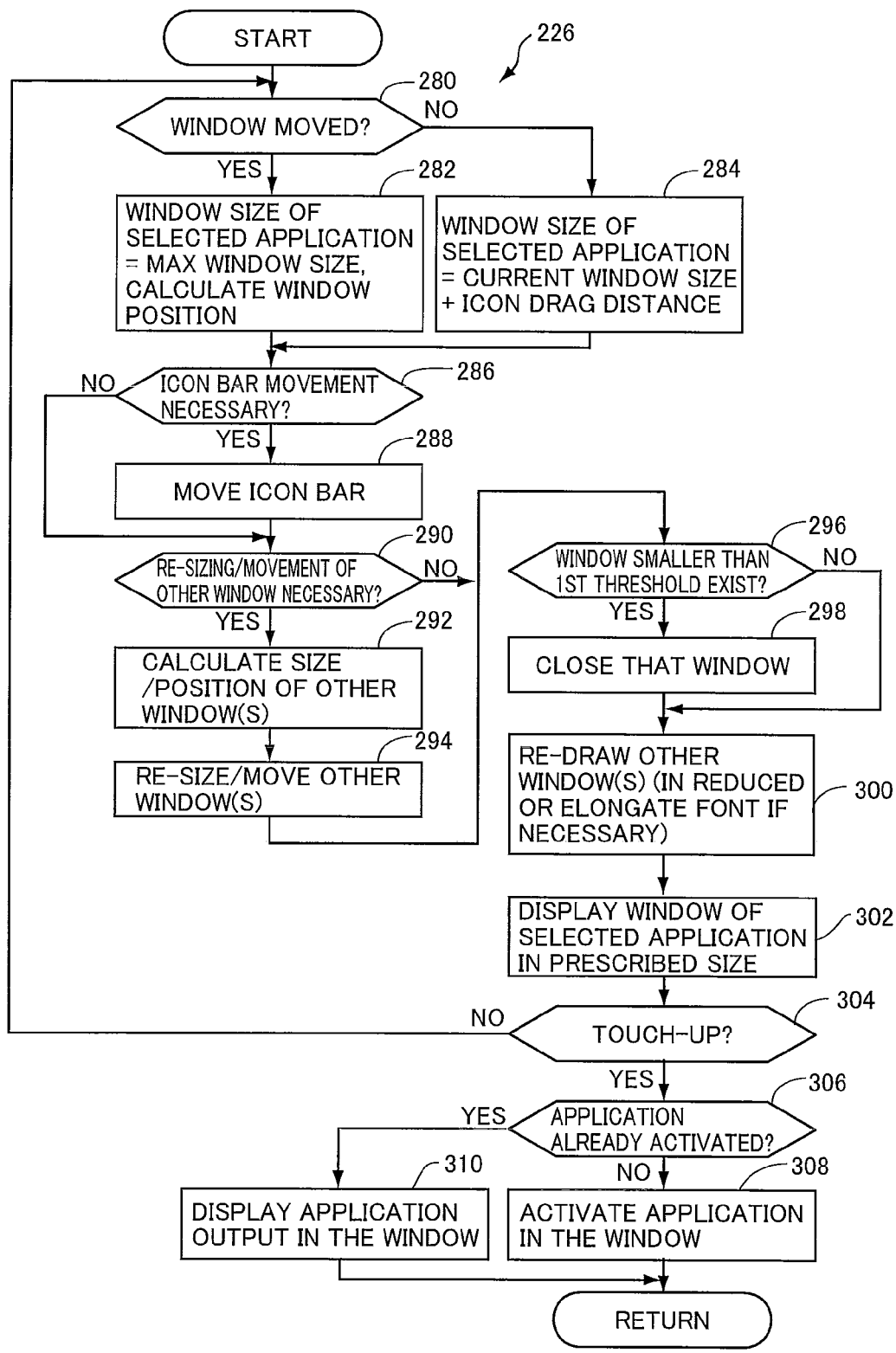
FIG. 20 is a flowchart of a program realizing a function of re-sizing/moving a window by dragging an operating icon.

At step 198, the window of the activating icon is moved in accordance with the drag distance, and if re-sizing and movement of other window or windows become necessary as a result, a process for that purpose is executed. The process for re-sizing and moving other window is the same as the process for re-sizing and moving other window when the operating icon is dragged. Therefore, details of this process will be described later with reference to FIG. 20 showing the dragging of operating icon.

At step 214, whether or not the application corresponding to the icon has been inactive is determined. If the application is inactive, it is necessary to change the display of the activating icon, and if the application has been activated, no further processing is necessary. If the application is inactive, the flow proceeds to step 216, and otherwise, the process in response to touching of the activating icon ends.

At step 216, in accordance with the y coordinate of the dragged position of the icon, the activating icon is changed to one that corresponds to the new y coordinate, and displayed. The y coordinate, the icon and the corresponding application are stored in icon data 134 shown in FIG. 11. Details are as shown in FIG. 12. Details of step 216 will be described later with reference to FIG. 18. After the process of step 216, the process in response to touching of the activating icon ends.

<<Application Activating Process Under Dragging Conditions>>

Figure 17:
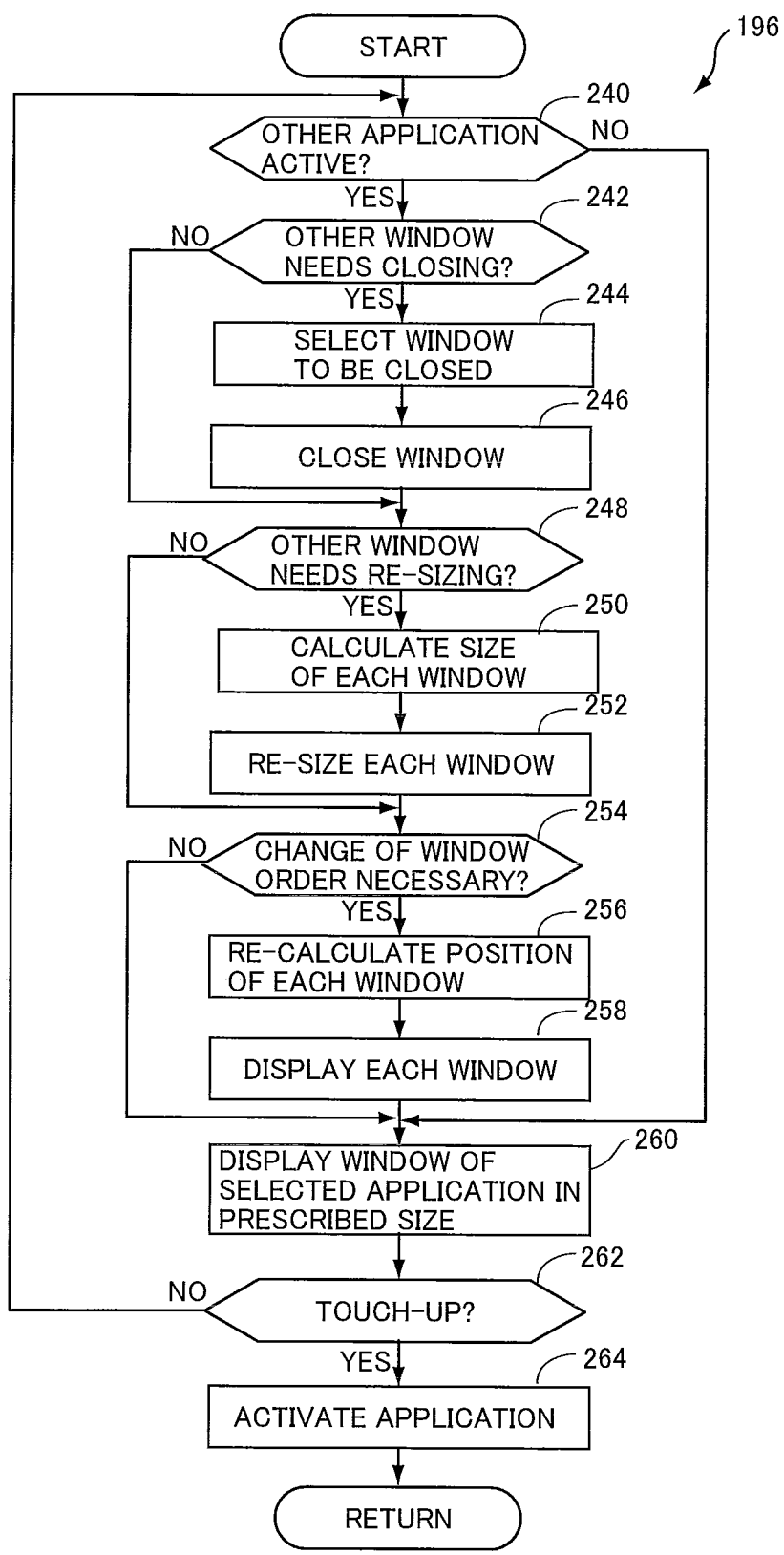
FIG. 17 is a flowchart of a program realizing a function of activating an application by dragging an activating icon.

FIG. 17 shows a control structure of a program executed at step 196 of FIG. 16. The process executed at step 208 of FIG. 16 is substantially the same. It is noted, however, that in the process executed at step 208, size of the newly opened window is the default size, rather than the size determined by the dragged distance.

Referring to FIG. 17, when the process is activated, whether or not any other application is activated is determined at step 240. If no other application is activated, control proceeds to step 260. If any other application is activated, the flow proceeds to step 242.

At step 242, whether it is necessary to close other window or not is determined. This process is done with reference to application-related information 142 in memory 98 shown in FIG. 11. More specifically, whether the application to be activated and the application that has already been displayed on the window are designated as the application pair to be displayed in exclusive manner or not in application-related information 142 is determined. If they are so designated, the flow proceeds to step 244, and if not so designated, the flow proceeds to step 248.

At step 244, of the applications designated as the pair of applications to be displayed in exclusive manner, the window that has been already opened is selected, and at step 246, the window is closed. In response to the closing, here, display positions of other icons are changed. Then, the flow proceeds to step 248.

At step 248, in order to display a window from now in a window size in accordance with the drag distance, whether or not it is necessary to re-size any other window is determined. More specifically, whether or not the sum of lateral sizes of windows that are displayed at present, the lateral size of the window to be opened and intervals between windows exceeds a prescribed threshold value corresponding to the width of display screen 56 is determined. If the sum exceeds, the lateral size of the window to be opened from now is kept as designated, while windows that are already displayed must be re-sized. If it is determined that re-sizing of other window or windows is necessary, the flow proceeds to step 250. Otherwise, the flow proceeds to step 254.

Figure 30:
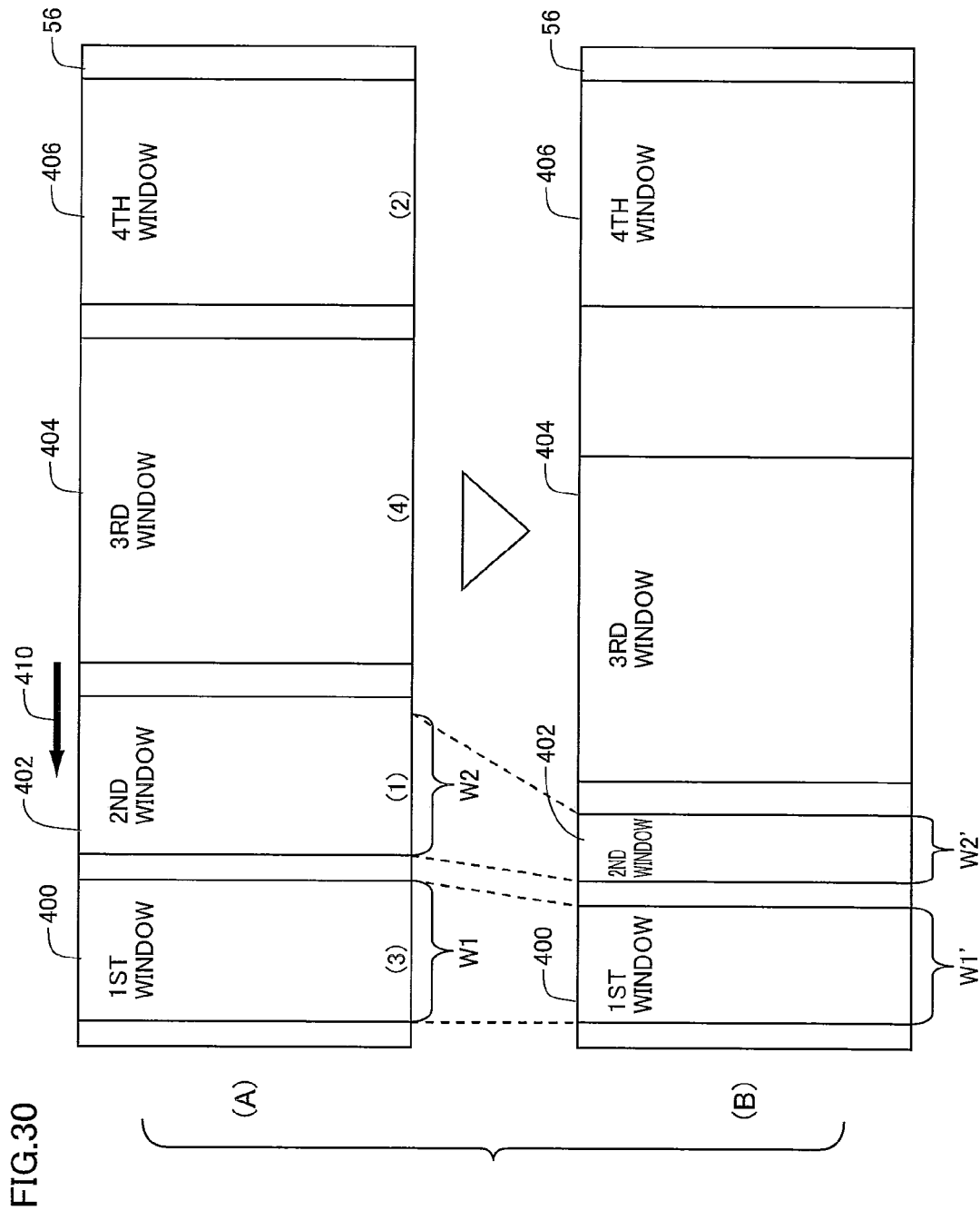
FIG. 30 illustrates how other windows are re-sized when a certain window is re-sized.

At step 250, new size for each window is calculated. Examples of the calculating method will be described later with reference to FIGS. 30 and 14. Thereafter, at step 252, in accordance with the window size calculated at step 250, other windows are re-sized. In the present embodiment, as the windows are re-sized, the contents displayed in the windows are also re-sized on the same scale. Thereafter, the flow proceeds to step 254.

At step 254, whether or not the order of display (order of display starting from the left side of display screen 56) is to be changed is determined. The determination is done for the purpose of arranging a pair of applications such as a mail program and a text input window, of which arrangement next to each other is desirable, to be displayed side by side and thereby to ease input. More specifically, with reference to the application-related information 142 shown in FIG. 11, whether or not there is any application that is designated to be displayed next to the application to be activated, among the applications that are being executed on already opened windows is determined. If there is such an application, control proceeds to step 256, and otherwise control proceeds to step 260.

At step 256, the position to display the window designated by application-related information 142 is changed such that it is placed next to the newly opened window in the order designated by application-related information 142, and the display positions of all windows are accordingly calculated again. Next, at step 258, existing windows are displayed in accordance with the re-calculated window positions. Then, the flow proceeds to step 260.

At step 260, at the position re-calculated at step 256, the new window is opened in a prescribed size that corresponds to the drag distance.

Thereafter, whether there has been a touch-up or not is determined at step 262. If there has been a touch-up, the flow proceeds to step 264, and if not, the flow returns to step 240.

At step 264, an application corresponding to the dragged activating icon is activated in the window opened at step 260, and the process ends.

As described above, the process executed at step 208 of FIG. 16 is substantially the same as the process shown in FIG. 17, except that the size of window to be newly opened at step 260 is not determined by the drag distance but determined in advance for the application, and specifically the default window size stored in application-specific information 136 shown in FIG. 11 is used.

<<Activating Icon Display Changing Process>>

Figure 18:
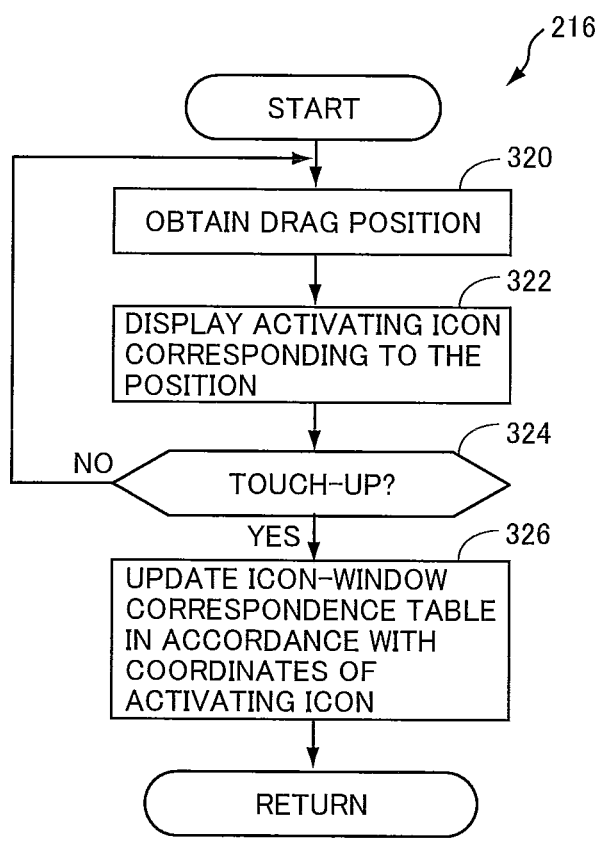
FIG. 18 is a flowchart of a program realizing a function of changing display of an activating icon when the activating icon is dragged in the vertical direction.

FIG. 18 shows, in the form of a flowchart, a control structure of a program realizing the process for changing display of the activating icon, performed at step 216 of FIG. 16. Referring to FIG. 18, first, at step 320, coordinate values of dragged positions pressed by a finger on display screen 56 are obtained from outputs of capacitance type touch panel 59. In the following step 322, display of the activating icon to that time point is erased, and the activating icon is drawn on the position defined by the coordinate values obtained at step 320. At step 324, whether there has been a touch-up or not is determined. If there is, the flow proceeds to step 326, at which the icon-window correspondence table 150 is updated in accordance with the coordinates of the activating icon at the time of touch-up, and the process ends. If there has been no touch-up and the dragging is continued, the flow returns to step 320, and the change of display of the activating icon related to dragging of the activating icon is continued.

<<Process when Operating Icon is Touched>>

Figure 19:
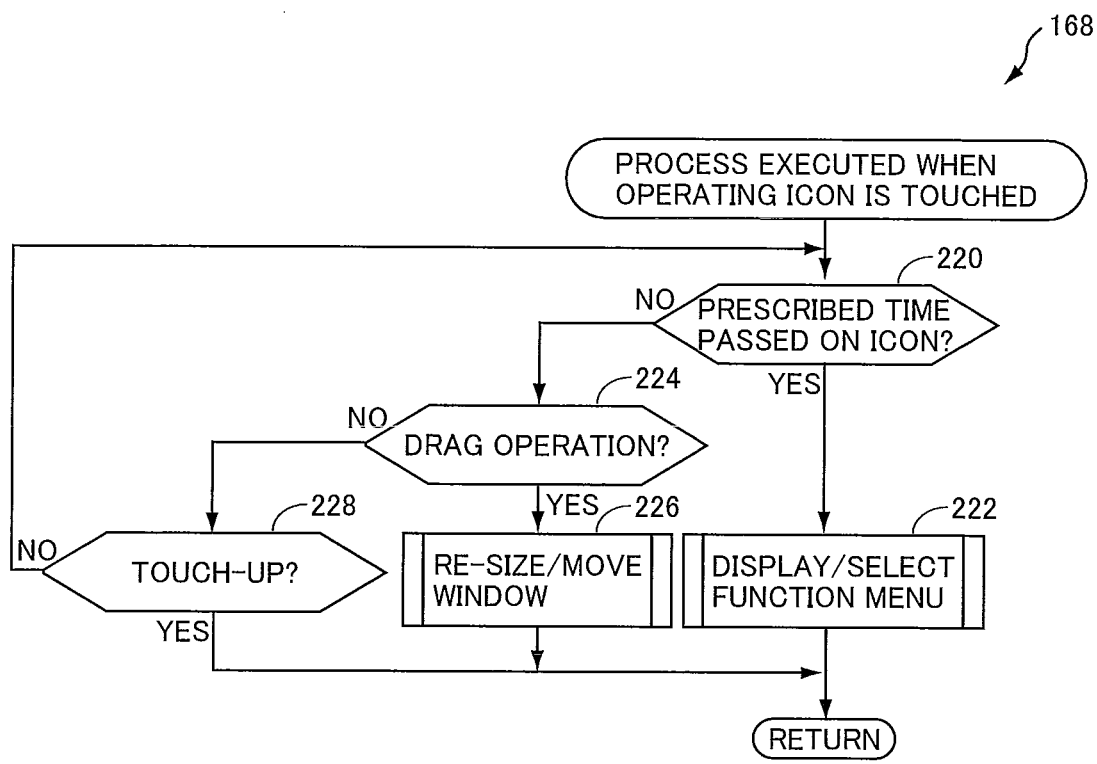
FIG. 19 is a flowchart of a program realizing a function when an operating icon is touched.

FIG. 19 shows details of the process when the operating icon is touched, executed at step 168 of FIG. 15. Referring to FIG. 19, at step 220, whether or not a prescribed time period has passed after the icon was touched, with the touched position not moved from the icon, is determined. If the prescribed time period has passed, the flow proceeds to step 222. Otherwise, the flow proceeds to step 224.

At step 224, whether the touched position has been moved or not, that is, whether dragging operation is being done or not is determined. If the dragging operation is being done, control proceeds to step 226. If the dragging operation is not being done, control proceeds to step 228. At step 228, whether there has been a touch-up or not is determined, and if there is no touch-up, the flow returns to step 220. If there has been a touch-up, the process ends.

When the processes at steps 222 and 226 end, the process executed when operating icon is touched ends. Details of these process steps will be described later.

<<Window Resizing/Moving Process>>

FIG. 20 shows, in the form of a flowchart, a control structure of the program realizing window resizing/moving process executed at step 226 of FIG. 19. The process is common to the process executed at step 198 of FIG. 16. The processes are different, however, in that in the process of step 226 shown in FIG. 19, both moving and re-sizing of the window are performed, while in the process of step 198 shown in FIG. 16, only the window re-sizing (process of newly opening a window) is performed.

Referring to FIG. 20, in this process, at step 280, determination is made as to whether the process to be done is window moving process or window re-sizing process. More specifically, the determination is done by checking whether or not the new window size calculated as a result of dragging the operating icon (at step 226 of FIG. 19) or the activating icon (step 198 of FIG. 16) exceeds the maximum window size (see window table 140 of FIG. 11) determined in advance for the application corresponding to the window. If the new window size is equal to or smaller than the maximum window size, window re-sizing process is performed, and if it is larger than the maximum window size, window moving process is done, with the window size set to the maximum size.

When the window moving process is to be done, control proceeds to step 282, and when re-sizing is to be done, control proceeds to step 284.

At step 282, the window size of the selected application is set to the maximum window size, and the window position is calculated based on the maximum window size, the drag distance, and the current position of the window (when an activating icon has been dragged, the position of the activating icon). At step 284, the window size of the selected application is calculated based on the current window size (if an activating icon has been dragged, the current window size is set to =0) and the drag distance. In either case, at the end of calculating process, the flow proceeds to step 286.

At step 286, whether or not it becomes necessary, as a result of window re-sizing or moving, to move an icon bar of an activating ion that corresponds to a not-yet-activated application is determined. If it is necessary, the flow proceeds to step 288, at which icon bar or icon bars of such icon or icons are moved, and the flow proceeds to step 290. If it is unnecessary, the flow directly proceeds to step 290.

At step 290, whether or not it becomes necessary, as a result of window re-sizing or moving, to re-size or move other window is determined. When the size of a window is enlarged or a window is moved, sometimes it becomes impossible to display all the windows, unless sizes of other windows are reduced. In such a case, the flow proceeds to step 292 at which the size and position of each window is calculated, and at step 294, each window is re-sized in accordance with the calculated result. Thereafter, the flow proceeds to step 296. If re-sizing of other windows is unnecessary, the processes at steps 292 and 294 are not performed, and the flow proceeds to step 296. The calculation of window size and position performed at step 292 is the same as that performed at step 250 of FIG. 17.

At step 296, whether or not there is a window of which width becomes smaller than a prescribed first threshold value as a result of window size re-calculation described above is determined. If the window width becomes too small, identification of contents displayed in the window becomes difficult, and hence, continued display of such a window would be meaningless. Therefore, if the window width becomes smaller than the first threshold value, the window is closed. The first threshold value is determined to be an appropriate value in advance. In the present embodiment, though the window is closed, the corresponding application is not terminated. Therefore, if it becomes possible to re-size the window by some process or other, it is possible to re-open the window.

If there is any window whose width is smaller than the first threshold value, the window is closed at step 298, and the flow proceeds to step 300. If there is no window whose width is smaller than the first threshold value, the flow directly proceeds to step 300 without any processing. At step 300, contents of each window are re-drawn to be fit after re-sizing. At this time, whether or not there is any window of which corresponding application outputs text and whose width is smaller than a second threshold value larger than the first threshold value is determined. If there is any such window, the contents of the text are poured into the window in an elongate or reduced font. For other window or windows, the output is reduced or enlarged in accordance with the window size and displayed. At step 302, the window of the selected application is displayed in a prescribed size determined by the dragging of the operating icon and the maximum window size.

Here, the pouring of the text here refers to a process in which the text is displayed successively in the window, when the text reaches the window width (or text area width smaller than the window width), a linefeed is inserted and display of text is further continued, and these operations are repeated until the text reaches the lower end of the window.

In the following step 304, whether there has been a touch-up or not is determined. If there has been a touch-up, the flow proceeds to step 306. If there is no touch-up, the flow returns to step 280, and the process associated with dragging of the operating icon is continued.

At step 306, whether or not an application corresponding to the window that is being processed has already been activated is determined. The determination is made, since at step 198 shown in FIG. 16, an application is newly activated whereas at step 226 of FIG. 19, the application has been already activated and new activation is unnecessary. The determination can be made using the information of icon data 134 and the information of window table 140, shown in FIG. 11. If it has been already activated (that is, if the process shown in FIG. 20 has been called at step 226 of FIG. 19 by the dragging of an operating icon), the flow proceeds to step 310, at which the output of the application is again displayed on the window that is being processed. If the application has not yet been activated (that is, if the process shown in FIG. 20 has been called at step 198 of FIG. 16), the flow proceeds to step 308, and the application is activated in the window. Then, the process ends.

<<Function Menu Displaying/Selecting Process>>

Figure 21:
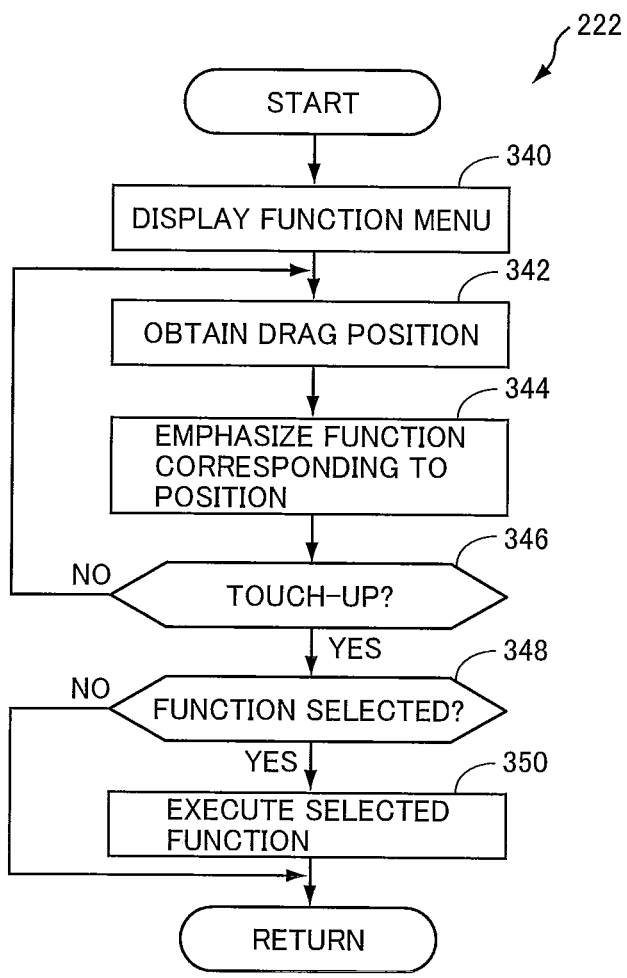
FIG. 21 is a flowchart of a program realizing a function menu displaying/selecting function executed at step 222 of FIG. 19.

FIG. 21 is a flowchart of a program realizing the function menu displaying/selecting process executed at step 222 of FIG. 19. Referring to FIG. 21, in this process, at step 340, close to the operating icon that is touched by the user, a function menu determined for the application corresponding to the operating icon is displayed. The function menu is included in the application-specific information 136 of FIG. 11.

Thereafter, at step 342, the coordinates of the dragging finger position of the user are obtained from the outputs of capacitance type touch panel 59. At step 344, of the displayed function menu, only the function name at the position corresponding to the obtained coordinates is displayed in an emphasized manner, and other function names are displayed in a normal manner. By this process, it is possible for the user to know what function of the menu he/she is going to select.

At step 346, whether or not there has been a touch-up is determined. If there has been a touch-up, the flow proceeds to step 348 and otherwise, the flow returns to step 342.

At step 348, the finger position at the time of touch-up is obtained from the outputs of capacitance type touch panel 59, and whether or not the position is within a rectangular area in which any function is displayed in the function menu displayed at step 340 is determined. If it is determined that the touch-up is made in the rectangular area having any function name displayed therein, control proceeds to step 350. Otherwise, the process ends without any further operation.

At step 350, the function that corresponds to the area including the touched-up position is executed. More specifically, an event is generated based on the event information corresponding to the area in the function menu, and it is passed to the corresponding application. When execution of this function is completed, the process ends.

<<Display Switching Process>>

Figure 22:
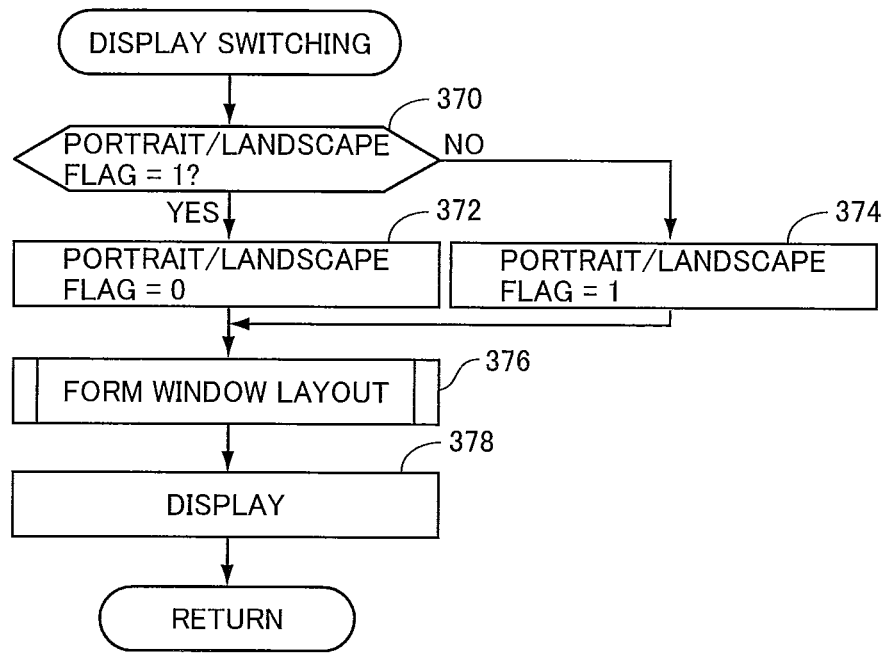
FIG. 22 is a flowchart of a program realizing a display switching function between portrait display and landscape display.

As already described, portable telephone 40 allows switching between portrait and landscape displays using display screen 56. The foregoing description has been mainly related to the landscape display. Portrait display is also possible in the similar manner. It is noted, however, that the portrait display and landscape display must be switched using some means or other. In the present embodiment, a display switching button is always kept displayed on display screen 56 for switching between the portrait/landscape displays, and the portrait display and landscape display are switched when the display switching button is pressed. FIG. 22 shows, in the form of a flowchart, the control structure of the display switching program.

Referring to FIG. 22, the program is activated when the user presses the display switching button mentioned above. First, at step 370, whether a portrait/landscape flag is 1 or not is determined. The portrait/landscape flag is included in window management information 138 of FIG. 11, and if it is 1, it indicates that display on portable telephone 40 is in portrait style, and if it is 0, it indicates that the display is in landscape style.

If the portrait/landscape flag is 1, at step 372, the value of portrait/landscape flag is updated to 0. If the portrait/landscape flag is 0, at step 374, the value of portrait/landscape flag is updated to 1. In either case, the flow then proceeds to step 376.

At step 376, in accordance with the value of portrait/landscape flag, the window layout is formed in the portrait or landscape style. The layout here can be formed by using parameters before switching the portrait/landscape flag. In accordance with the formed window layout, at step 378, each window is displayed. As already described, for the portrait display and for the landscape display, different programs may be used, or one program may be used with the layout changed between the portrait and landscape styles with reference to the value of portrait/landscape flag when the layout is formed. Though the latter approach is used in the present embodiment, the change in the process depending on the portrait/landscape style is not discussed, for simplicity of description.

Figure 23:
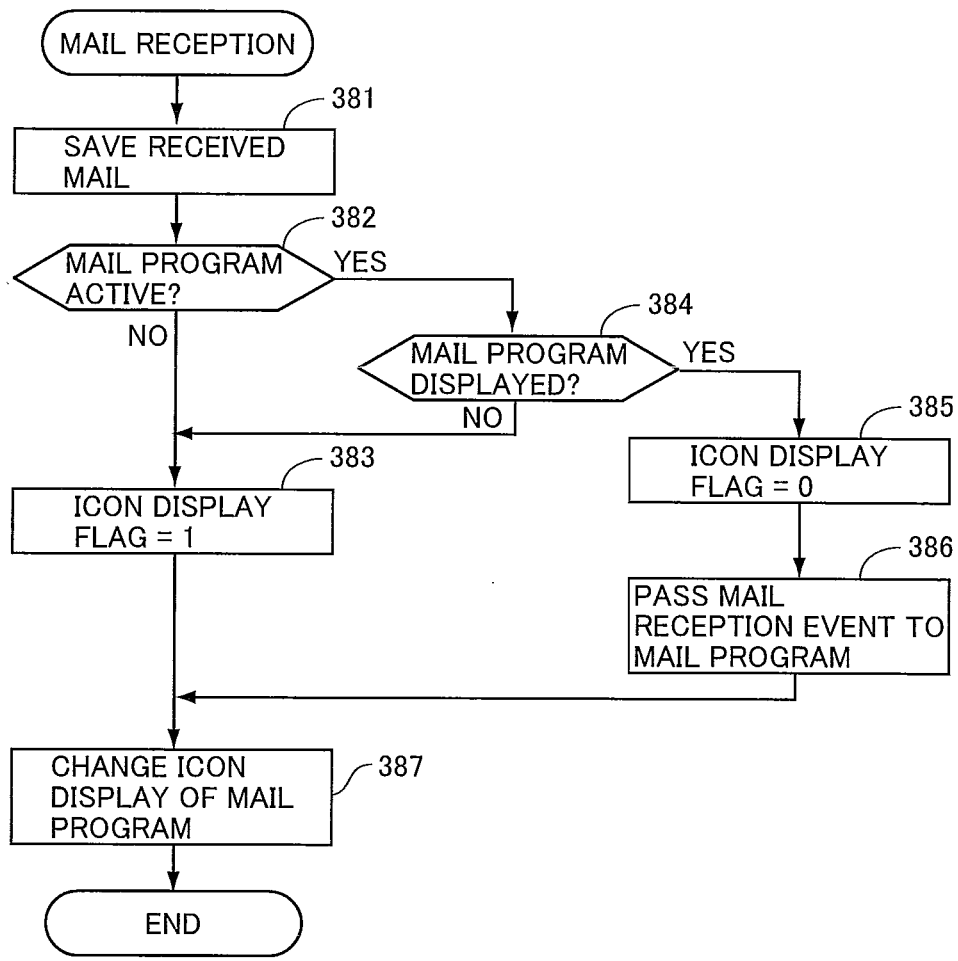
FIG. 23 is a flowchart showing a control structure of a program executed by a communication control unit 120 when an e-mail incoming event occurs.

FIG. 23 shows a control structure of a program executed by communication control unit 120 when a mail incoming event occurs. The program is for informing the user of an incoming mail, by displaying the activating icon of the mail program in reversed display, when the mail program has not been activated or when it is activated but not displayed.

Referring to FIG. 23, the program includes: a step 381 of storing, in response to reception of the mail incoming event, the received mail in memory 98; a step 382 of determining whether the mail program has been activated or not and branching the control flow depending on the result of determination; a step 383 of setting, in response to a determination at step 382 that the mail program has not been activated, of setting an icon display flag to 1; and a step 387 following step 383, of changing the display of activating icon of the mail program and ending the process. At step 381, the mail is stored, and the received mail information of the mail program is updated.

The program further includes a step 384 executed in response to a determination at step 382 that the mail program has been activated, of determining whether or not the mail program is displayed on the display screen, and branching the control flow depending on the result of determination. If the determination at step 384 is NO, control proceeds to step 383.

The program further includes: a step 385 executed when the result of determination at step 384 is YES, of setting the value of icon display flag in preference data of the mail program to 0; and a step 386 following step 385, of passing the received event to the mail program and proceeding the control to step 387.

Figure 24:
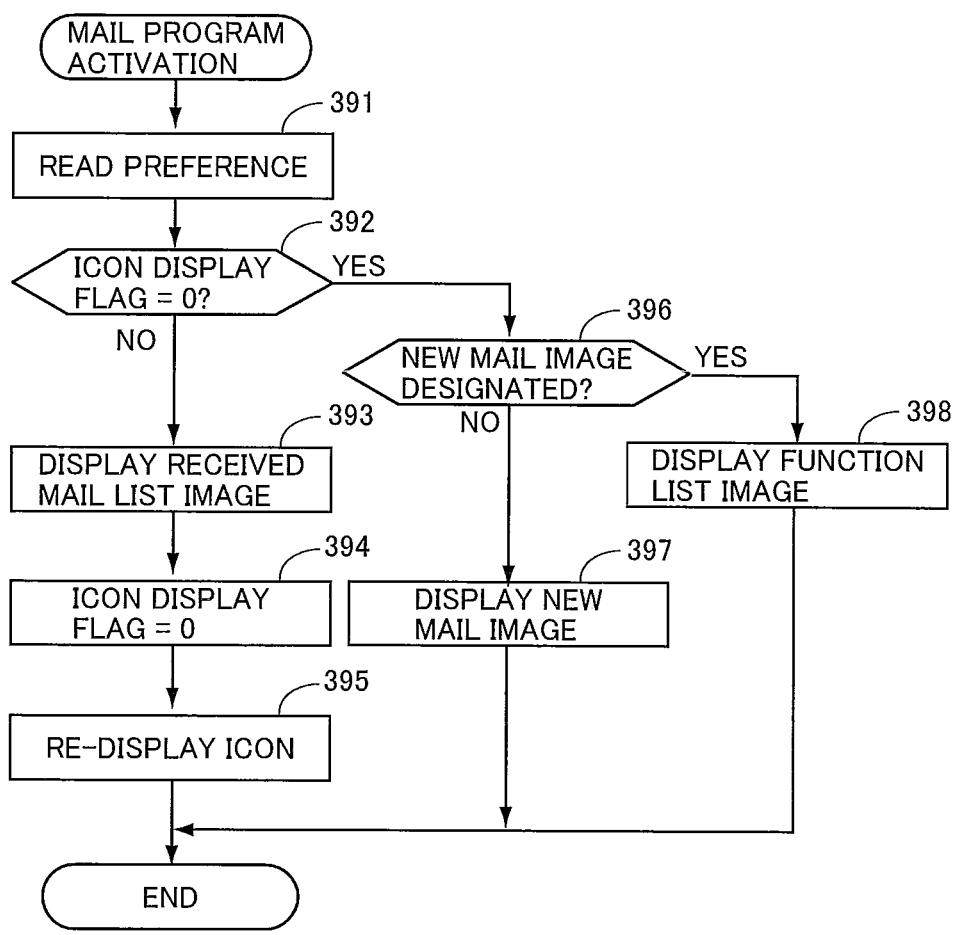
FIG. 24 is a flowchart representing a control structure of a program executed when a mail program is activated.

The program executed when the mail program is activated has such a control structure as shown in FIG. 24. Referring to FIG. 24, the mail program activating program includes: a step 391 of reading preference data of the mail program; a step 392 of determining whether the value of icon display flag is 0 or not, and branching the control flow depending on the result of determination; a step 393 executed when the result of determination at step 392 is NO, of displaying a list of received mails; a step 394 following step 393, of setting the value of icon display flag to 0; and a step 395 following step 394, of re-displaying the icon and ending the process. Though not described in detail here, the display of list of received mails is executed by a program of which control structure is shown in FIGS. 16 and 17.

The program further includes: a step 396 executed when the result of determination at step 392 is YES, of determining whether or not the value of an image selection flag of the preference data is 0, and branching the control flow depending on the result of determination; a step 397 executed when the result of determination at step 396 is NO, of displaying a new mail image and ending the process; and a step 398 executed when the result of determination at step 396 is YES, of displaying an image of function list, and ending the process. The image displays at steps 397 and 398 are also executed by the program of which control structure is shown in FIGS. 16 and 17.

<Operation>

The hardware configuration and software configuration of portable telephone 40 have been described above. In the following, the operation of portable telephone 40 will be described. In the following description, mainly referring to image layouts, the corresponding software steps will be described as needed.

The display immediately after activation of portable telephone 40 is as shown in FIG. 4. Referring to FIG. 4, when portable telephone 40 is activated, icon bars having four activating icons 60, 62, 64 and 66 are displayed at default positions on display screen 56, respectively. In the present embodiment, in the default setting, the activating icons are displayed in the order shown in FIG. 12. The y-coordinate of display of each icon is determined as shown in FIG. 12, and the icon bars are displayed spaced apart by a prescribed distance from each other in the initial state and, therefore, activating icons 60, 62, 64 and 66 are displayed arranged from upper left to lower right positions in descending manner. This display is given at step 160 of FIG. 15.

—Application Activation by One-Touch—

Figure 25:
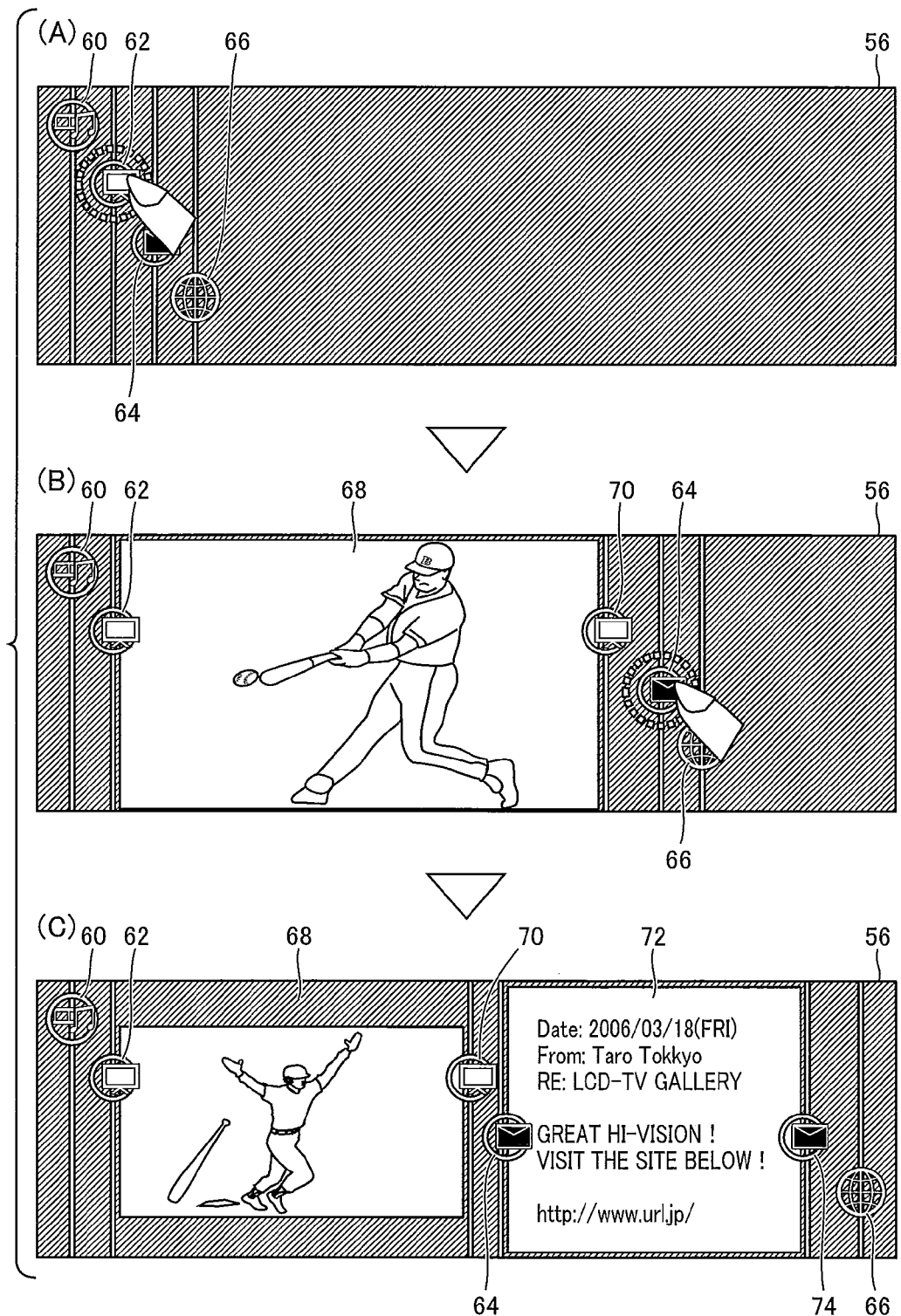
FIG. 25 shows changes in display on portable telephone 40 when an activating icon is one-touched, on the initial image of a launcher.

Assume that the user one-touches activating icon 62 in this state, as shown in FIG. 25(A). Then, determination of YES is made at step 162 of FIG. 15, and the process of step 164 is performed. As a result, an application corresponding to activating icon 62 is activated in a new window 68 as shown in FIG. 25(B).

When the process of step 164 is executed, referring to FIG. 16, the result of determination at step 190 is NO. As a result, determination at step 200 is made. Here, activating icon 62 has been simply one-touched and, therefore, the result of determination is NO, and the flow proceeds to step 204. The result of determination at step 204 is YES, and therefore, the flow proceeds to step 206. Assuming that the application has not yet been activated, the result of determination at step 206 is YES, and the process of step 208 is executed.

At step 208, similar to step 196 (FIG. 7), a process of displaying a window is executed, with the window width set to the default window size in accordance with the application-specific information 136 shown in FIG. 11. On the right side of window 68, an operating icon 70 having the same design as activating icon 62 is displayed. Activating icons 64 and 66 that have been displayed on the right side of activating icon 62 in FIG. 25(A) are displayed, each moved to the right by the same amount as the default window size.

Further, assume that the user one-touches activating icon 64, as shown in FIG. 25(B). Then, the same process as when activating icon 62 was touched is executed, an application (mail application) corresponding to activating icon 64 is activated as shown in FIG. 25(C), and a new window 72 therefor is opened in a default size allocated to the mail application. On the right side of window 72, an operating icon 74 of the same design as activating icon 64 is displayed. Here, the size of already opened window 68 is re-sized by the process of steps 248 to 252 of FIG. 17, and reduced slightly. The method of calculating window size will be described later.

—Application Activation by Dragging—

Figure 26:
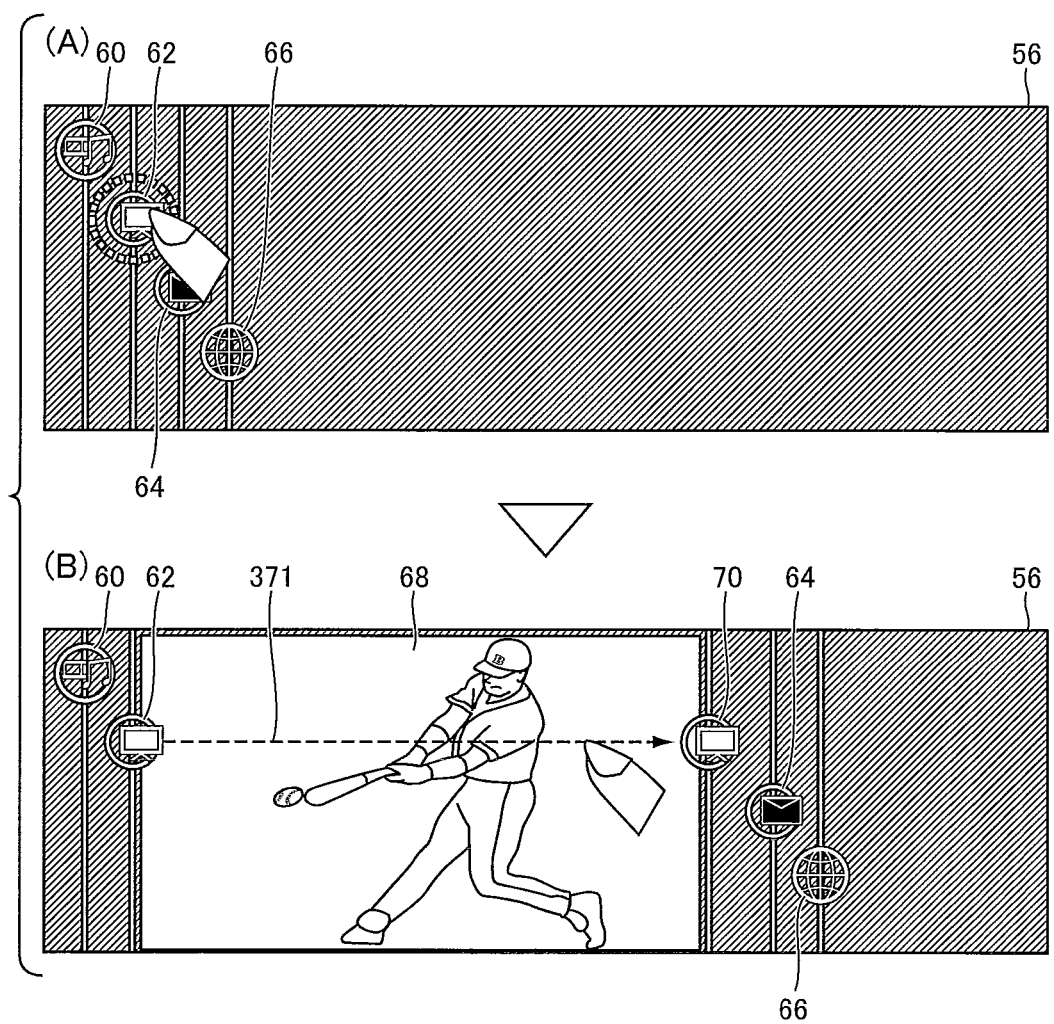
FIG. 26 shows a change in display on portable telephone 40 when an activating icon is dragged on the initial image of the launcher.

FIG. 26(A) shows, similar to FIG. 25(A), a state immediately after power-on of portable telephone 40. Assume that the user presses and drags activation icon 62 as represented by an arrow 371 in FIG. 26(B). Here, determination of YES is made at step 162 of FIG. 15, and the process shown at step 164 is executed. Details of step 164 are as shown in FIG. 16.

Referring to FIG. 16, when dragged, determination of YES is made at step 190, and the flow proceeds to step 192. In the example here, the result of determination at step 192 is YES, and the flow proceeds to step 194. Assuming that the application has not yet been activated, the result of determination at step 194 is YES, and the process of step 196 is executed. At step 196, a window 68 is opened, and a process of activating the application corresponding to activating icon 62 is executed.

—Window Control Using Relation Between Applications—

In the present embodiment, a pair of applications of which windows are to be opened next to each other, and a pair of applications of which windows should not be opened simultaneously, are stored as application-related information 142 shown in FIG. 11, for window control. In the following, exemplary operations in such situations will be described with reference to FIG. 27.

In the following example, it is assumed that in application-related information 142 shown in FIG. 11, it is defined that a mail application and a web browser should always be displayed next to each other, and that the order of display of these are not limited in landscape display. Further, it is assumed that information inhibiting simultaneous opening of windows for the web browser and a TV application is written in application-related information 142.

FIG. 27(A) shows an image in which a window 68 for one-segment TV application and a window 72 for a mail application are opened simultaneously. Windows 68 and 72 are displayed next to each other. Window 68 is positioned between activating icon 62 and icon 70. Window 72 is positioned between activating icon 64 and operating icon 74. In FIG. 27(A), activating icon 60 is displayed on the right side of window 72. This utilizes a function that by moving an activating icon upward/downward, a program allocated to the activating program can be changed, as will be described later. On the further right side of activating icon 60, an activating icon for the web browser is displayed.

Assume that in the state shown in FIG. 27(A), there is a link 373 to a specific URL in window 72, and link 373 is one-touched by a finger. If link 373 is one-touched by the finger and the linked destination is a Web page, the same event as when activating icon 66 is one-touched occurs, and a window 377 of a Web browser opens as shown in FIG. 27(B). Since window 377 is a Web application, it is displayed between activating icon 66 and operating icon 375. Here, it should be noted that window 377 is displayed adjacent to window 72 and, at the same time, window 68 is closed. These are both operations based on the information defined in application-related information 142 shown in FIG. 11. In the following, a control flow of the program realizing such operations will be described with reference to the flowchart of FIGS. 15 to 21 as appropriate.

As described above, when link 373 mentioned above is touched, the same event as when activating icon 66 is one-touched at step 162 of FIG. 15 occurs. Therefore, control proceeds to step 164, and the process shown in FIG. 16 is executed.

Referring to FIG. 16, the result of determination at step 190 is NO, and the flow proceeds to step 200. As it is a one-touch operation, the result of determination at step 200 is also NO, and hence, the flow proceeds to step 204. The result of determination at step 204 is YES, and the result of determination at step 206 is also YES, and the flow proceeds to step 208, at which the application (in this example, Web browser) is activated in default conditions.

Figure 27:
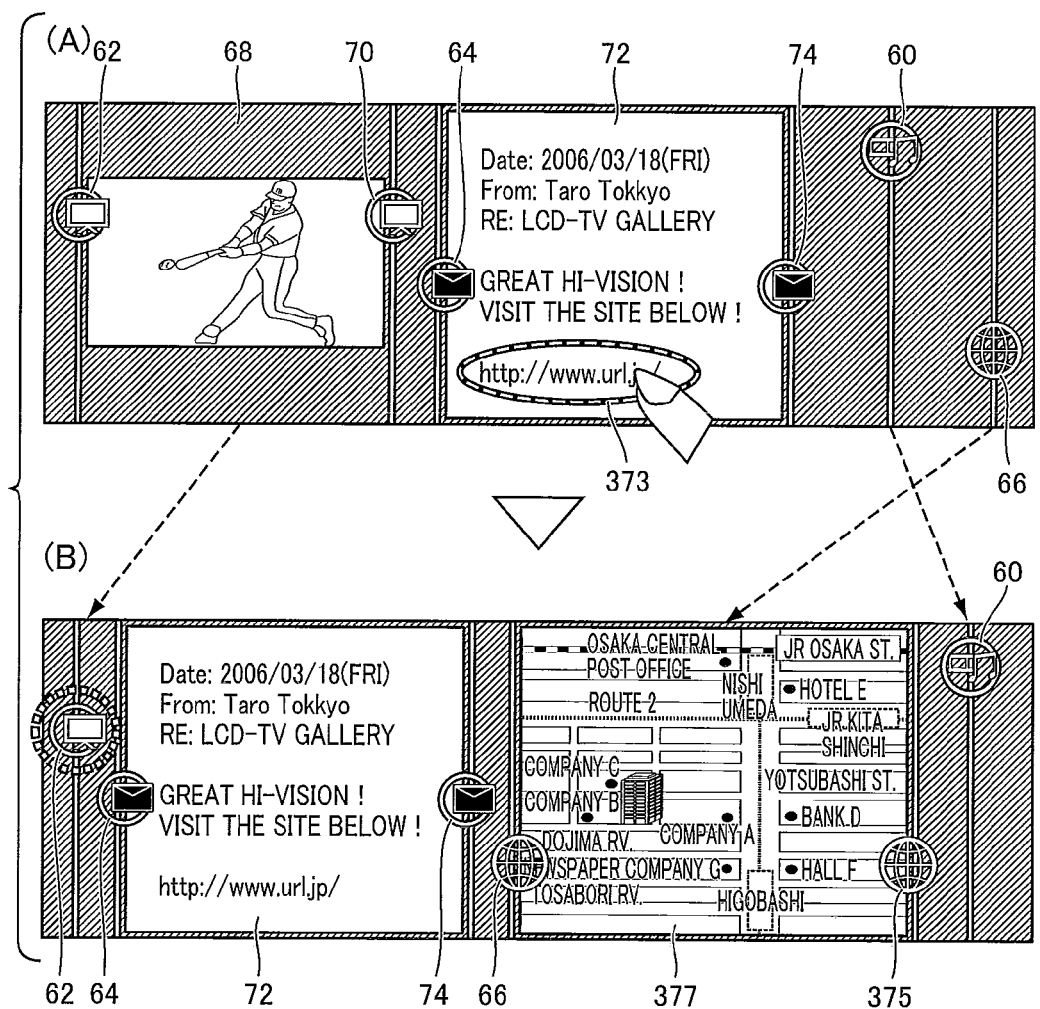
FIG. 27 shows a change in display when display is controlled based on relation among applications, on portable telephone 40.

At step 208, processes similar to those shown in FIG. 17 are executed. Referring to FIG. 17, in the example shown in FIG. 27, the one-segment TV application and the mail application have already been activated and, therefore the result of determination at step 240 is YES. Therefore, control proceed to step 242. At step 242, whether it is necessary to close any other window or not is determined. In this example, it is inhibited by application-related information 142 shown in FIG. 11 to open the window of Web browser and the window of one-segment TV application simultaneously. Therefore, the result of determination at step 242 is YES, and the flow proceeds to step 244. At step 244, the window 68 shown in FIG. 27(A) is selected as the window to be closed, which is closed at step 246, and the flow proceeds to step 248.

At step 248, whether re-sizing of other window is necessary or not is determined. Assume that when window 68 shown in FIG. 27(A) is closed, the sum of present size of window 72 and the default window size set for the Web browser has sufficient margin with respect to the width of display screen 56. Then, the result of determination here is NO, and the flow proceeds to step 254.

At step 254, whether or not it is necessary to change the order of windows is determined. As already described, in the present example, it is requested by the description in application-related information 142 shown in FIG. 11 that the window of mail application and the window of Web browser be displayed next to each other. Therefore, the result of determination at step 254 is YES, and control proceeds to step 256.

At step 256, window positions are re-calculated such that window 72 and window 377 to be newly opened are positioned next to each other, at step 258, windows are displayed in accordance with the result of calculation, and the flow proceeds to step 260. At step 260, new window 377 is displayed in a prescribed size. The result of determination at step 262 is YES, and therefore, the application corresponding to the activating icon is activated in the newly opened window and its output is displayed there, and the process ends. The image at this time is as shown in FIG. 27(B).

Referring to FIG. 27(B), window 68 shown in FIG. 27(A) is closed, and the newly opened window 377 is displayed next to window 72. On the left side and right side of window 377, activating icon 66 and operating icon 375 are displayed, respectively. As compared with FIG. 27(A), positions of activating icons 60 and 66 are switched to each other, and activating icon 60 is shown further to the right of operating icon 375.

In the present embodiment, even when window 68 is closed, the one-segment TV application is not terminated and audio output is continued. In the present embodiment, if the application is continuously executed even when the window is closed, the manner of display (for example, color) of the activating icon 62 corresponding to the application is changed from the normal manner, as represented by activating icon 62 shown in FIG. 9, to indicate that the application is active. At this time, of the window table 140 shown in FIG. 11, data in the entry corresponding to window 68 is not erased, even if the window is not displayed. Further, display flag is set off, to indicate that the window is not displayed while the application is active. Normally, the display flag is on.

By such a process, it becomes possible to automatically display windows of two applications that are closely related to each other, attaining the effect of easier operation and easier viewing of information. If it is requested by some reason or other that windows of specific two applications not be opened simultaneously (be displayed in exclusive manner), it is possible to automatically close the window that has the exclusive relation to the window to be newly opened, and hence, the request can be met. Further, an effect of attaining well-organized display on display screen 56 can also be attained.

—Activation of Touched Window—

As in the case of a desk-top personal computer, in portable telephone 40 in accordance with the present embodiment, if a plurality of windows are displayed, only one window is active. In the present embodiment, the activating icon and the operating icon displayed on the left and right sides of the active window are set to have higher luminance, so that the user can easily see which of the windows is active. In order to activate a window, what is necessary is simply touching the window.

Figure 28:
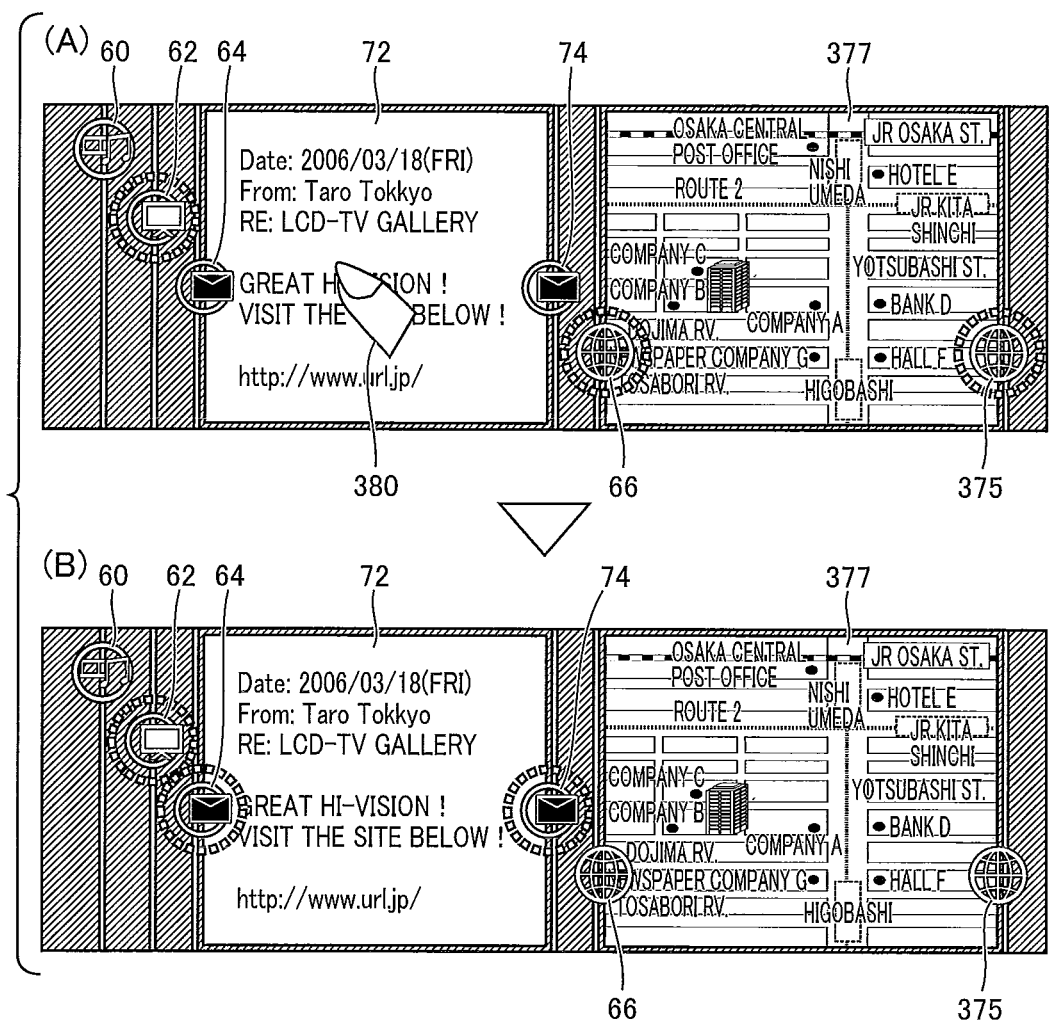
FIG. 28 shows that a touched window is activated, on portable telephone 40.

By way of example, referring to FIG. 28(A), assume that window 377 of Web browser is active and window 72 of mail program is inactive. Here, if the user touches any point in window 72 with his/her finger 380, window 72 is activated and activating icon 64 and operating icon 74 come to have higher luminance as shown in FIG. 28(B), while window 377 is inactivated and activating icon 66 and operating icon 375 come to have normal luminance.

In this process, the program performs the following operation. Referring to FIG. 15, it is not the case that the operating icon is touched. Therefore, results of determination at steps 162 and 166 are both NO, and therefore, the process of step 170 is executed. At step 170, as the open window has been touched, the result of determination is YES, and the flow proceeds to step 172. The touched window is inactive and, therefore, the result of determination at step 172 is NO, and the flow proceeds to step 176. At step 176, a process of activating the touched window is executed. Specifically, of the window table 140 shown in FIG. 11, the window No. of the touched window 72 is set as the active window No. (see FIG. 11). Further, the image is re-displayed with the luminance of the activating icon and the operating icon of the window that has been active by that time set to the normal luminance, and luminance of the activating icon and the operating icon of window 72 made higher.

Since the active window is indicated by the luminance of the activating icon and the operating icon displayed on both sides of the window, the effect that the user can easily confirm which window is active, can be attained. As a result, the operation of portable telephone 40 becomes simple and easy.

—Resumption of Application that has Been Active but Window Closed—

By way of example, assume that window 72 of mail application and window 377 of Web browser are displayed as shown in FIG. 29(A). At the same time, the one-segment TV application is also active. Its window, however, is closed because of the limitation of exclusive display of the window with respect to the Web browser described above, and activating icon 62 is displayed with its color changed. In the present embodiment, when the user one-touches activating icon 62 with his/her finger 380, window 377 of Web browser is closed and the Web browser ends, and window 68 of one-segment TV application corresponding to the activating icon 62 is opened in the size as before closing as shown in FIG. 29(B). The operation of the program here will be described.

Referring to FIG. 15, here, as activating icon 62 is touched, the result of determination at step 162 is YES and, therefore, the process of step 164 (FIG. 16) is executed.

Referring to FIG. 16, in this example, the result of determination at step 190 is NO and the result of determination at step 200 is also NO. Therefore, step 202 is not executed and determination at step 204 is made. In this example, the result of determination at step 204 is YES, the result of determination at step 206 is NO, and the result of determination at step 210 is YES and, therefore, in this example, the "window open" process of step 212 is executed.

Figure 29:
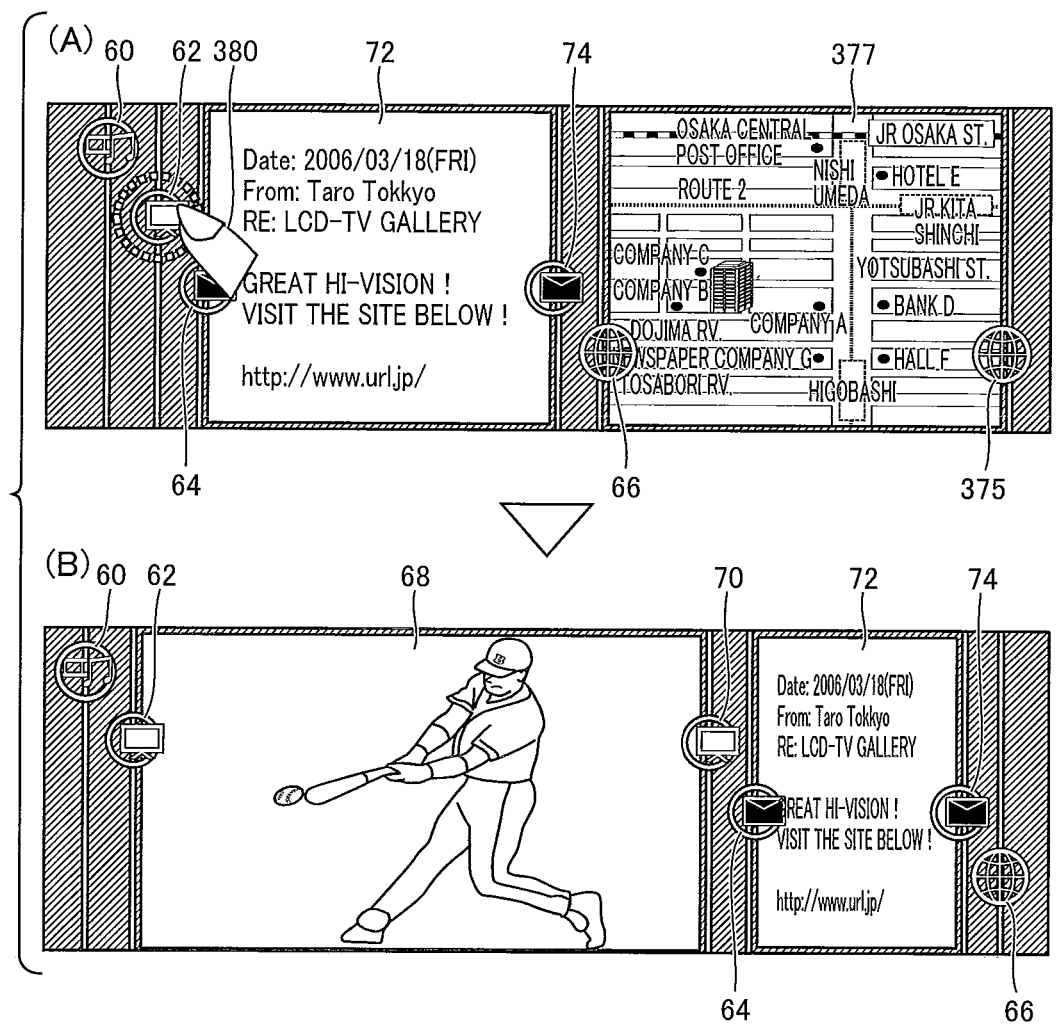
FIG. 29 shows a change in display when an activating icon is touched, on portable telephone 40.

Referring to FIG. 17, in this example, the results of determination at steps 240 and 242 are YES, and at steps 244 and 246, window 377 is closed. Further, the result of determination at step 248 is also YES. Here, as the lateral size of the window 68 which is re-opened, the window size of corresponding entry in the table window of application-specific information 136 is read, and using the size and the sum of sizes of other open windows, whether or not it is necessary to re-size other window or windows is determined. If re-sizing is necessary, re-sizing of each window is executed at steps 250 and 252. In the example shown in FIG. 29, window 377 is closed, while it is necessary to reduce the size of window 72. Therefore, the size of window 72 is reduced and the position is also changed in accordance with the display position of the new window, as shown in FIG. 29(B).

The result of determination at step 254 is NO, and the process proceeds to step 260.

At step 260, window 68 is re-opened in the default window size of one-segment TV application. Further, in this case, image output of one-segment TV application is resumed, and an image of one-segment TV application is output in window 68.

Though the window is re-opened in the default window size in such a case in the present embodiment, it is also possible to store the window width before it is closed, and to re-open the window in that size.

Further, in the present embodiment, when window for the one-segment TV application is re-sized, the aspect ratio of image output area is kept constant and the image as a whole is displayed reduced in accordance with the dimension in the longitudinal direction. This is because change in the aspect ratio results in different impression of the image on the TV screen. This is also the same for a video image. However, a design that changes the aspect ratio may be adopted.

—Size Calculation of Window Re-Sizing Associated with Icon Dragging—

When re-sizing a window, the window size is calculated in the following manner. For this process, in memory 98 shown in FIG. 11, a reduction ratio table 144 is stored, in which correspondence between priority and window reduction ratio is stored.

In the present embodiment, window re-sizing is done in accordance with the following policy.

1) If there is a pair of icon bars arranged with a blank area (area in which nothing is displayed) wider than the minimum space, ahead of the dragging direction, first, the longitudinal size of the blank area is reduced.

2) If every space of (1) above is minimized and the space between icon bars cannot further be closed up and if there are windows ahead of the dragging direction, the longitudinal size of the blank area between the windows is reduced. In the present embodiment, if a space between windows is to be reduced, reduction is done from the left side. It is also possible to reduce from the right side, or to reduce every space uniformly.

If spaces (1) and (2) are all minimized and the space between icon bars and the space between windows cannot further be closed up and if there is any window ahead of the dragging direction, the size of the window is reduced. At the time of reduction, the reduction ratio table shown in FIG. 14 is referred to, and priority is allocated to each of the windows in a reverse order to the order of opening of the windows. The reduction width of window size is calculated in accordance with the priority. In the present embodiment, the reduction width is calculated such that a window opened earlier comes to have larger reduction width. The priority, however, is not limited to the above. For instance, the window that is activated later may have higher priority.

In the example shown in FIG. 14, to each priority, a value called reduction ratio, which is a value for determining the reduction width, is allocated with reference to reduction ratio table 144, and using the reduction ratio, the reduction width of each window is calculated. Specifically, calculation is done in the following manner.

Referring to FIG. 14, the reduction ratio is allocated such that the latest-opened window has the reduction ratio of 1, the second-latest window has the reduction ratio of 2, the third and fourth latest windows have ratios 4 and 8, respectively. In the present embodiment, the fifth-latest and earlier opened windows are closed when a new window is opened, while display of corresponding activating icon or icons is left. Therefore, they are not related to the calculation here.

Then, the size wi' after re-sizing of the window having priority i is determined in accordance with the following equation.

$$w'_i = w_i - \frac{p_i}{\sum_{j=1}^{m} p_j} \times x \qquad \text{[Equation 1]}$$

where wi represents the size of the window before re-sizing, pi represents reduction ratio allocated to the window of this priority, m represents the number of windows, and x represents the distance of movement by dragging, respectively.

FIG. 30(A) represents an exemplary arrangement of windows before re-sizing. Referring to FIG. 30(A), on display screen 56, four windows 400, 402, 404 and 406 are displayed. Assume that the order of opening, when counted from the latest-opened window, is the second window 402, the fourth window 406, the first window 400 and the third window 404. In FIG. 30(A), the numeral in parentheses following the name of each window represents the order at which each window was opened. The priority is reverse to this order.

In the state shown in FIG. 30(A), assume that the activating icon of third window 404 is dragged to the left by an amount of movement x, as represented by an arrow 410. In this example, the windows influenced by the dragging is the first and second windows 400 and 402. Sizes of the windows before re-sizing are represented by w1 and w2, and sizes after re-sizing are represented by w1' and w2' as shown in FIG. 30(B). Here, the sizes w1' and w2' are determined by the following equations.

$$w'_1 = w_1 - \frac{1}{1+2} \times x \qquad \text{[Equation 2]}$$

$$w'_2 = w_2 - \frac{2}{1+2} \times x$$

Figure 31:
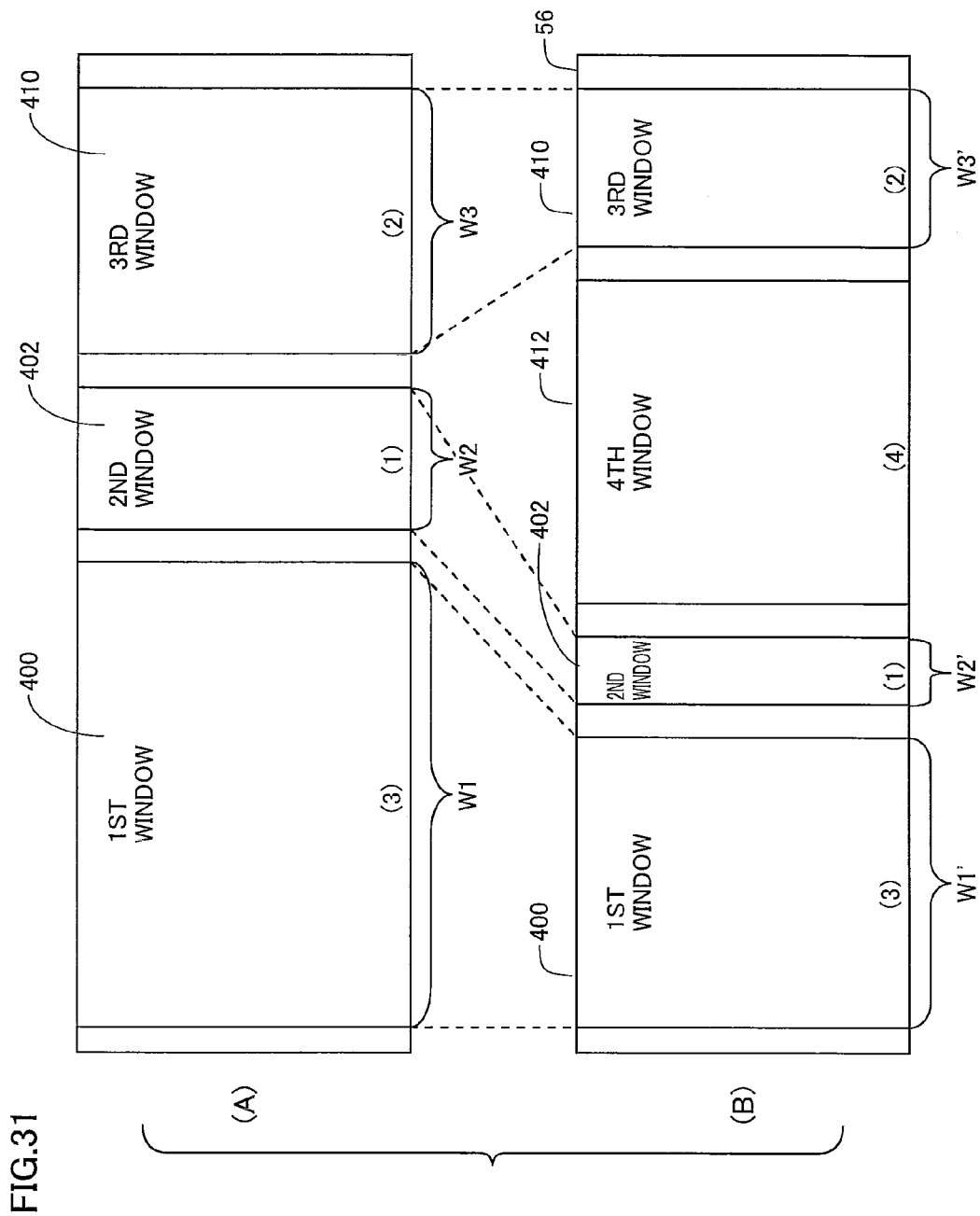
FIG. 31 shows a manner how existing windows are re-sized when a window is newly opened.

Calculation is done based on the same idea when a new window is to be displayed. The method will be described with reference to FIG. 31. It is noted, however, that if a new window is to be displayed, the space necessary for displaying the newly displayed window size is ensured by re-sizing all existing windows.

Referring to FIG. 31(A), assume that in a state in which first to third three windows 400, 402 and 410 are displayed, a fourth window 412 is newly opened as shown in FIG. 31(B). Let us represent the sizes of windows 400, 402 and 410 as w1, w2 and w3, respectively, and the order of opening of these windows is 3, 1 and 2, as indicated by numerals in parentheses following respective window names. Further, let us represent the size of newly opened window 412 as w4, and the sizes of re-sized windows 400, 402 and 410 as w1', w2' and w3', respectively. Then, w1', w2' and w3' can be determined by the following equations.

$$w'_1 = w_1 - \frac{1}{1+2+4} \times (w_4 + d) \qquad \text{[Equation 3]}$$

$$w'_2 = w_2 - \frac{2}{1+2+4} \times (w_4 + d)$$

$$w'_3 = w_3 - \frac{4}{1+2+4} \times (w_4 + d)$$

where d represents minimum space between windows. Since the fourth window 412 is newly opened, the number of spaces between windows is increased by one, and the width corresponding to this space must be ensured from the reductions of existing windows. Calculations of equations above are necessary for this purpose.

—Display of Operation Guidance—

Figure 32:
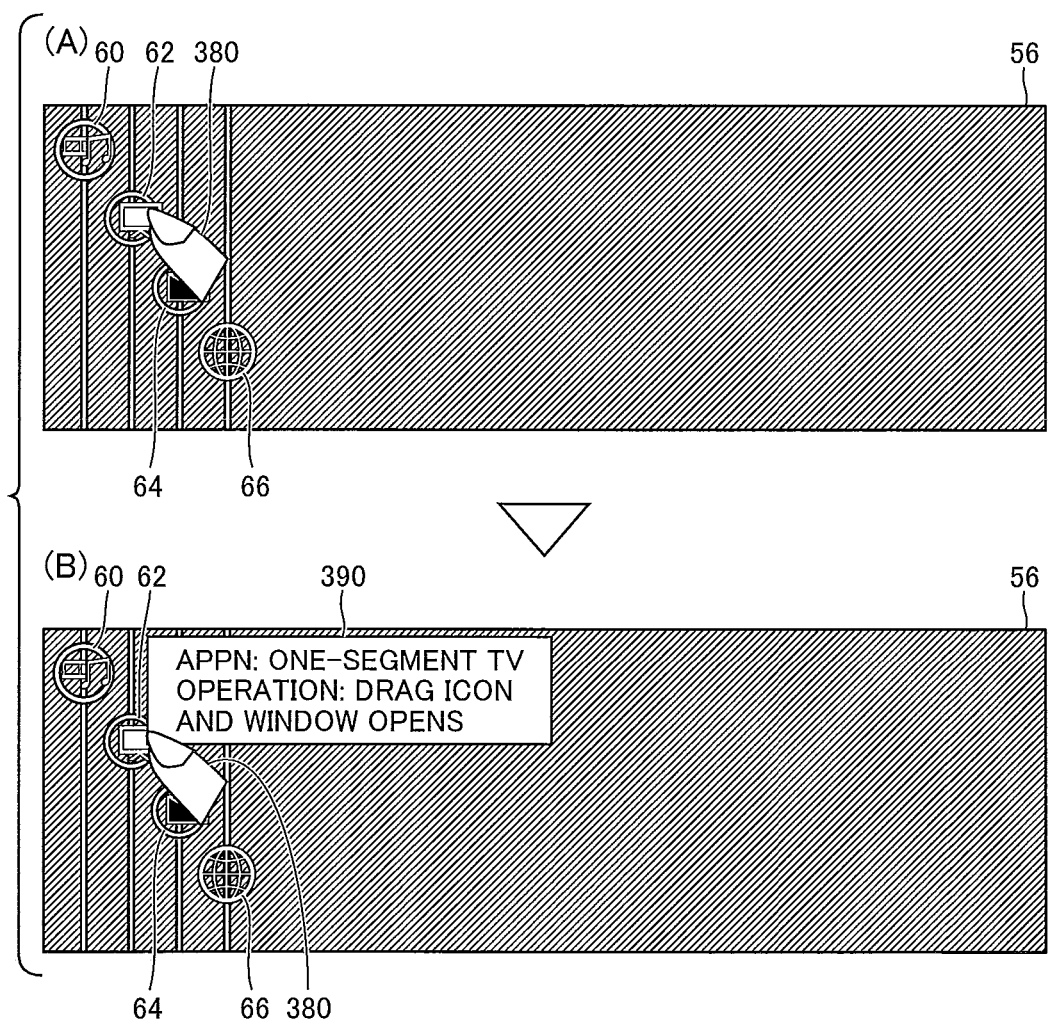
FIG. 32 shows that operation guidance appears when an activating icon is kept pressed for a prescribed time period or longer, on portable telephone 40.

In portable telephone 40 in accordance with the present embodiment, as shown in FIG. 32(A), when an activating icon (for example, activating icon 62) is kept pressed by a finger 380 for a prescribed time period or longer, an operation guidance 390 related to the activating icon is displayed nearby, as shown in FIG. 32(B). Contents of operation guidance are included in application-specific information 136 shown in FIG. 11.

An operation of the program when the operation guidance is displayed is as follows. Referring to FIG. 15, as the activating icon 62 is long-pressed, the result of determination at step 162 is YES, and the process of step 164 is executed.

Referring to FIG. 16, the result of determination at step 190 is NO, and the flow proceeds to step 200. The result of determination at step 200 is NO for the prescribed time period from the start of long-pressing, and hence, the flow proceeds to step 204. As the touch-up does not occur for the prescribed time period, the result of determination at step 204 is NO, and the flow returns to step 190. Thereafter, the processes of steps 190, 200 and 204 are repeated.

If the duration of long-pressing exceeds the prescribed time period, the result of determination at step 200 becomes YES, and control proceeds to step 202. At step 202, the operation guidance information is read from application-specific information 136 shown in FIG. 11 and operation guidance 390 shown in FIG. 32(B) is displayed near the activating icon 62. If touch-up occurs here, since the application corresponding to activating icon 62 has not been activated, a window corresponding to activating icon 62 opens in the similar manner as there is a one-touch at step 208, and the application is activated. If the user does not touch-up and drags activating icon 62, the result of determination at step 190 is YES and the process following step 192 is executed. Eventually, the process of step 196 or 198 is executed.

As the operation guidance is displayed when an activating icon is kept pressed for a long period, it becomes possible for the user to understand by what operation on the activating icon the corresponding application can be activated and, therefore, the user can operate portable telephone 40 without much trouble.

—Window Movement by Dragging of Activating Icon—

As described above, in portable telephone 40 in accordance with the present embodiment, by dragging an activating icon displayed on the left side of an open window, the window can be moved. The manner is as shown in FIG. 33.

Figure 33:
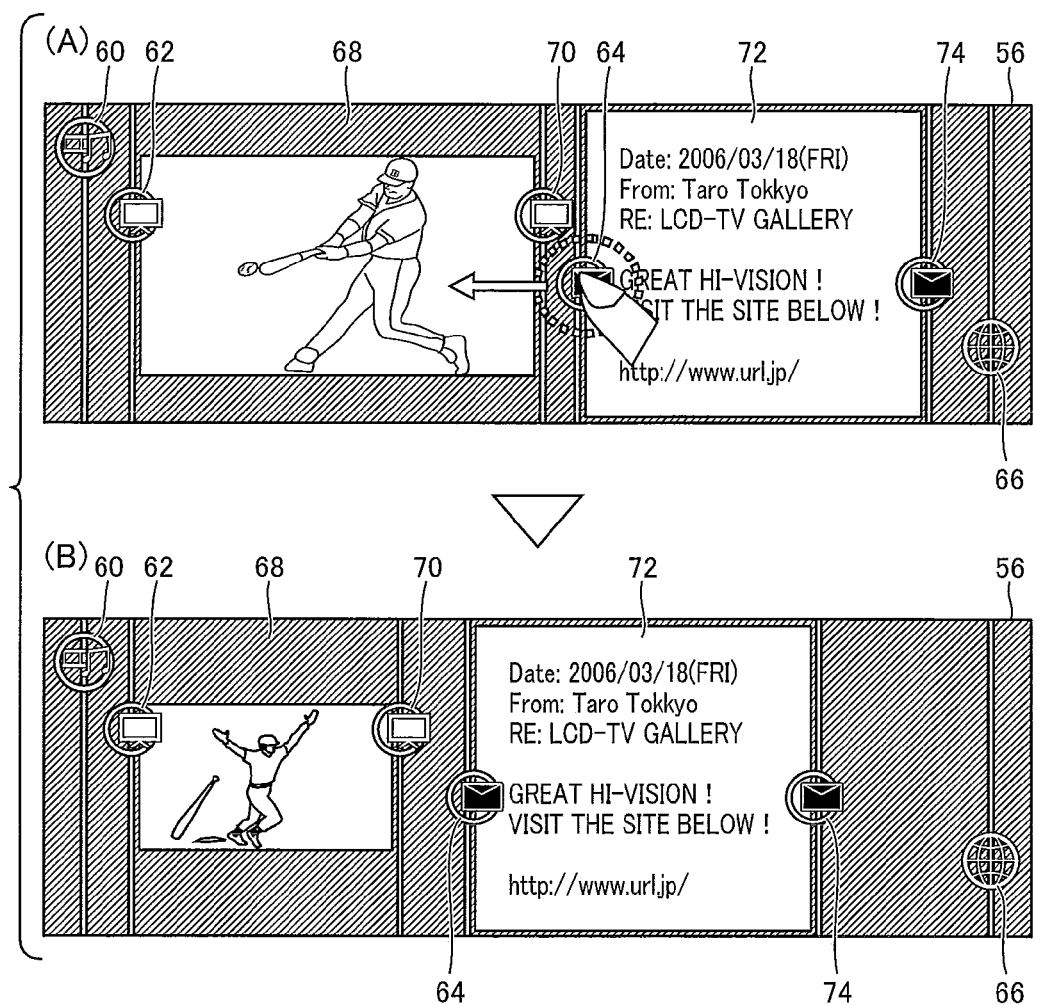
FIG. 33 shows that by dragging an activating icon of a window, the window can be moved.

Referring to FIG. 33(A), assume that activating icon 64 on the left side of window 72 is pressed by a finger and dragged to the direction of the arrow. In the present embodiment, here, window 72 is moved to the dragged direction, as shown in FIG. 33(B). In accordance with this movement, the size of window existing ahead in the dragging direction is re-sized as shown in FIG. 33(B). In the example shown in FIG. 33, window 68 is reduced in accordance with the drag distance of window 72. The method of determining the amount of reduction is as described with reference to FIGS. 30 and 14.

The program operation here is as follows. Referring to FIG. 15, the result of determination at step 162 is YES. Therefore, the process of step 164 is executed.

Referring to FIG. 16, the result of determination at step 190 is YES, and the flow proceeds to step 192. In this example, as the dragging direction is horizontal (x-axis direction) a shown in FIG. 33(A), the result of determination at step 192 is YES, and the determination of step 194 takes place. Here, the application corresponding to activating icon 64 has already been activated, the result of determination at step 194 is NO, and the flow proceeds to step 198. Then, at step 198, a process of displaying window 68 in the size as re-sized and displaying window 72 at a position moved by the amount corresponding to the drag distance is executed. Thereafter, control returns to step 162 of FIG. 5.

As described above, in the present embodiment, when an activating icon displayed on the left of an already activated application window is dragged in the horizontal direction, the window is displayed with its position changed by the amount corresponding to the drag distance. In accordance with the dragging, any window that needs re-sizing is re-sized by the same methods as described with reference to FIGS. 30 and 14.

Therefore, it is possible by the user to move the window to his/her intended position, and the operation of portable telephone 40 becomes easier. Further, display on portable telephone 40 becomes more easily viewable.

The basic policy of re-sizing and movement of displayed elements at the time of dragging is the same as described above.

Figure 34:
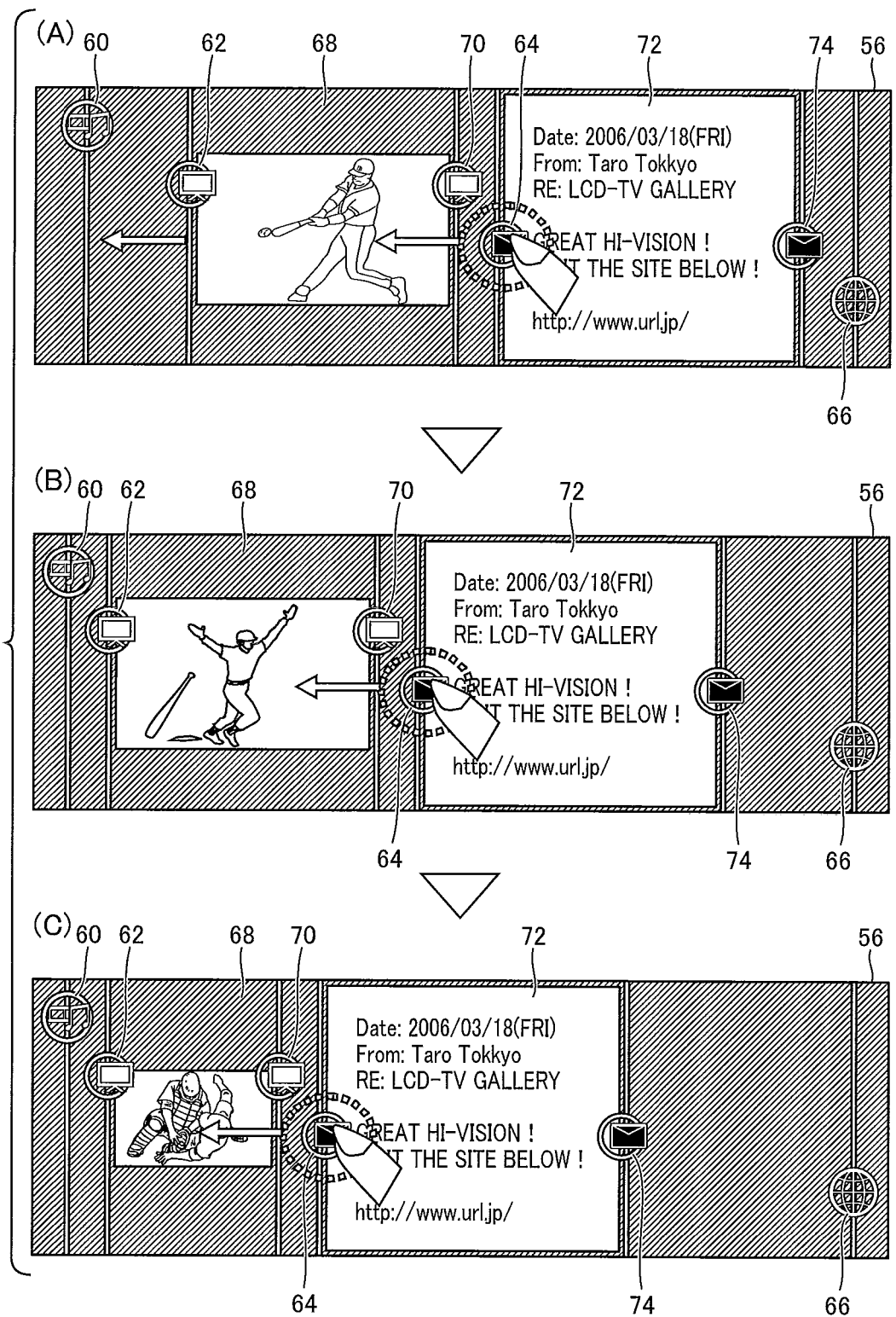
FIG. 34 illustrates order of re-sizing various elements on windows when a window is moved.

FIG. 34 shows a manner of re-sizing and movement of displayed elements at the time of dragging. Referring to FIG. 34(A), assume that the user drags activating icon 64 of window 72 to the left, with windows 68 and 72 opened. In the state shown in FIG. 34(A), there is a relatively wide space between activating icon 62 on the left end of window 68 and activating icon 60 on the left side thereof. Therefore, when window 72 moves to the left as activating icon 68 is dragged, first, windows 68 and 72 are moved to the left together, and the space between activating icons 60 and 62 is closed-up.

As shown in FIG. 34(B), if activating icon 64 is further dragged to the left after the space between activating icons 60 and 62 attained to a prescribed minimum value, the size of window 68 is reduced as shown in FIG. 34(C).

Such a determination and change in display are performed at step 196 of FIG. 16.

—Text Display when Activating Icon is Touched or Dragged—

As described above, in portable telephone 40 in accordance with the present embodiment, when an activating icon is one-touched or dragged, a window of new application corresponding to the activating icon is opened, and any existing window is re-sized. As the new window is opened, the size of existing window or windows becomes smaller than before, except when there is a window that is closed at the same time. This leads to the following problem.

Assume that texts are displayed on a window that has been originally displayed, and the window width becomes narrower as a result of re-sizing. When the window width becomes very narrow as a result of re-sizing, it would be difficult to show all the texts in the window.

Figure 35:
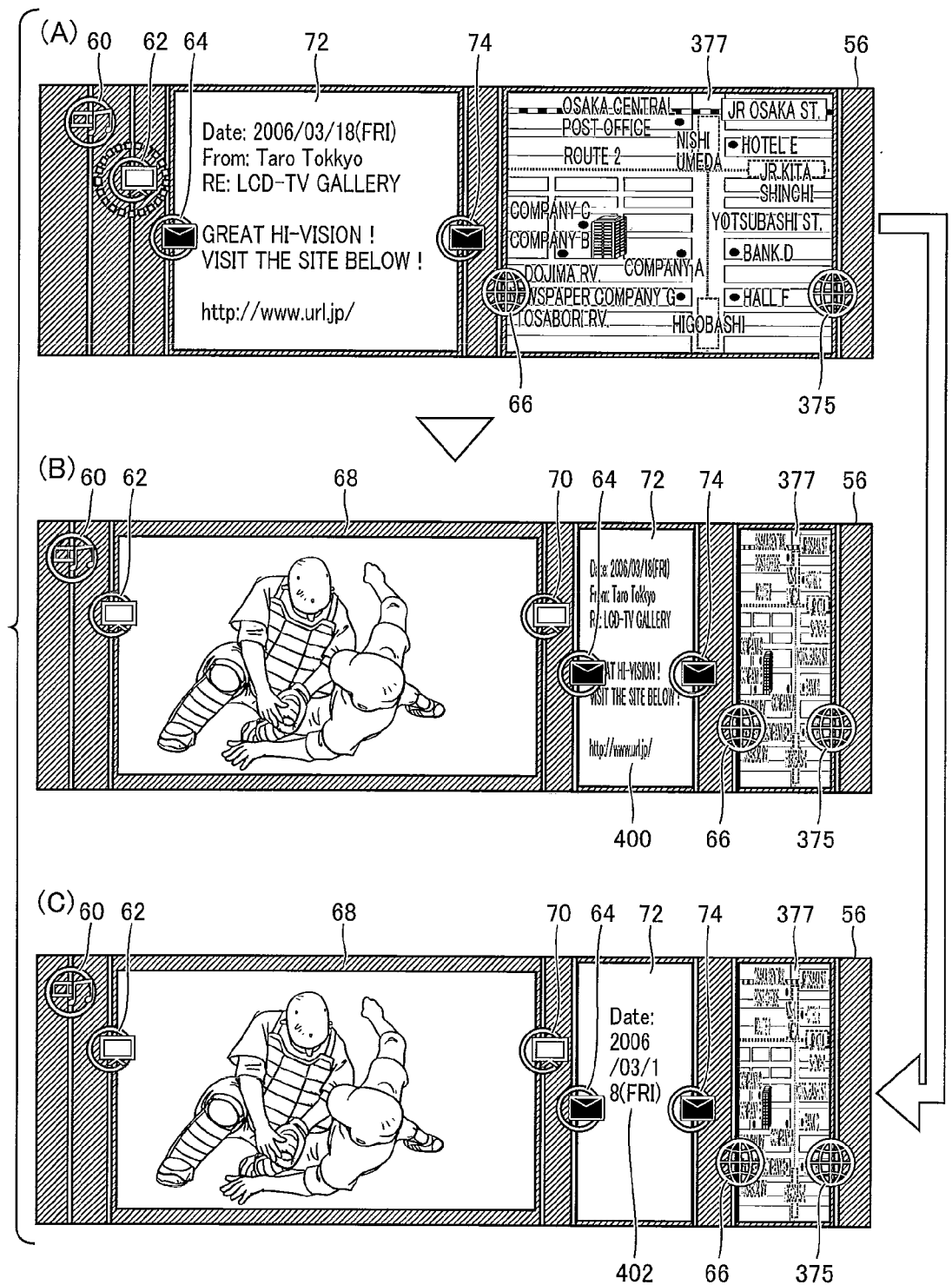
FIG. 35 shows manners of display on windows reduced in size, when windows are re-sized.

For instance, when activating icon 62 is one-touched in the state shown in FIG. 35(A), window 68 is newly opened, and windows 72 and 377 are re-sized to be smaller. FIGS. 35(B) and (C) show exemplary window sizes. As a result, if the text display image in window 72 is displayed simply reduced in left/right directions with the ratio maintained before and after re-sizing, it becomes difficult to read the text contents.

Therefore, in the present embodiment, if there is such a window that displays texts and the window width after re-sizing becomes equal to or smaller than a prescribed threshold value, character sequence of the texts is poured into the window and displayed as much as possible, rather than in the format before re-sizing. If font size is unchanged, the number of characters displayed on the window becomes smaller, while reading is easy. As the font, a font fixed in height but reduced in left/right width (elongate font) may be prepared, and by displaying the character sequence data in the elongate font, a larger number of characters can be displayed in window 72, though characters themselves become slightly less legible than in the original font. As a result, it becomes possible to more accurately grasp the text contents. Here, the character sequence may be displayed using a font reduced both in height and width than the original size (reduced font), rather than using the elongate font.

In the example shown in FIG. 35(C), it is relatively difficult to display the entire character sequence, while it is possible to clearly read and understand the beginning portion thereof. On the other hand, in the example shown in FIG. 35(B), though it is slightly less legible than the original font, texts, of which amount is relatively close to the full character sequence, can be displayed. Therefore, these methods of display may appropriately be changed depending on applications.

In order to change the font in accordance with the window size, a text flag included in application-specific information 136 shown in FIG. 11 is referred to. By way of example, at step 258 of FIG. 17, among windows, for a window having the window size smaller than a prescribed value, the text flag of the corresponding application is read, and if the flag value is 1, the text character sequence output by the application is poured into the window in the elongate font or reduced font as set.

—Text Display and Window Close when Operating Icon is Dragged—

Figure 7:
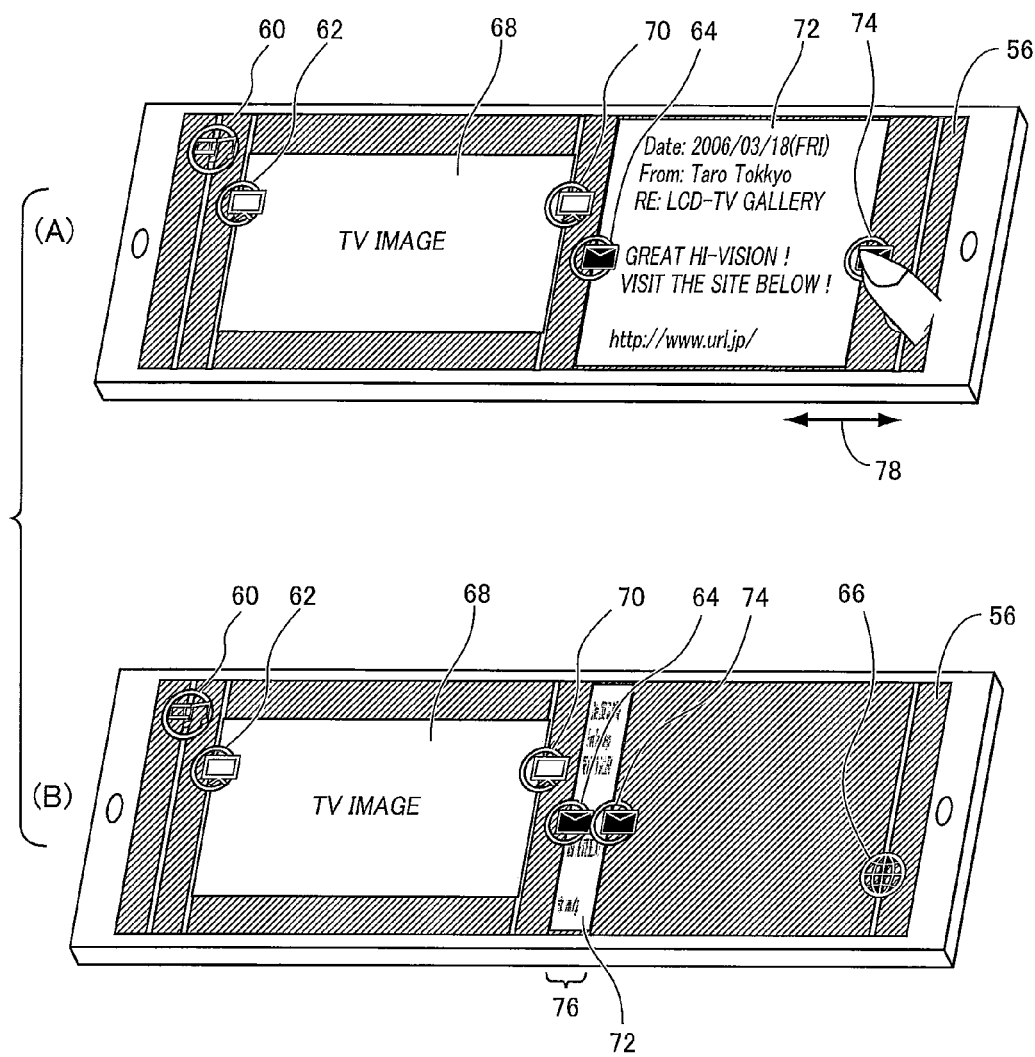
FIG. 7 shows states when an operating icon of window 72 is dragged, on portable telephone 40.

Such processes can always take place when window re-sizing is done. In the present embodiment, if the operating icon of each window is dragged to the left/right, the window is re-sized with the position of corresponding activating icon kept as it is, as shown in FIG. 7. If it is necessary, however, to reduce any other window at the same time, such window is also re-sized. In such a case, similar process is performed. The process is also performed when a new application is activated in a new window, by dragging an activating icon.

In relation to the display of text character sequence in elongate or reduced font in response to dragging of an operating icon or activating icon, the program operation is as follows. Further, in the present embodiment, if there is any window of which window width becomes smaller than a prescribed value as a result of re-sizing in accordance with the drag of an operating icon or activating icon, the window is closed. In the following, the program operation in that case will be described. The following description assumes that an operating icon is dragged.

Referring to FIG. 15, here, an operating icon is dragged and, therefore, the result of determination at step 162 is NO, and the flow proceeds to step 166. The result of determination at step 166 is YES, and the process of step 168 is executed.

Referring to FIG. 19, as dragging is being done, the result of determination at step 220 is NO, and the result of determination at step 224 is YES, so that the process of step 226 is executed.

Details of the process at step 226 are as shown in FIG. 20. The result of determination at step 280 is determined by a combination of the drag distance, the maximum window size and the current window size. If it is YES, the window size is maximized at step 282, and the window position is determined based on the drag distance. If it is NO, a new window size is determined by the drag distance at step 284.

If it is necessary to move an icon bar in the process of step 286 or 288, it is moved. At step 290, whether or not it is necessary to re-size any other window is determined, and at steps 292 and 294, such window is re-sized and the display position is changed.

Thereafter, at step 296, whether or not there is any window whose width is made smaller than the first threshold value as a result of re-sizing of window described above is determined. If there is any such window, the window is closed at step 298. By way of example, if the width 76 of window 72 operated by the user becomes smaller than the first threshold value as shown in FIG. 7(B), window 72 is closed. On the contrary, if it is the case that the size of window 72 is enlarged and there is a window whose width becomes smaller than the first threshold value as a result, such a window is closed at step 298.

Thereafter, at step 300, whether there is any window among the open windows whose width is smaller than a second threshold value larger than the first threshold value and whose corresponding application has the text flag on is determined. If there is such a window, the text character sequence output by the application is poured into the window, and the character sequence is displayed in the elongate font or reduced font. In other windows, the displayed contents are reduced or enlarged in accordance with the window size.

At step 302, the window corresponding to the application of operating icon that is being dragged is displayed in the size corresponding to the drag distance or in the maximum window size of the application, which is smaller.

At step 304, whether or not there is a touch-up is determined, and if not, the flow returns to step 280. If there is a touch-up, whether or not the corresponding application has been activated is determined at step 306. Here, the application has already been activated and, therefore, the flow proceeds to step 310, and the output of application is provided on the window and the application is continued.

If a window that is being operated is closed at step 298, the window is not displayed at step 302. Further, if the window is closed at the time point of touch-up, the processes of steps 306, 308 and 310 are not executed.

In this manner, closing of a window in accordance with re-sizing of windows is done, and for a window having text display of which size becomes smaller than the second threshold value as a result of re-sizing, the text is poured in and displayed in elongate or reduced font.

If the process shown in FIG. 20 is executed by dragging of an activating icon, at step 280, it is determined that the current window size=0. At steps 282 and 284, window position and window size are calculated assuming that current window size=0 and current window position=current position of activating icon. Further, the result of determination at step 306 is NO, and the process of step 308 is executed.

—Change of Allocated Application by Dragging of Activating Icon in Vertical Direction—

As shown in FIG. 12, to each icon, an application and the range of y-coordinate on the display are allocated in advance. Therefore, in the present embodiment, dragging of an activating icon in the vertical direction is also allowed, and if dragged in the vertical direction, the displayed icon and the allocated application are both changed in accordance with the y-coordinate.

Figure 36:
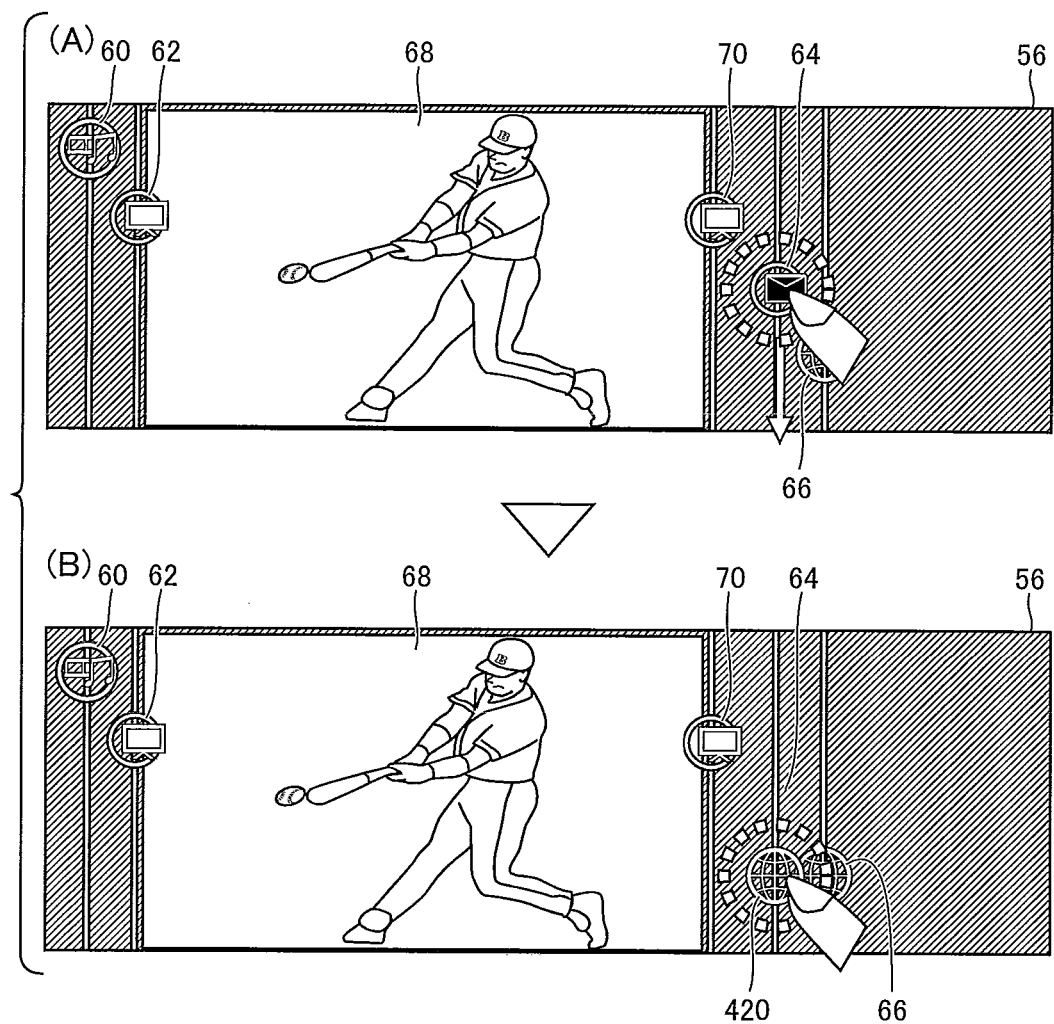
FIG. 36 shows that when an activating icon is dragged in the vertical direction, the application allocated to the activating icon and its design change.

For instance, referring to FIG. 36, assume that the user drags downward activating icon 64 to which a mail application has originally been allocated. Provided that the y-coordinate increases from the upper side to the lower side of the figure, the design of the icon is an icon representing mail (second lowest icon of FIG. 12) as long as the y-coordinate of the icon center is in the range of y=100 to 149. If the y-coordinate of icon center moves to the range of y=150 to 199, the icon design changes to the icon of web browser that is the lowest in FIG. 12, in accordance with the allocation shown in FIG. 12, and the allocated application is also changed to web browser.

In this manner, as the application allocated to the activating icon is changed in accordance with the value of y-coordinate of the activating icon and the icon design is changed accordingly, it becomes possible, for example, to activate one application in multiple numbers at one time, or to activate applications in an arbitrary order of windows.

For realizing this process, the program of portable telephone 40 operates in the following manner. As it is a drag of an activating icon, the result of determination at step 162 of FIG. 15 is YES, and step 164 is executed.

Referring to FIG. 16, the result of determination at step 190 is YES, and the determination at step 192 is made. The dragging direction is vertical, the result of determination at step 192 is NO, and the result of determination at step 214 is YES, so that the process of step 216 is executed.

Referring to FIG. 18, y-coordinate of dragged position of the activating icon is obtained at step 320. At step 322, in accordance with the value of y-coordinate, the design of the activating icon is changed in accordance with the allocation shown in FIG. 12, and the icon is displayed at the dragged position. At step 324, whether or not there is a touch-up is determined. If there is a touch-up, the flow proceeds to step 326, at which the icon-window correspondence table 150 is updated in accordance with the coordinates of the activating icon at the time of touch-up.

—Display of Function Menu in Response to Long-Pressing of Operating Icon—

Figure 37:
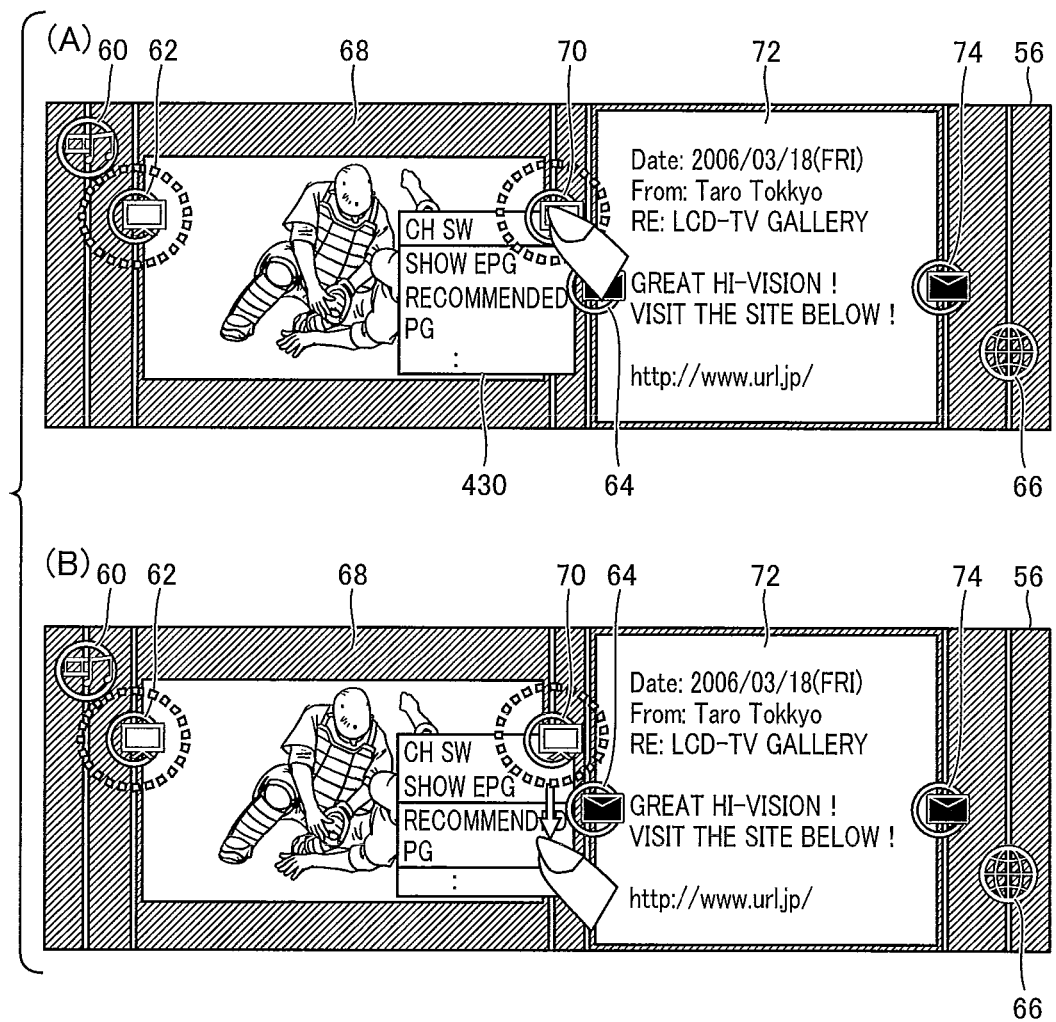
FIG. 37 shows that a function menu is displayed when an operating icon is kept pressed for a prescribed time period or longer, and that a desired function can be selected and executed from the function menu.

In the present embodiment, when the user presses an operating icon for a prescribed time period or longer, a function menu is displayed near the operating icon that is pressed, as shown by a function menu 430 of FIG. 37(A). The user drags the function menu 430 as shown in FIG. 37(B), and releases his/her finger on a desired item, whereby the function displayed at the released position can be executed by portable telephone 40.

The program operation at this time is as follows. At step 162 of FIG. 15, what is operated is an operating icon, and therefore, the result of determination is NO, and the flow proceeds to step 166. The result of determination at step 166 is YES, and the process of step 168 is executed.

Referring to FIG. 19, here, the user is long-pressing operating icon 70 (see FIG. 37(A)) and, therefore, the result of determination at step 220 is YES. As a result, the process of "function menu display/selection" at step 222 is executed.

Referring to FIG. 21, at the start of this process, a function menu is displayed near the operating icon that is long-pressed, at step 340. The contents of function menu to be displayed are stored in application-specific information 136 shown in FIG. 11. In the example shown in FIG. 37(A), character sequences such as CH (channel switch), EPG display, Recommended program and the like are displayed as function names.

At step 342, a drag position is obtained from an output of capacitance type touch panel 59, and at step 344, a function name corresponding to the drag position is highlighted. The function name corresponding to the dragged position is displayed in this manner until there is a touch-up, and when there is a touch-up, an event is issued to realize the selected function of the application by the processes at steps 348 and 350, which event is passed to the corresponding application. In FIG. 37(A), "CH switch" at the head is highlighted, while in FIG. 37(B), the function name "Recommended program" selected by dragging is highlighted.

By long-pressing the operation menu in this manner, the function menu is displayed, and a desired function is selected from the function menu to be executable. Therefore, it is possible to display a plurality of windows using a small area of display screen 56 and to easily select and execute functions unique to respective windows.

—Switching Between Portrait and Landscape Displays—

As described above, in portable telephone 40, it is possible to switch between portrait and landscape displays. The portrait display refers to a display style in which an image is laid-out erected in a direction parallel to the longer side of display screen 56, and the landscape display refers to a display style in which an image is laid-out erected in a direction parallel to the shorter side of display screen 56.

Switching of display may be controlled by changing the value of a portrait/landscape flag in window management information 138 shown in FIG. 11. In the present embodiment, the program therefor is prepared separate from the image display program, and it is activated by pressing a prescribed button displayed on the screen.

Figure 38:
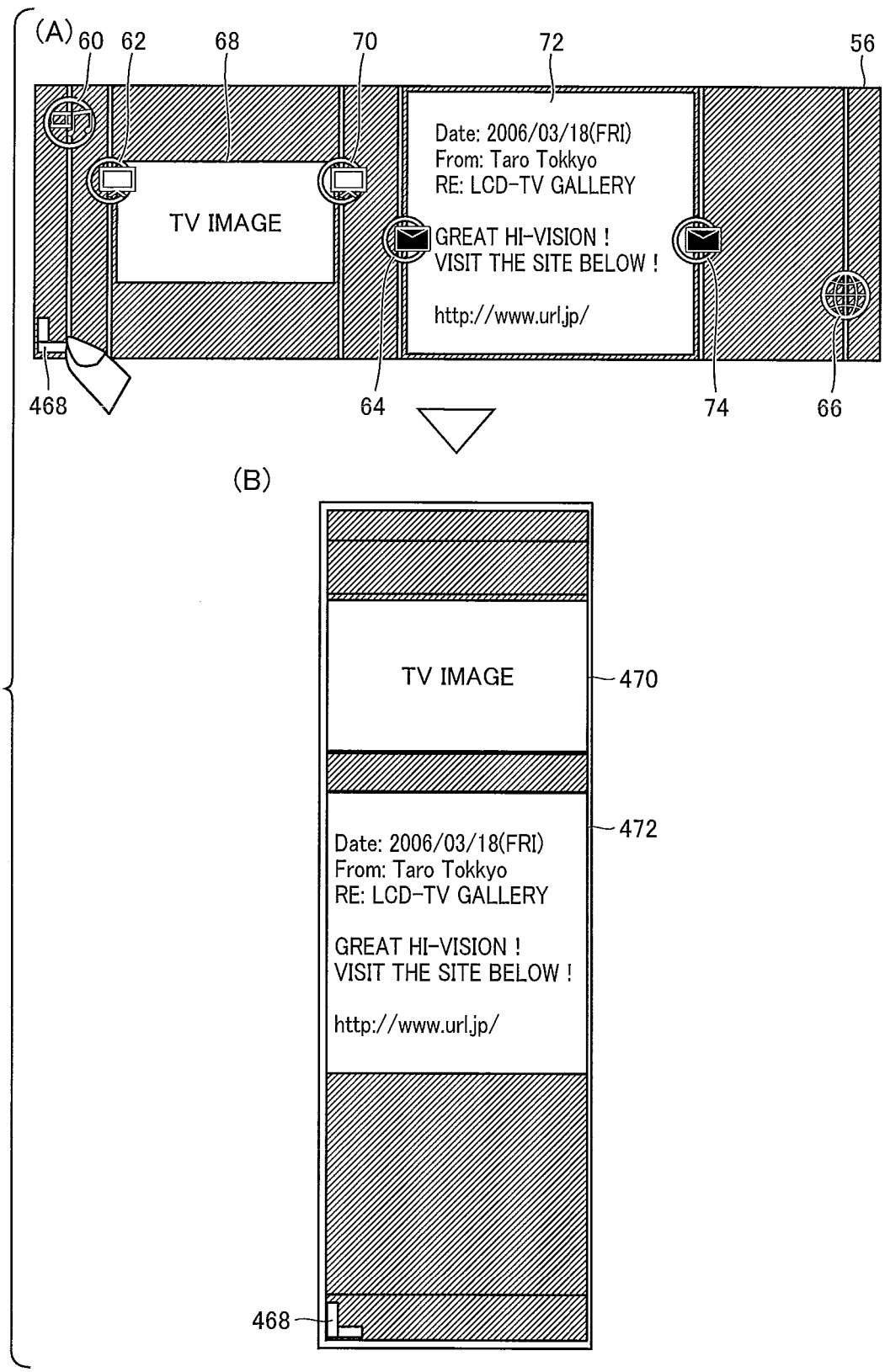
FIG. 38 shows change in display when portrait display and landscape display are switched, on portable telephone 40.

By way of example, assume that windows 68 and 72 are opened in landscape layout on the screen, and a portrait/landscape switching button 468 is displayed at a lower left portion of the screen, as shown in FIG. 38(A). When the portrait/landscape switching button 468 is pressed by a finger as shown in FIG. 38(A), the display is switched to the portrait layout as shown in FIG. 38(B). A window 470 in portrait display corresponds to window 68 of FIG. 38(A), and a window 472 corresponds to window 72 of FIG. 38(A). In the present embodiment, these windows 470 and 472 are arranged from the top, in accordance with the order of display (counted from the left) of corresponding windows 68 and 72 in the landscape display. On the lower left corner of portrait display, portrait/landscape switching button 468 is displayed. By pressing portrait/landscape switching button 468, it is possible to again switch the display to the portrait layout shown in FIG. 38(A).

It is noted that, in the portrait display, positional relation between application windows has higher significance than in the landscape display. By way of example, assume that for a mail application, a window 472 displaying received mails, a window 490 for forming a mail, and a window 492 displaying an input button, are to be displayed in combination. It may be convenient for input to have these arranged in order from the top, with window 492 positioned at the bottom. The reason for this is that the input button and the area where the input text is displayed should be as close as possible to each other, and in order to form a reply mail, it is desired that the received mail can be displayed simultaneously, close to each other.

Figure 39:
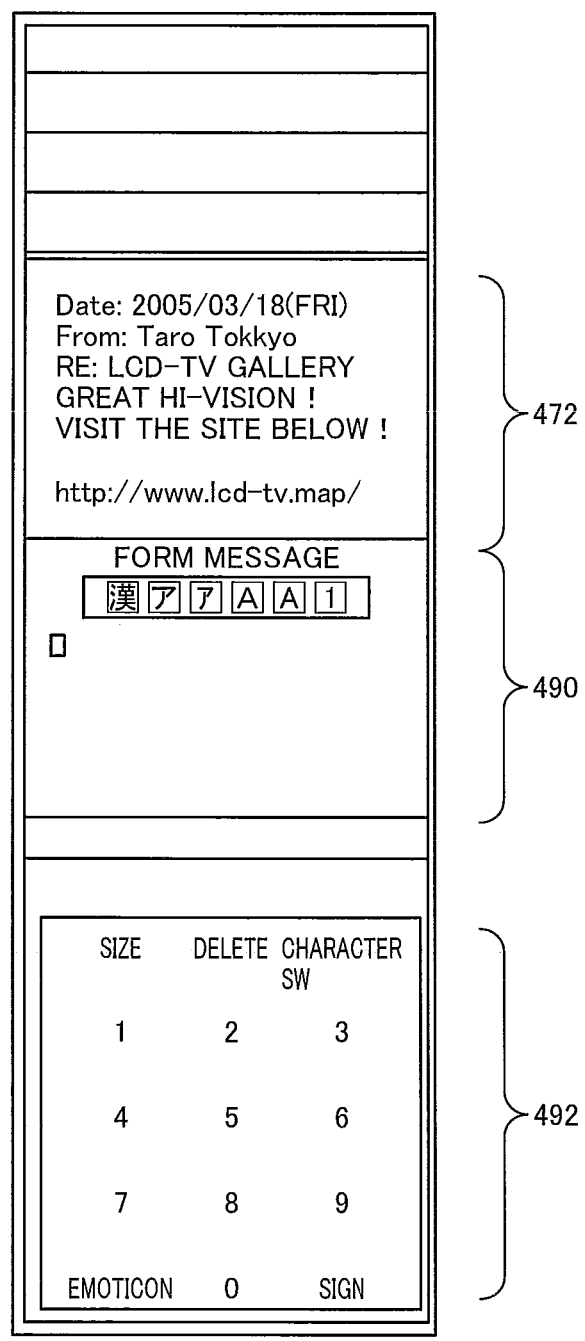
FIG. 39 shows an exemplary arrangement of windows in the portrait display.

Therefore, in portrait display, application-related information 142 shown in FIG. 11 comes to have particularly high importance. In order to realize a display such as shown in FIG. 39, the windows of a received mail displaying program and a mail forming program are designated to be positioned next to each other in this order, and the windows of the mail forming program and the input button are designated to be positioned next to each other in this order. By such designations, display in such an order as shown in FIG. 39 can be realized.

As regards the applications to be displayed next to each other, not a pair but a set of three or more applications may be designated.

For the landscape display, it may be necessary to change the order of images, depending on which hand the user uses for input. If the user operates the operation panel with his/her right hand, it is desirable to place the window 72 of mail forming program at the center and the operation panel 500 on the right side thereof, and other window 68 on the left side of window 72, as shown in FIG. 40(A). On the contrary, if the user operates the operation panel with his/her left hand, it is desired to switch the positions of operation panel 500 and window 68 as shown in FIG. 40(B) from the arrangement of FIG. 40(A), so that operation panel 500 comes to the left end.

Therefore, it is desired that the application-related information 142 shown in FIG. 11 can be freely set by the user.

In any case, if switched to the portrait layout, it is desired to have the operation panel 510 at the bottom and the window 512 for forming mail positioned immediately thereabove, as shown in FIG. 40(C).

Figure 40:
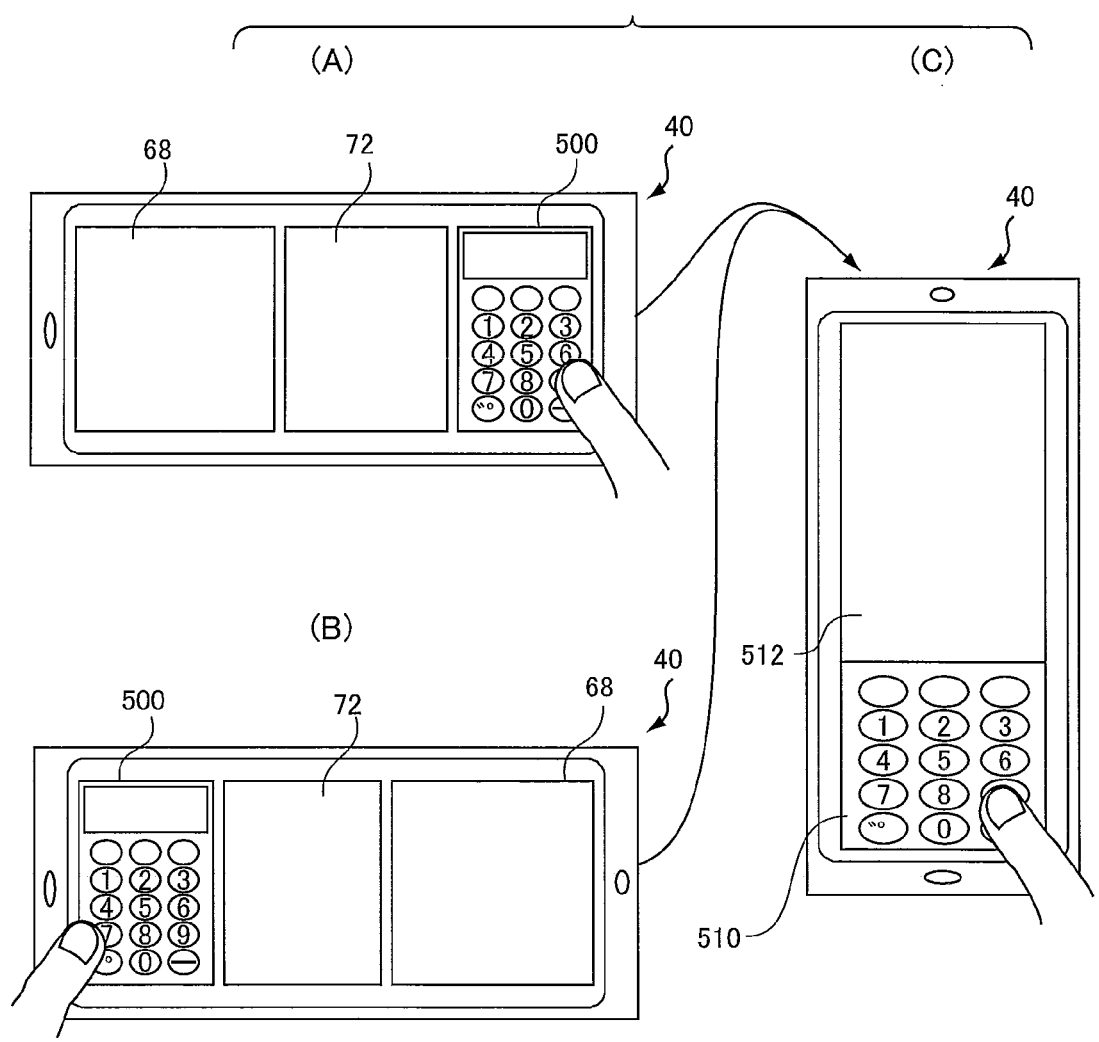
FIG. 40 shows possible variations in arrangement in landscape display, and a portrait display that can commonly be allocated to the variations.

In most cases, the display is switched to the portrait layout to input something, as it is considered easier to concentrate on input with the portrait display. Therefore, if the display is switched from landscape to portrait layout, operation panel 510 for text input may automatically be displayed at the bottom as shown in FIG. 40 (C). Further, any window that is not related to text input may be closed as shown in FIG. 40(C).

In the embodiment above, when there is a combination of applications designated to be displayed next to each other and if the window of one application is opened while the application of the other window has already been displayed, the window positions are simply changed so that the windows are positioned next to each other. The present invention, however, is not limited to such an embodiment. If the window of one application is opened while the application of the other window has not been opened, the window of said the other application may be opened simultaneously and the windows may be arranged on areas next to each other. In that case, assume that a combination of any application that does not correspond to any of the existing windows and an application corresponding to a designated activating icon is stored in the application-related information 142. In regard of this combination, a window of an application that is not the application corresponding to the designated activating icon is adapted to be opened next to the window of the application that corresponds to the designated activating icon.

—Display of New Icon—

In the embodiment above, when a user designates (presses) a portion that is neither an icon nor a window on display screen 56 for a prescribed time period or longer, a new activating icon can be added. Specifically, as shown in FIG. 8(A), when a user designates a portion in an area that is not an icon or window such as the area between operating icon 74 and activating icon 66 continuously for a prescribed time period or longer, a new activating icon 77 is displayed at the portion as shown in FIG. 8(B). This process is done at steps 178 and 180 of FIG. 15.

The displayed activating icon is determined by a range of y-coordinate (coordinate along the shorter side) on the display (step 180) of the designated portion. As already described with reference to FIG. 12, for each icon, an application and the range of y-coordinate of the display are allocated. Therefore, in the present embodiment, when a certain portion on the display that is neither an icon nor a window is designated by the user for a prescribed time period or more, the activating icon determined by its y-coordinate is displayed, and the application corresponding to the y-coordinate is allocated to the activating icon. In FIG. 8(B), the user designates a portion of the same y-coordinate as the icon of mail application. As a result, an activating icon for the mail application is added to the portion designated by the user, and it becomes possible to display a plurality of windows for the mail application.

The number of activating icons can be increased in this manner and, therefore, if the number of displayed icons runs short, icon or icons can be added. This is effective when a plurality of pages such as web browser pages are to be compared. For instance, assume that one browses pages of a web browser. It may be sometimes desirable, when one views a page (let us call this "page A") and then views another page ("page B"), to have page A kept activated, so that one can immediately view page A at any time. In the present embodiment, even when the window of page A is closed, the application is not terminated and the application that is active can be continued when designated next time. Therefore, it is possible to have page A kept activated so that it can be viewed immediately at any time. If the number of pages that are desired to be kept activated increases, the number of activating icons may run short. In such a case, in the portable telephone in accordance with the present embodiment, the number of activating icons can be increased and the necessary number of applications can be activated thereby.

When an activating icon is added, an entry corresponding to the added icon is added to icon-window correspondence table 150. Specifically, to icon-window correspondence table 150, a pair of new window No. and a display position of the newly displayed activating icon is added.

The activating icon may be erasable. By way of example, by designating an activating icon of which window has been closed and dragging it in the vertical direction, the activating icon may be erased. At this time, when the destination position of dragging (position where dragging ends) reaches a range out of any range of y-coordinate of each icon shown in FIG. 12, the icon is erased. With reference to the values shown in FIG. 12, when the designated activating icon is dragged in the vertical direction and the y-coordinate value of the center of icon reaches 200 or larger (y≥200), display of the icon ends.

In the flow shown in FIG. 16, if it is determined to be a dragging operation at step 190, whether the dragging direction is horizontal or not is determined at step 192. If the dragging is in the vertical direction, the process proceeds to step 214, and whether the application has been inactive or not is determined. If the application is determined to be inactive, the process of step 216 is executed. The function of erasing an activating icon is realized by modifying the program represented by the control structure shown in FIG. 18 in the following manner.

Referring to FIG. 18, the process of erasing an activating icon will be described. At step 320, coordinate values of a position pressed by the finger on display screen 56 that is being dragged are obtained. In the following step 322, display of the activating icon so far is erased, and the corresponding icon is drawn at the position defined by the coordinate values obtained at step 320. At this time, if the obtained coordinate values are in a range out of any ranges of the y-coordinate of icons shown in FIG. 12, drawing does not take place. Specifically, in this situation, the activating icon is erased. At step 326, the entry corresponding to the erased icon is deleted from icon-window correspondence table 150 (see FIG. 12).

In this manner, the process of erasing an activating icon can be realized. The process thereafter is the same as described above.

As described above, since the activating icon can be erased, an icon or icons that became cumbersome can be erased if, for example, too many icons come to be displayed on the screen.

—Display Upon Event Occurrence—

Figure 41:
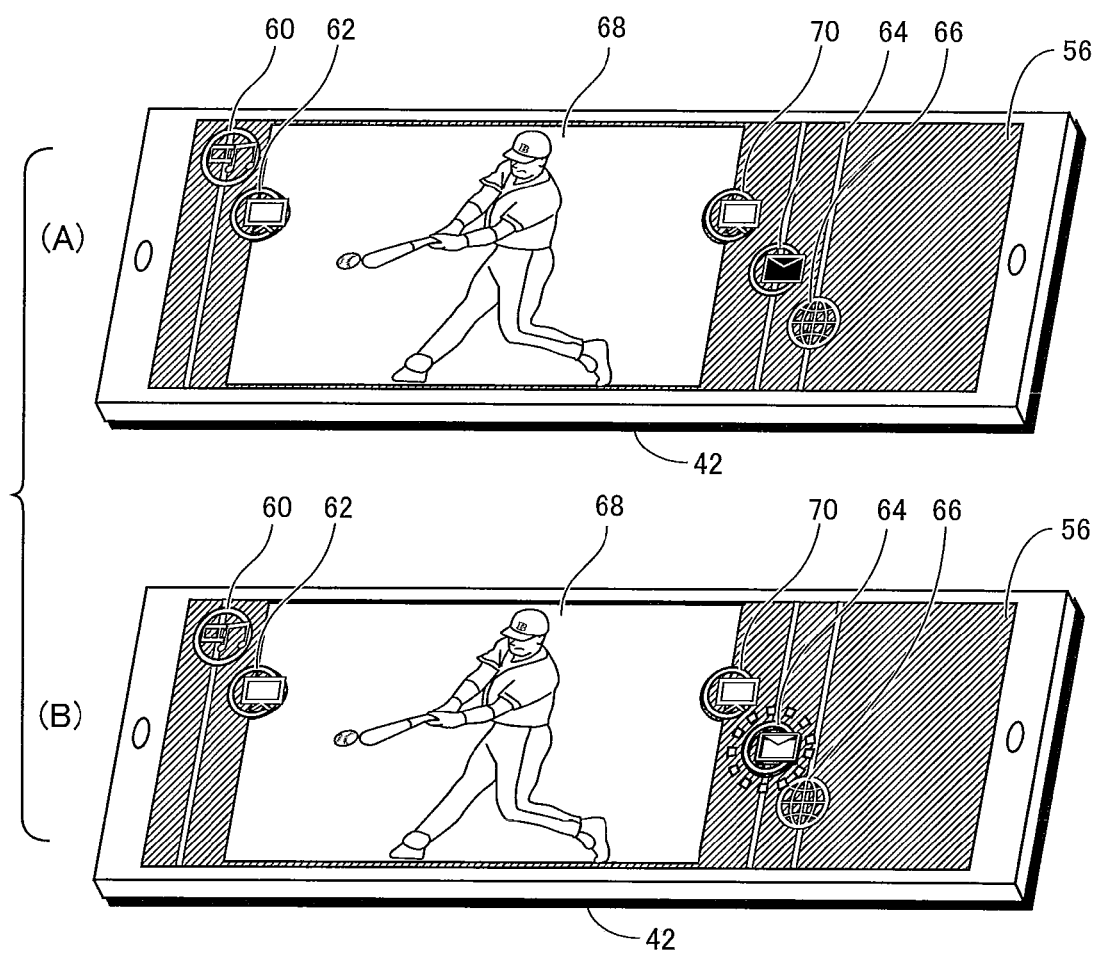
FIG. 41 illustrates an operation and display of portable telephone 40 when an e-mail incoming event occurs.

Referring to FIG. 41, by way of example, an operation of portable telephone 40 when an electronic mail reception event occurs while the mail program is inactive will be described. Referring to FIG. 41, assume that the user is watching television broadcast on window 68. The initial value of icon display flag is 0 and, therefore, other activating icons 60, 64 and 66 are displayed in the normal manner, as shown in FIG. 41(A). If a mail reception event occurs here, a program, whose control structure is shown in FIG. 23, is activated and executed by communication control unit 120.

Referring to FIG. 23, communication control unit 120 first stores the received mail in memory 98 at step 381, and updates received mail information of preference data of the mail program. Thereafter, at step 382, whether the mail program is active or not is determined. In the example shown in FIG. 41(A), the mail program is not activated and, therefore, the process of step 383 is executed, and the value of icon display flag is set to 1. Further, by the process of step 387, display of the mail program icon is executed in accordance with the icon display flag. As a result, activating icon 64 of the mail program is displayed in reversed manner, as shown in FIG. 41(B). Since the activating icon 64 of mail program is displayed in the reversed manner, the user notices that a new mail has been received.

Here, assume that the user activates the mail program. The program, whose control structure is shown in FIG. 24, is executed by communication control unit 120. First, at step 391, communication control unit 120 reads the preference data of mail program. At step 392, whether the icon display flag in the read preference data is 0 or not is determined. Here, the icon display flag has a value 1. Therefore, communication control unit 120 executes the process of step 393, at which a list of received mails is displayed. Further, the value of icon display flag is returned to 0 at step 394, and icon 64 is redisplayed in the normal manner, at step 395.

Control after display of each image is conducted in accordance with a method accompanying the control displayed on each image. Specifically, various controls (button, field, pull-down menu and the like) displayed on each image have accompanying methods that correspond to the actions of a user. A method in accordance with the user's action is activated and prescribed process is executed accordingly.

In this manner, even when an application is not activated or when the application is activated but a window is not opened, in response to an occurrence of an event, the activating icon corresponding to the application is displayed in the reversed manner and, therefore, the user can readily understand that some event has occurred in connection with this task. By touching the reverse-displayed icon, the window corresponding to the task can be opened and necessary process for the event can easily be carried out.

In the embodiment described above, when activating icon 64 of the mail program is displayed in a normal manner and activating icon 64 of the mail program is touched, a new mail forming image or a function list image is displayed. If activating icon 64 is touched while it is displayed in the reversed manner, a list of received mails is displayed. Specifically, the mail program can be activated in a manner considered most appropriate for the user. Further, it is possible for the user to designate beforehand, using the preference data, which of the new mail forming image and the function list image is to be displayed when activating icon 64 displayed in the normal manner is touched. As a result, the user can customize the mail program behavior as he/she likes.

In the embodiment above, when a mail is received, the activating icon 64 of the mail is displayed in the reversed manner. The present invention, however, is not limited to such an embodiment. Similar control is possible in programs other than the mail program. By way of example, FIG. 42 shows an exemplary display when there is an incoming call to the portable telephone when the user is watching a television broadcast or enjoying reproduction of music or movie.

Figure 42:
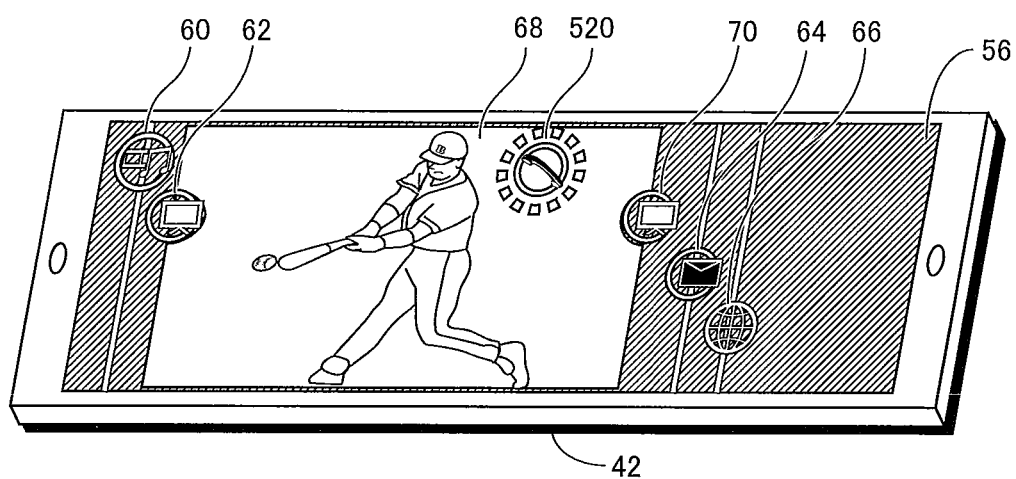
FIG. 42 shows an example of operation and display of portable telephone 40 when there is an incoming call to portable telephone 40 while watching television broadcast.

Referring to FIG. 42, when there is an incoming telephone call while window 68 of television broadcast is open, an activating icon 520 for the telephone application is newly displayed on the screen. Though activating icon 520 may be displayed in the similar manner as other icons, it is preferably displayed in the reversed or flickering manner, to indicate that some action is necessary. By touching activating icon 520, the telephone application is activated, and the user can answer the call.

As described above, in response to an occurrence of some event, an activating icon of the application for processing the event is displayed, so that the user is urged to touch the activating icon. As a result, it becomes possible for the user to easily activate an application appropriate for the event. Specifically, the user can easily understand what kind of operation is to be taken.

In the example shown in FIG. 42, normally, activating icon 520 corresponding to the telephone application is not displayed and activating icon 520 is displayed upon reception of an incoming call. The present invention, however, is not limited to such an application. By way of example, activating icon 520 for the telephone application may be displayed constantly in the normal display manner similar to activating icon 64, and the manner of display may be changed upon reception of an incoming call.

The manner of display different from the normal manner may include reversing or flickering of the icon, changing the color of icon display, increasing luminance, changing the size, and pulsating the color, luminance or size at prescribed time intervals.

As described above, by the portable telephone in accordance with the present embodiment, it is possible to build a multi-window system using a small display screen 56 of the portable telephone. Windows are not overlapping with each other, and it is unnecessary to manually move or erase windows one by one to have a view of a hidden window. Further, icons are arranged on opposite sides of the window, and by operating the icons, it is possible to re-size the window, to activate an application, or to designate window size at the time of activation. It is unnecessary to arrange a large number of buttons on the screen or to arrange a menu using valuable area, and an easy-to-operate multi-window system having multiple functions can be built even with a small screen.

By moving an icon in the horizontal direction when display is in the landscape style and by moving an icon in the vertical direction when display is in the portrait style, the window size can be changed or the window can be moved. Therefore, the operation can easily be understood intuitively and, therefore, even a user not having much knowledge of operation can execute processes using multiple windows in a simple manner. Further, a window whose width has become smaller than a prescribed value as a result of window re-sizing is closed and, therefore, too large a number of windows are not opened on the screen. Therefore, the image display is kept always well-organized.

Further, by long-pressing an icon, an operation guidance or a function menu can be displayed and various and many processes can be realized through a simple interface.

<Modification>

Figure 43:
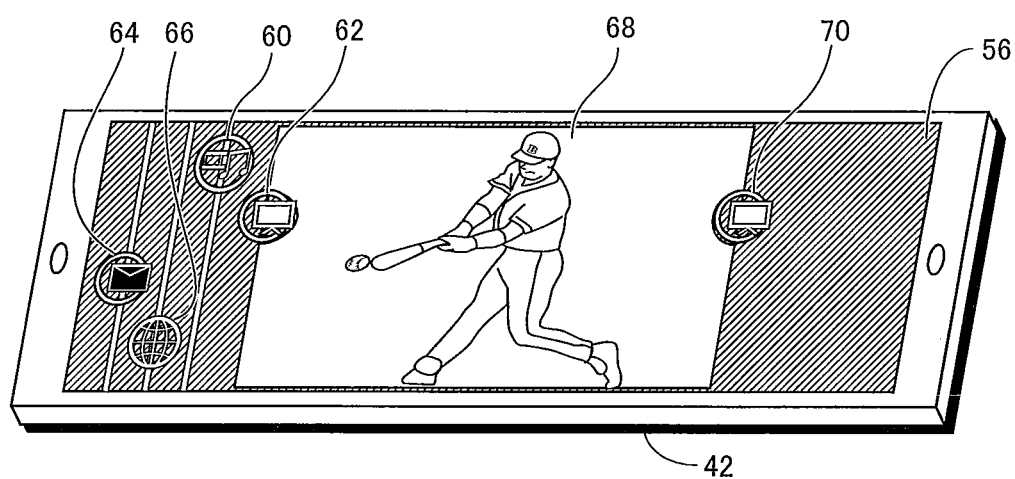
FIG. 43 illustrates a modification of display manner when a window is opened upon operation of an activating icon.

In the embodiment above, when an icon is designated, a window is newly opened between the icon and a neighboring icon. The present invention, however, is not limited to such an embodiment. The window may be opened anywhere, provided that it is opened in a manner allowing the user to easily understand the relation between the designated icon and the newly opened window. For instance, a new window may be opened not between neighboring icons but on a position next to the designated icon and not overlapping with any other icon or existing window. FIG. 43 shows one such example.

Here, it is assumed that icons 60, 62, 64 and 66 are initially displayed in the manner as shown in FIG. 4, and the user touches icon 62. In the embodiment above, a new window is opened between icons 62 and 64. In the example shown in FIG. 43, however, icon 62 is moved to the right side of icons 64 and 66, and then a new window 68 is opened further on the right side of icon 62. In this manner, a new window may be opened avoiding overlapping between the new window and other icon or window, by changing the position of other icon or window.

Further, in the embodiment described above, functions are allocated such that when an activating icon is dragged in the horizontal direction, the window is moved, and when an operating icon is dragged in the horizontal direction, the window is re-sized. The present invention, however, is not limited to such an embodiment. By way of example, it is possible to allocate both functions of window movement and re-sizing to the dragging of an activating icon. This requires attention, however, as described below.

Figure 44:
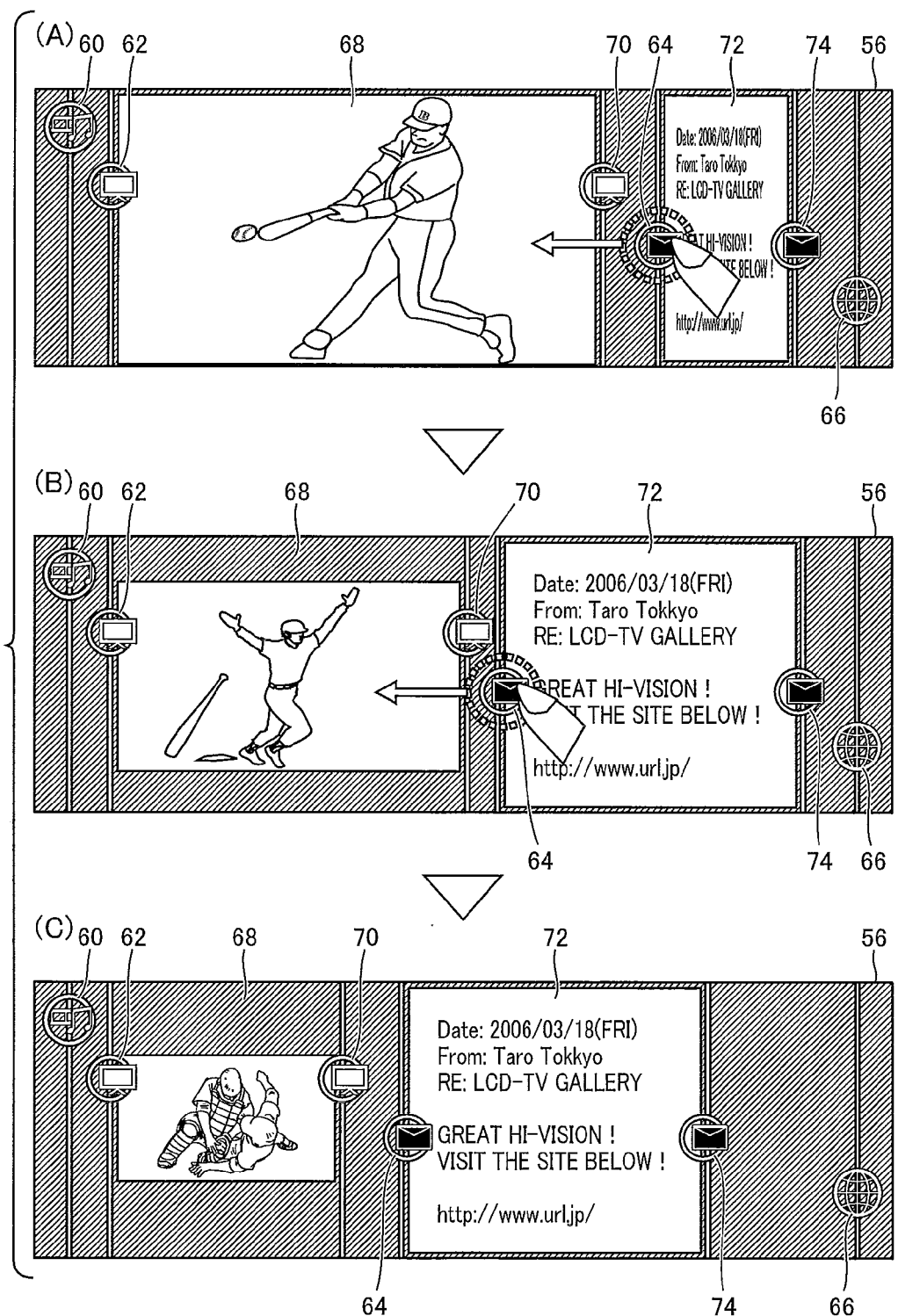
FIG. 44 shows manners of window re-sizing and movement when a window re-sizing/moving function is allocated to an activating icon.

Referring to FIG. 44(A), assume that windows 68 and 72 are displayed on display screen 56 in this order. Assume that the user drags activating icon 64 of window 72, in this state. In the embodiment described above, by such a dragging operation, only the position of window 72 moves to the left, and the size of window 72 is kept unchanged. Here, in the present embodiment, when activating icon 64 is dragged, first, the right side of window 72 is fixed, and by moving the position of left side by the drag distance, window 72 is enlarged. Movement and change of size of elements on the left side of icon 64 may be done as desired, and, for example, updating in the similar manner as described in the embodiment above may take place. In FIG. 44, there is no element that can further be reduced on the left side of window 68 as shown in (B), and hence, window 68 is reduced to a size in accordance with the drag distance of activating icon 64.

When the size of window 72 is increased in this manner and the size reaches the maximum window size defined for the application of window 72, re-sizing of the window is no longer continued in the present modification, and the window of the maximum size is moved in accordance with the dragging. The manner is as shown in FIG. 44(C).

Referring to FIG. 44(C), when the window 72 reaches the maximum size and activating icon 64 is further dragged to the left thereafter, the size of window 68 is reduced, and on the contrary, an unused area appears on the right side of window 72.

In this manner, in connection with window movement/re-sizing, what role is to be allocated to the activating icon or the operating icon is simply a design matter, and any allocation may be possible in accordance with the design intention.

Figure 45:
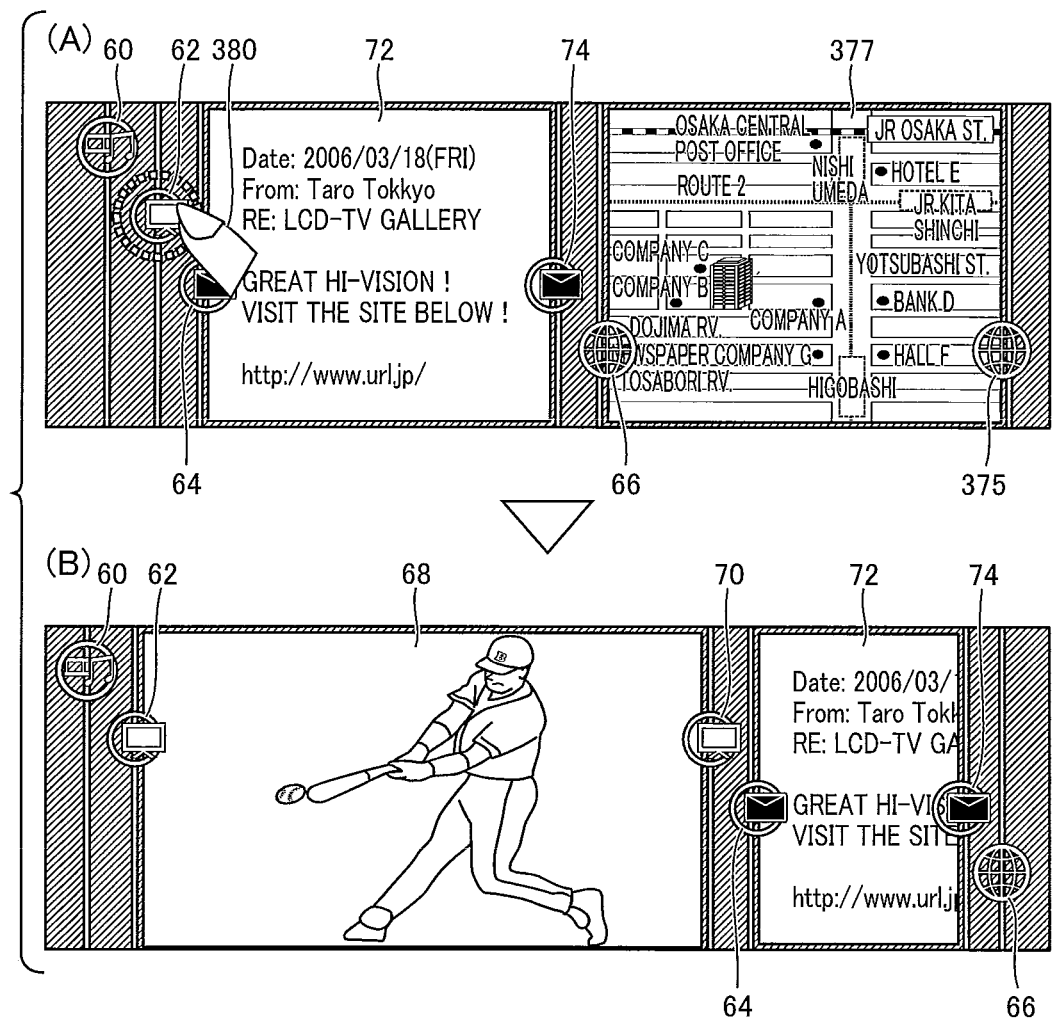
FIG. 45 shows an example in which only a possible range is displayed without re-sizing windows, when an activating icon is operated.

In the embodiment described above, when a new window is opened, it is sometimes necessary to re-size another window. In connection with the window re-sizing, in the embodiment described above, the window size itself is changed at step 252 of FIG. 17. The present invention, however, is not limited to such an embodiment. Only a portion that can be displayed may be displayed, without re-sizing the window and without re-sizing the display inside the window. FIG. 45 shows such an example.

Referring to FIG. 45, in this example, when activating icon 62 is touched while windows 72 and 377 are displayed, window 377 is closed as in the embodiment described above. Different from the embodiment described above, however, window 72 is not re-sized. Here, window 68 is newly displayed in a default size and, therefore, it becomes impossible to display window 72 as a whole. Therefore, in this example, the left side of window 72 is made use of, and the right side portion is displayed to the extent possible, and the further right portion is not displayed.

By such an approach, it becomes impossible to confirm the full text. However, as the character size is unchanged, characters are still easy to read and the contents can easily be grasped. The same applies to a map or image, in addition to characters. Such a display can easily be realized by changing the process at step 252 of FIG. 17, such that only a portion that can be displayed is displayed while not re-sizing window 72.

Here, what is discarded may not be the right side. Only the central portion of a window may be used and opposite ends may not be displayed.

Further, if the displayable window size is too small to fully display the contents therein, a left/right scroll bar or a scroll button may be displayed on the window to enable confirmation of the full image by scrolling.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

Industrial Applicability

The present invention is applicable to a device that displays a plurality of windows on a screen to allow information processing, as represented by a portable information device.

The invention claimed is:

1. An information processing apparatus allowing input/output through a graphical user interface, comprising:
    a touch-sensitive display screen including a rectangular area with longer and shorter sides; and
    a multi-window management apparatus displaying a plurality of windows on said display screen and allocating the plurality of windows to tasks executable on said information processing apparatus, respectively, the multi-window management apparatus including
        activating icon display means for displaying, on said display screen, two or more activating icons arranged with respective areas not overlapping with each other;
        window display means responsive to designation of any of said activating icons by a user through said graphical user interface, for opening a new window corresponding to the activating icon next to said designated activating icon and for, after the new window is opened, displaying an operating icon on an opposite side of the new window from the designated activating icon ; and
        first window arranging means responsive to designation of any of said activating icons by the user through said graphical user interface, for re-arranging any existing window displayed on said display screen and any activating icon other than said designated activating icon such that they do not overlap on an area on which said new window is opened and the displayed windows are arranged along said longer side, and displaying these on said display screen, wherein
    the new window displayed by said window display means has a rectangular shape,
    said designated activating icon and said operating icon are arranged and displayed on two sides parallel to a shorter side of said new window in a manner that identifies the new window as a currently active window, by way of
    said operating icon being displayed as the same shape as said designated activating icon, and
    said designated activating icon and said operating icon are being arranged at positions where a segment connecting their centers becomes parallel to said longer side.

2. The information processing apparatus according to claim 1, wherein the multi-window management apparatus further comprises
    window reducing means for reducing, when said existing window is re-arranged by said first window arranging means and it is impossible to display all windows unless size of the existing window is reduced, the size of the existing window such that re-arrangement of said existing window by said first window arranging means becomes possible.

3. The information processing apparatus according to claim 2, wherein
    said window reducing means includes means for reducing, when said existing window is re-arranged by said first window arranging means and it is impossible to display all windows unless size of the existing window is reduced, size of existing window in accordance with priority allocated to each window such that a window of low priority is reduced with larger reduction ratio and a window of high priority is reduced with smaller reduction ratio, and
    priority storage means for storing said priority window by window.

4. The information processing apparatus according to claim 3, wherein the multi-window management apparatus further comprises means, responsive to opening of a window, for storing the priority in said priority storage means such that a window that is opened later comes to have higher priority.

5. The information processing apparatus according to claim 3, wherein the multi-window management apparatus further comprises means, responsive to a window being activated, for storing the priority in said priority storage means such that a window that is activated later comes to have higher priority.

6. The information processing apparatus according to claim 2, wherein the multi-window management apparatus further comprises window closing means, when said existing windows are re-arranged by said first window arranging means, if any window comes to have its length along said longer side shorter than a prescribed threshold value as a result of window reduction made by said window reducing means, for closing that window and leaving display of a corresponding activating icon.

7. The information processing apparatus according to claim 6, wherein when closing a window, said window closing means does not terminate execution of a corresponding task if the task is a specific task, and displays corresponding said activating icon in a manner different from a normal display manner.

8. The information processing apparatus according to claim 1, wherein said activating icon display means includes means for arranging and displaying said two or more icons such that display areas of respective activating icons are not overlapping both in a direction parallel to said longer side and a direction parallel to said shorter side.

9. The information processing apparatus according to claim 1, wherein the multi-window management apparatus further comprises:

window moving means, responsive to an activating icon displayed together with a corresponding window being dragged along said longer side direction, for moving said window in accordance with length and direction of dragging; and second window arranging means for re-arranging, when a window has been moved by said window moving means, any existing window displayed on said display screen and an activating icon other than said designated activating icon such that they are not overlapping on an area after movement of the window moved by said dragging and that displayed windows are arranged along said longer side direction, and for displaying them on said display screen.

10. The information processing apparatus according to claim 9, wherein said second window arranging means maintains order of display of windows in said longer side direction, in the re-arrangement of existing windows when a window has been moved by said window moving means.

11. The information processing apparatus according to claim 10, wherein said second window arranging means includes means for re-arranging, in the re-arrangement of existing windows when a window has been moved by said window moving means, a window by reducing size of said longer side direction of a blank area existing ahead of said window moving direction on said display screen, and means for reducing, when such a blank area runs out, size of a window existing ahead of said window moving direction by an amount of movement of said moved window.

12. The information processing apparatus according to claim 11, wherein the multi-window management apparatus further comprises window closing means for closing a window that comes to have its length along said longer side shorter than a prescribed threshold value as a result of window re-arrangement by said second window arranging means, and leaving display of a corresponding activating icon.

13. The information processing apparatus according to claim 9, wherein in the re-arrangement of existing windows when a window has been moved by said window moving means, said second window arranging means maintains size of each window in said shorter side direction, and changes size of the windows in the longer side direction.

14. The information processing apparatus according to claim 13, wherein when a window re-arranged by said second window arranging means is displayed, an output image of the corresponding task is displayed with size of the window in said shorter side direction maintained and reduction scale in said longer side direction changed in accordance with the change in window size.

15. The information processing apparatus according to claim 14, wherein when a window re-arranged by said second window arranging means is displayed, if an output from the corresponding task is text data, the text data is displayed in the window in a font reduced in size at least in said longer side direction than a font used for normal display.

16. The information processing apparatus according to claim 14, wherein when a window re-arranged by said second window arranging means is displayed, if an output from the corresponding task is text data, the text data is displayed in the window with linefeed inserted in accordance with window width.

17. The information processing apparatus according to claim 13, wherein when a window re-arranged by said second window arranging means is displayed, in order to have an output image from the corresponding task fully displayed in said window, overall size of said output image is enlarged or reduced with its aspect ratio maintained.

18. The information processing apparatus according to claim 1, wherein the multi-window management apparatus further comprises window size changing means, responsive to dragging of an operating icon displayed together with a corresponding window along said longer side direction, for changing size of the window in said longer side direction in accordance with length and direction of said dragging.

19. The information processing apparatus according to claim 18, wherein said window size changing means changes, when said operating icon is dragged, the size of said window in said longer side direction, while maintaining position of an activating icon forming a pair with said operating icon.

20. The information processing apparatus according to claim 18, wherein the multi-window management apparatus further comprises
  window closing means, responsive to the size in said longer side direction of the window of which operating icon has been dragged becoming smaller than a prescribed threshold value as a result of window size change by said window size changing means, for closing the window and leaving a corresponding activating icon.

21. The information processing apparatus according to claim 1, wherein the multi-window management apparatus further comprises
  means, responsive to said operating icon displayed on said shorter side of a window displayed on said display screen being designated continuously for a prescribed time period or longer by said graphical user interface, for displaying operation information related to operation of a task corresponding to the window, on said display screen.

22. The information processing apparatus according to claim 21, wherein
  said operation information is a function menu listing functions of a task corresponding to said window;
  said multi-window management apparatus further comprising
  means, responsive to designation of any function of said function menu by said graphical user interface, for executing the function.

23. The information processing apparatus according to claim 1, wherein the multi-window management apparatus further comprises
  means, responsive to said activating icon displayed on said shorter side of a window displayed on said display screen being designated continuously for a prescribed time period or longer by said graphical user interface, for displaying operation information related to operation of a task corresponding to the window, on said display screen.

24. The information processing apparatus according to claim 1, wherein the multi-window management apparatus further comprises
  window activating means, responsive to designation of an inner area of any of the windows existing on said display screen by said graphical user interface, for setting the window to an active window, setting any other window to an inactive window, and displaying said activating icon and said operating icon of the window set to the active window in a manner different from the activating icon and the operating icon of other window.

25. The information processing apparatus according to claim 1, wherein the multi-window management apparatus further comprises
  default window size storage means for storing default size of a window corresponding to said two or more activating icons; wherein
  said window display means includes means, responsive to designation of any of said activating icons by a user through said graphical user interface, for opening a new window corresponding to said activating icon in an area next to said designated activating icon in a default size stored in said default window size storage means.

26. The information processing apparatus according to claim 1, wherein
  said window display means includes means, responsive to any of said activating icons designated by said graphical interface and dragged in said longer side direction, for opening a new window corresponding to the activating icon in a size corresponding to a drag distance of the designated activating icon, in an area next to said designated activating icon.

27. The information processing apparatus according to claim 1, wherein the multi-window management apparatus further comprises
  task combination information storage means for storing task combination information specifying a combination of tasks to which neighboring windows are to be allocated; wherein
  said first window arranging means includes
    determining means, responsive to designation of any of said activating icons by a user through said graphical user interface, for determining whether or not a combination of any of tasks corresponding to existing windows and a task corresponding to said designated activating icon is stored in said task combination information storage means,
    order changing means, responsive to a determination by said determining means that a combination of any of tasks corresponding to existing windows and a task corresponding to said designated activating icon is stored in said task combination information storage means, for changing order of existing windows displayed on said display screen and activating icons other than said designated activating icon, such that windows of these tasks are arranged next to each other, and
    means for re-arranging and displaying on said display screen said existing windows and the activating icons other than the designated activating icon such that any of these is not overlapping on an area on which said new window is to be opened, and that displayed windows are arranged along said longer side direction.

28. The information processing apparatus according to claim 27, wherein
  said task combination information storage means includes display order information storage means for storing display order information specifying a combination of tasks to which neighboring windows are to be allocated and an order of display of corresponding windows;
  said multi-window management apparatus further comprising
    display direction switching means, responsive to a user input designating switching of display direction on said display screen, for switching display in each window displayed on said display screen between a first display direction in which an image is displayed erected in a direction parallel to said longer side and a second display direction in which an image is erected in a direction parallel to said shorter side; wherein
  said order changing means includes
    means, responsive to a determination by said determining means that a combination of any of tasks corresponding to displayed windows and a task corresponding to said designated activating icon is stored in said task combination information storage means,
    for changing, when display direction after switching by said switching means is said first display direction, order of existing windows displayed on said display screen and activating icons other than said designated activating icon, such that windows of these tasks are arranged next to each other and in accordance with the order of display stored in said display order information storage means, and
    for changing, when display direction after switching by said switching means is said second display direction, order of existing windows displayed on said display screen and activating icons other than said designated activating icon, such that windows of these tasks are arranged next to each other.

29. The information processing apparatus according to claim 27, wherein
said first window arranging means further includes
means, responsive to designation of any of said activating icons by a user through said graphical user interface, for opening, when a combination of any task not corresponding to any of the existing windows and a task corresponding to said designated activating icon is stored in said task combination information storage means, a window of the task other than the task corresponding to said designated activating icon of said combination, next to a window area of the task corresponding to said designated activating icon.

30. The information processing apparatus according to claim 1, wherein the multi-window management apparatus further comprises
exclusive task combination information storage means for storing exclusive task combination information specifying a combination of tasks whose windows are designated to be displayed exclusive with each other; wherein
said first window arranging means includes
means, responsive to designation of any of said activating icons by a user through said graphical user interface, for determining whether or not a combination of any of tasks corresponding to existing windows and a task corresponding to said designated activating icon is stored in said exclusive task combination information storage means,
window closing means, responsive to a determination by said determining means that a combination of any of tasks corresponding to displayed windows and a task corresponding to said designated activating icon is stored in said exclusive task combination information storage means, for closing the displayed window of the combination and changing the display to display of the corresponding activating icon,
means for rearranging and displaying on said display screen, when it is determined by said determining means that a combination of any of tasks corresponding to displayed windows and a task corresponding to said designated activating icon is stored in said exclusive task combination information storage means, existing windows remaining after closing of the window by said window closing means and activating icons other than said designated activating icon such that they are not overlapping on an area where said new window is to be opened and the displayed windows are arranged in said longer side direction, and
means for rearranging and displaying on said display screen, when it is determined by said determining means that a combination of any of tasks corresponding to displayed windows and a task corresponding to said designated activating icon is not stored in said exclusive task combination information storage means, said existing windows and said activating icons other than said designated activating icon such that they are not overlapping on an area where said new window is to be opened and the displayed windows are arranged in said longer side direction.

31. The information processing apparatus according to claim 1, wherein the multi-window management apparatus further comprises
operation guidance display means, responsive to designation of any of said two or more activating icons continuously for a prescribed time period or longer by said graphical user interface, for displaying an operation guidance of the activating icon on said display screen.

32. The information processing apparatus according to claim 1, wherein the multi-window management apparatus further comprises:
area storage means for storing ranges of a plurality of mutually-not-overlapping areas in the direction parallel to said shorter side in relation to a task allocated to each area;
area determining means, responsive to dragging of any of two or more activating icons in said direction parallel to said shorter side by said graphical user interface, for determining to which of said ranges of the plurality of areas in the direction parallel to said shorter side the display area of the activating icon after dragging belongs; and
task allocating means for allocating the activating icon to the task corresponding to the area determined by said area determining means.

33. The information processing apparatus according to claim 32, wherein the multi-window management apparatus further comprises
activating icon changing means for changing a shape of the activating icon dragged in the direction parallel to said shorter side to a shape indicating the task allocated by said task allocating means.

34. The information processing apparatus according to claim 1, wherein the multi-window management apparatus further comprises
activating icon display changing means, for displaying said two or more activating icons normally in a first manner of display, and, in response to occurrence of an event related to any of tasks corresponding to activating icons displayed on said display screen whose corresponding windows are not opened, for changing manner of display of said activating icon corresponding to the task related to the event to a second manner of display different from said first manner of display.

35. The information processing apparatus according to claim 1, wherein
size of the window opened by said window display means can be designated beforehand.

36. The information processing apparatus according to claim 1, wherein the multi-window management apparatus further comprises:
area storage means for storing ranges of a plurality of mutually-not-overlapping areas in the direction parallel to said shorter side in relation to a task allocated to each area; and
activating icon adding means, responsive to designation of an area belonging to neither the icon area nor the existing window area displayed on said display screen continuously for a prescribed time or longer by said graphical user interface, for determining to which of said ranges of the plurality of areas in the direction parallel to said shorter side the designated area belongs, displaying an activating icon corresponding to the task allocated to the determined area in said designated area, and allocating the task corresponding to said determined area to said activating icon.

37. The information processing apparatus according to claim 1, further comprising:
input/output means, having a rectangular display screen with longer and shorter sides, for performing input/output by graphical user interface in accordance with multi-window management using said display screen by said multi-window management apparatus; and task executing means, responsive to a user input by said input/output means, for executing a task corresponding to each window managed by said multi-window management apparatus, and for outputting a result of task execution to a window on the display screen of said input/output means.

38. A tangible non-transitory computer readable recording medium encoded with instructions, wherein the instructions when executed by an information processing apparatus having a touch-sensitive display screen including a rectangular area with a longer side and a shorter side cause the information processing apparatus to perform a method for displaying a plurality of windows on said display screen and allocating the plurality of windows to tasks executable on said information processing apparatus, the method comprising:

displaying on said display screen two or more activating icons arranged with respective areas not overlapping with each other;

receiving input designating of any of said activating icons by a user through a graphical user interface displayed on said display screen;

opening a new window corresponding to the activating icon next to said designated activating icon and. after the new window is opened, displaying an operating icon on an opposite side of the new window from the designated activating icon;

re-arranging any existing window displayed on said display screen and any activating icon other than said designated activating icon such that they do not overlap on an area on which said new window is opened and the displayed windows are arranged along said longer side responsive to designation of any of said activating icons by the user through said graphical user interface, wherein the new window has a rectangular shape, said designated activating icon and said operating icon are arranged and displayed on two sides parallel to a shorter side of said new window in a manner that identifies the new window as a currently active window, by said operating icon being displayed as the same shape as said designated activating icon, and said designated activating icon and said operating icon being arranged at positions where a segment connecting their centers becomes parallel to said longer side.

39. An information processing apparatus allowing input/output through a graphical user interface, comprising:

a touch-sensitive display screen including a rectangular area with longer and shorter sides; and a multi-window controller configured to display a plurality of windows on said touch-sensitive display screen, allocate the plurality of windows to tasks executable by said information processing apparatus, respectively, display on said touch-sensitive display screen two or more activating icons arranged with respective areas not overlapping with each other, receive a designation of any of said activating icons by a user through said graphical user interface, open a new window corresponding-to the activating icon next to said designated activating icon and, after the new window is opened, display an operating icon on an opposite side of the new window from the designated activating icon, re-arrange any existing window displayed on said touch-sensitive display screen and any activating icon other than said designated activating icon such that they do not overlap on an area on which said new window is opened and the displayed windows are arranged along said longer side, and display the re-arranged existing window on said touch-sensitive display screen, wherein the new window displayed has a rectangular shape, said designated activating icon and said operating icon are arranged and displayed on two sides parallel to a shorter side of said new window in a manner that identifies the new window as a currently active window, by, said operating icon being displayed as the same shape as said designated activating icon, and said designated activating icon and said operating icon being arranged at positions where a segment connecting their centers becomes parallel to said longer side.

40. A method of controlling the display of multiple windows on a touch-sensitive display screen including a rectangular area with longer and shorter sides of an information processing apparatus, the method comprising:

displaying on said touch-sensitive display screen two or more activating icons arranged with respective areas not overlapping with each other;

receiving input designating of any of said activating icons by a user through a graphical user interface displayed on said touch-sensitive display screen;

opening a new window corresponding to the activating icon next to said designated activating icon and, after the new window is opened, displaying an operating icon on an opposite side of the new window from the designated activating icon;

re-arranging any existing window displayed on said display screen and any activating icon other than said designated activating icon such that they do not overlap on an area on which said new window is opened and the displayed windows are arranged along said longer side responsive to designation of any of said activating icons by the user through said graphical user interface, wherein the new window has a rectangular shape, said designated activating icon and said operating icon are arranged and displayed on two sides parallel to a shorter side of said new window in a manner that identifies the new window as a currently active window, by said operating icon being displayed as the same shape as said designated activating icon, and said designated activating icon and said operating icon being arranged at positions where a segment connecting their centers becomes parallel to said longer side.

* * * * *